(12) United States Patent
Renaud

(10) Patent No.: US 11,706,184 B2
(45) Date of Patent: *Jul. 18, 2023

(54) SPACE TIME REGION BASED COMMUNICATIONS

(71) Applicant: InBubbles Inc., Ottawa (CA)

(72) Inventor: Francis Renaud, Montreal (CA)

(73) Assignee: INBUBBLES INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/463,892

(22) Filed: Sep. 1, 2021

(65) Prior Publication Data

US 2022/0014493 A1 Jan. 13, 2022

Related U.S. Application Data

(63) Continuation of application No. 16/666,292, filed on Oct. 28, 2019, now Pat. No. 11,140,120, which is a (Continued)

(51) Int. Cl.
*H04L 51/222* (2022.01)
*H04L 51/58* (2022.01)
(Continued)

(52) U.S. Cl.
CPC ............ *H04L 51/58* (2022.05); *H04L 51/222* (2022.05); *H04W 4/021* (2013.01); *H04W 4/21* (2018.02)

(58) Field of Classification Search
CPC ......... H04L 51/58; H04L 51/222; H04W 4/21
(Continued)

(56) References Cited

U.S. PATENT DOCUMENTS

| 5,390,188 A | 2/1995 | Dawson |
| 7,653,398 B2 | 1/2010 | Buckley et al. |

(Continued)

FOREIGN PATENT DOCUMENTS

WO 2009029803 A1 3/2009

OTHER PUBLICATIONS

Requisition By the Examiner in Accordance With Subsection 86(2) Of the Patent Rules, in corresponding Canadian Patent Application No. 2,971,228, 2971228C_Z_R.pdf.

*Primary Examiner* — Thu Ha T Nguyen
(74) *Attorney, Agent, or Firm* — Eugene F. Derenyi; Fogler, Rubinoff LLP

(57) ABSTRACT

A method for space time region based communications in a data communication network is disclosed. The method includes performing an initial assignment of bubble data, the bubble data including a bubble spatio temporal information data representing a volume of space time, the bubble data further including a content data thereby assigned to the spatio temporal information data; providing a spatio temporal coordinate data associated with at least one user of the data communication network, determining if the spatio temporal coordinate data is deemed to be within the volume of space time represented by the bubble spatio temporal information data, and granting access to the content data to the at least one user of the data communication network if the spatio temporal coordinate data is determined to be deemed to be within the volume of space time represented by the bubble spatio temporal information data.

42 Claims, 42 Drawing Sheets

Related U.S. Application Data continuation of application No. 15/822,182, filed on Nov. 26, 2017, now Pat. No. 10,462,097, which is a continuation of application No. 15/105,417, filed as application No. PCT/CA2014/051216 on Dec. 16, 2014, now Pat. No. 9,973,466.

(60) Provisional application No. 61/916,572, filed on Dec. 16, 2013.

(51) Int. Cl.
*H04W 4/21* (2018.01)
*H04W 4/021* (2018.01)

(58) Field of Classification Search
USPC .......................... 455/466; 709/206, 200, 216
See application file for complete search history.

(56) References Cited

U.S. PATENT DOCUMENTS

| | | |
|---|---|---|
| 8,868,047 B2 | 10/2014 | Coskun et al. |
| 9,009,159 B2 | 4/2015 | Bernhardt et al. |
| 9,142,081 B1* | 9/2015 | Conklin .................. G07F 17/32 |
| 9,158,794 B2 | 10/2015 | Higgins et al. |
| 9,467,414 B2 | 10/2016 | Bosworth et al. |
| 9,734,220 B2 | 8/2017 | Karpistsenko et al. |
| 9,973,466 B2* | 5/2018 | Renaud ................. H04L 51/222 |
| 10,462,097 B2* | 10/2019 | Renaud ................. H04W 4/021 |
| 10,482,150 B1* | 11/2019 | Denzer ................. G06F 3/0484 |
| 11,140,120 B2* | 10/2021 | Renaud ................. H04W 4/021 |
| 11,553,449 B1* | 1/2023 | Alizadeh-Shabdiz ........................ G01S 5/02526 |
| 11,652,622 B2* | 5/2023 | Gotsman ............. G06F 21/6254 380/44 |
| 2003/0191688 A1* | 10/2003 | Prince, III ............. G06Q 30/02 705/14.56 |
| 2004/0236547 A1 | 11/2004 | Rappaport et al. |
| 2006/0002586 A1* | 1/2006 | Aggarwal .............. G06V 20/52 382/103 |
| 2006/0092847 A1 | 5/2006 | Mohan |
| 2006/0285489 A1 | 12/2006 | Francisco et al. |
| 2007/0237096 A1* | 10/2007 | Vengroff ................. H04W 4/02 370/254 |
| 2010/0034423 A1* | 2/2010 | Zhao .................... G06V 10/255 382/281 |
| 2010/0091669 A1 | 4/2010 | Liu et al. |
| 2010/0306825 A1 | 12/2010 | Spivack |
| 2010/0332468 A1* | 12/2010 | Cantrell .................. G06F 16/29 707/706 |
| 2011/0130947 A1* | 6/2011 | Basir ..................... G08G 1/052 701/119 |
| 2011/0167123 A1* | 7/2011 | Coskun .................. H04L 51/58 709/206 |
| 2012/0075118 A1 | 3/2012 | Basir |
| 2012/0226670 A1 | 9/2012 | Arcushin et al. |
| 2012/0278387 A1 | 11/2012 | Garcia et al. |
| 2013/0040730 A1* | 2/2013 | Barclay ............... G07F 17/3225 463/25 |
| 2013/0330055 A1 | 12/2013 | Zimmermann et al. |
| 2013/0339345 A1 | 12/2013 | Soto et al. |
| 2013/0347025 A1 | 12/2013 | Prakash et al. |
| 2014/0156806 A1* | 6/2014 | Karpistsenko ...... H04L 67/2885 709/219 |
| 2014/0213191 A1 | 7/2014 | Courtice |
| 2014/0245307 A1 | 8/2014 | Agarwal et al. |
| 2015/0019520 A1 | 1/2015 | Shtaygrud et al. |
| 2015/0058345 A1 | 2/2015 | Mishra et al. |
| 2015/0253428 A1 | 9/2015 | Holz |
| 2015/0347478 A1 | 12/2015 | Tripathi et al. |
| 2015/0363478 A1* | 12/2015 | Haynes .................. G06Q 10/06 707/610 |
| 2016/0038049 A1 | 2/2016 | Geva et al. |
| 2016/0044125 A1 | 2/2016 | Hardin et al. |
| 2016/0073286 A1 | 3/2016 | Wang et al. |
| 2016/0100110 A1 | 4/2016 | Mate et al. |
| 2016/0104071 A1 | 4/2016 | Brueckner |
| 2016/0253681 A1 | 9/2016 | De Souza et al. |
| 2017/0103264 A1 | 4/2017 | Javan et al. |
| 2017/0216595 A1 | 8/2017 | Geva et al. |
| 2017/0229011 A1 | 8/2017 | Basir |
| 2018/0350144 A1* | 12/2018 | Rathod .................. H04W 4/021 |
| 2019/0042575 A1* | 2/2019 | Ashkenazi ............ H04W 4/029 |
| 2019/0187720 A1* | 6/2019 | Fowe .................... G06N 20/00 |
| 2019/0209022 A1* | 7/2019 | Sobol .................... A61B 5/0022 |
| 2019/0297467 A1* | 9/2019 | Vengroff ............... H04W 4/029 |
| 2020/0092689 A1* | 3/2020 | Zhang .................... H04W 4/20 |
| 2020/0125851 A1* | 4/2020 | Alizad .................. H04L 51/222 |
| 2021/0026985 A1* | 1/2021 | Rind .................... G06F 21/6254 |
| 2021/0281779 A1* | 9/2021 | Li ........................ H04N 25/60 |
| 2021/0288981 A1* | 9/2021 | Numainville ....... H04L 63/1441 |
| 2021/0319894 A1* | 10/2021 | Sobol ...................... G06N 7/01 |
| 2022/0084181 A1* | 3/2022 | Isken ................. G01N 21/8422 |
| 2022/0222047 A1* | 7/2022 | Todirel ................ G06F 11/3608 |
| 2022/0350801 A1* | 11/2022 | Sato ..................... G06F 16/2477 |

\* cited by examiner

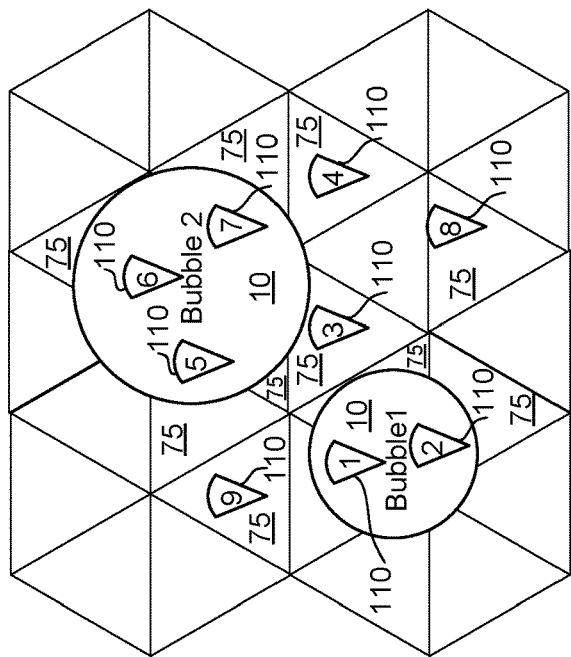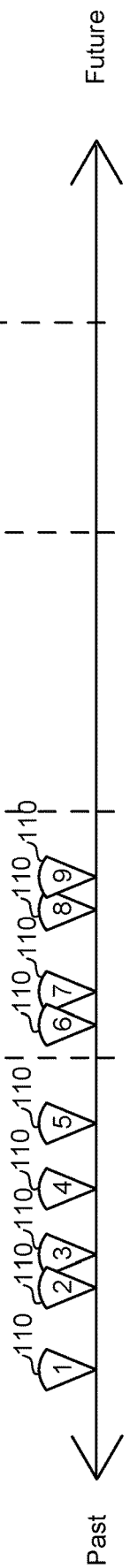
FIG. 18a
FIG. 18b

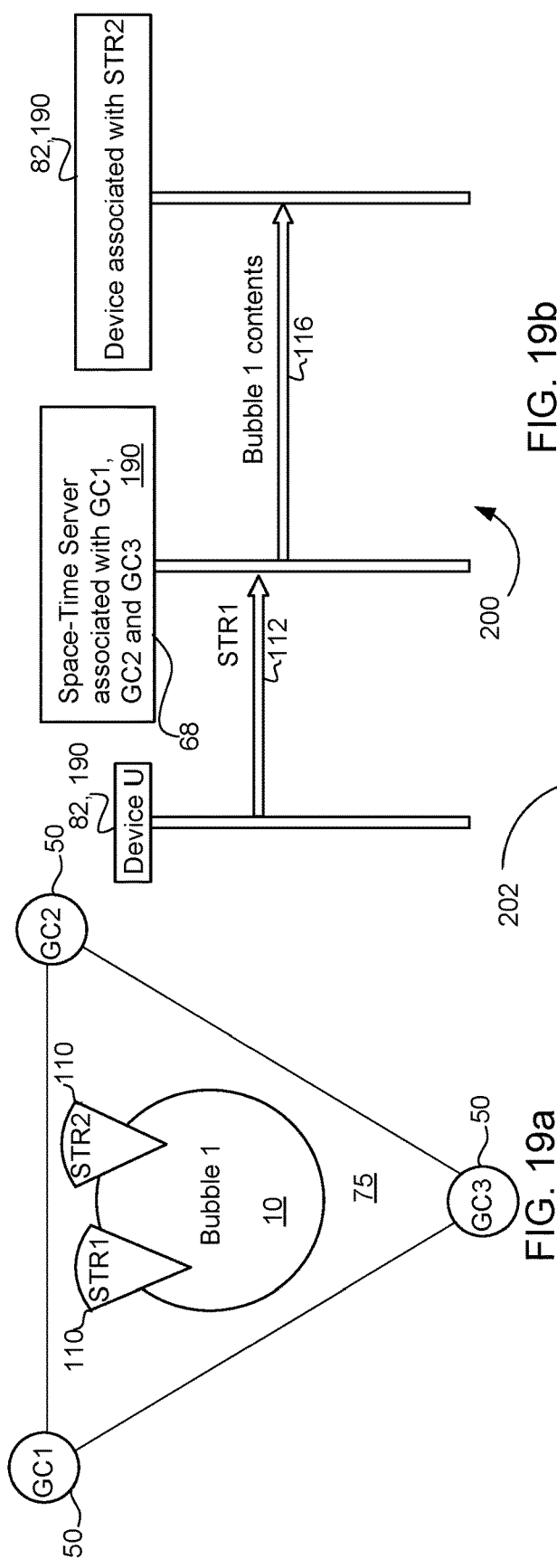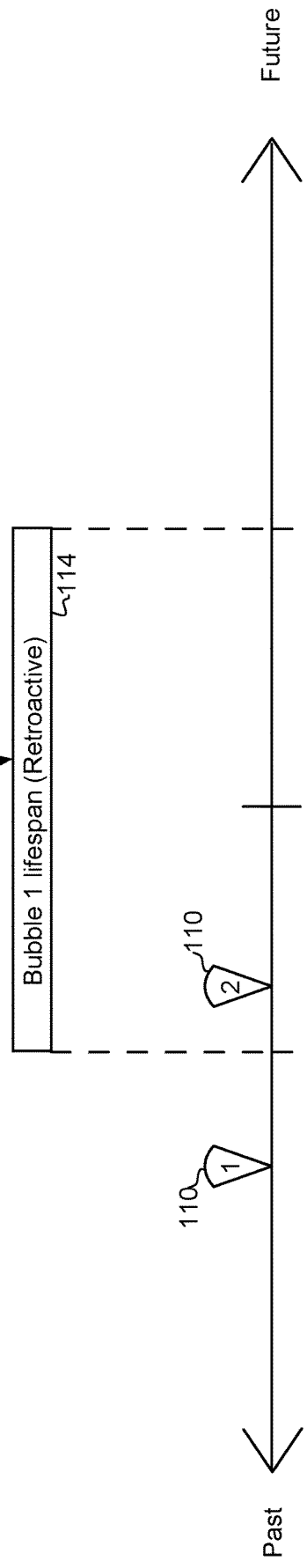
FIG. 19a
FIG. 19b
FIG. 19c

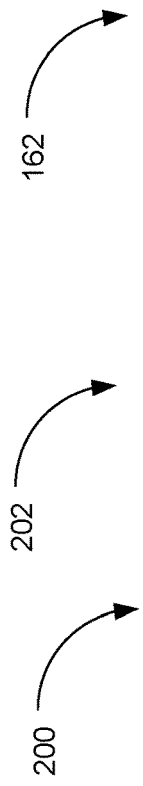

| Functionality | Lifespan | Bubble key | Shape | Opacity | Elasticity | Content type |
|---|---|---|---|---|---|---|
| Send persistent information to target area | Present | | | | | Multimedia |
| Send persistent information to target area of arbitrary shape | Present | | Connected | | | Multimedia |
| Multi-location shared content in realtime | Present | | Non-connected | | | Multimedia |
| Historic Browsable bubbles with multimedia contents | Past, present, future | | | 0 | | Multimedia |
| Discussion groups based on initial location | Present | | | | x | Multimedia |
| Discuss. group based on previously visited location | Past | | | | x | Multimedia |
| Secret Discussion group based on location | Present | x | | | x | Multimedia |
| Multi location secret discussion group | Present | x | Non-connected | | | Multimedia |
| Discuss. group based on future location | Future | | x | | x | Multimedia |
| Historic Bubble browser joinable Discussion groups based on location | Past, present, future | | | 0 | x | Multimedia |
| Querying client apps located in a region of arbitrary shape. | Present | | Arbitrary | | | Query |
| Sending conditional instruction to client app being, having been or that will be in a certain location | Present, pas, future | | Arbitrary | | | Conditional instruction (Can be query + instruction) |
| Space-time region based permission | Present, future | | Arbitrary | | True or false | Permission |

FIG. 27

SPACE TIME REGION BASED COMMUNICATIONS

CROSS-REFERENCE TO RELATED APPLICATIONS

The present application: claims priority from U.S. provisional patent application, Ser. No. 61/916,572, filed Dec. 16, 2014, for SPACE TIME REGION BASED COMMUNICATIONS, by Francis Renaud, included by reference herein and for which benefit of the priority date is hereby claimed; and is a continuation of U.S. Non-provisional patent application Ser. No. 16/666,292, filed Oct. 28, 2019, for SPACE TIME REGION BASED COMMUNICATIONS, by Francis Renaud, included by reference herein and for which benefit of the priority date is hereby claimed, which is a continuation of U.S. Non-provisional patent application Ser. No. 15/822,182, filed Nov. 26, 2017, for SPACE TIME REGION BASED COMMUNICATIONS, by Francis Renaud, included by reference herein and for which benefit of the priority date is hereby claimed.

TECHNICAL FIELD

The present specification relates to communication and, more particularly, to space time region based communication.

BACKGROUND OF THE INVENTION

Electric communication techniques include wireless communication networks for establishing one or a plurality of wireless communication links between a desired number of users or between users and network equipment, for the purpose of transferring information via these wireless communication links Such wireless communication networks include cellular networks, wireless local area networks, wireless access networks, e.g. wireless local loop or self organizing wireless communication networks or ad hoc networks.

Location determination techniques specially adapted for the above mentioned wireless networks, including techniques that determine location, including the location of user equipment, wireless devices, mobile equipment, and network equipment utilizing GPS, GLONASS, radio wave triangulation, and other techniques.

The integration of location determination techniques into wireless devices to meet E911 requirements enabled the location of users of cellular telephone emergency calls to 911 to be determined so as to enhance the 911 service. While location based techniques were initially restricted to E911, location based services evolved from the more general availability of location determination techniques to providers of traditional services that proceeded to provide enhancements to their services based on location.

Navigation services, traditionally provided by stand alone devices that were disconnected from the above mentioned wireless communication networks, became available on user equipment and wireless devices. Such services traditionally included vast amounts of geographically encoded information derived from geographical information systems (GIS), including information such as the location of gas stations, museums, hospitals, or more generally points of interest, that could be brought up by users based on location. However while stand alone navigation devices had static information that could only be updated periodically from the GIS, user equipment and wireless devices could connect instantaneously to servers hosting more frequently updated, and therefore more accurate, GIS derived information, such as for instance using a navigation application, or a web browser and a search engine whereby a map is provided to assist the user to identify the location of points of interest.

Social networking services, such as Facebook™ and Twitter™, are becoming increasingly available on user equipment and wireless devices.

Location based services and social networking services are being combined on user equipment and wireless devices. Examples include Facebook™ places, Foursquare™, Yelp™, and Google™ Latitude, among others.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for space time region based communications in a data communication network. The computer-implemented method also includes performing an initial assignment of bubble data, the bubble data including a bubble spatio temporal information data representing a volume of space time, the bubble data further including a content data thereby assigned to the spatio temporal information data; providing a spatio temporal coordinate data associated with at least one user of the data communication network, determining if the spatio temporal coordinate data is deemed to be within the volume of space time represented by the bubble spatio temporal information data, and granting access to the content data to the at least one user of the data communication network if the spatio temporal coordinate data is determined to be deemed to be within the volume of space time represented by the bubble spatio temporal information data. Other embodiments of this aspect include corresponding computer systems, apparatus, and computer programs recorded on one or more computer storage devices, each configured to perform the actions of the methods.

Implementations may include one or more of the following features. The method where the step of providing the spatio temporal coordinate data includes an act of determining an instantaneous location of the at least one user of the data communication network. The act of determining the instantaneous location of the at least one user of the data communication network includes using a positioning system. The step of providing the spatio temporal coordinate data includes an act of storing a space time record of the at least one user of the data communication network into a computer readable memory. The step of providing the spatio temporal coordinate data includes the act of retrieving the space time record of the at least one user of the data communication network from the computer readable memory. The space time record has a time coordinate which is in the past relative to a time reference in the data communication network. The space time record has a time coordinate which is in the future relative to a time reference in the data communication network. The method may include the step of modifying the bubble data. The method may include the act of modifying the bubble spatio temporal information data. The method may include the act of modifying the bubble data other than the spatio temporal information data. The method may include the step of repeating steps b through d upon the condition that bubble data other than the bubble spatio temporal information data has been modified. The method may include the act of modifying the content data. The method may include the act of repeating steps b through d upon the condition that the bubble data has been modified. The method may include the step of revoking access to the content data from the at least one user of the data communication network if the spatio temporal coordinate data is deemed to be outside the volume of space time represented by the bubble spatio temporal information data. The method may include the step of determining if a time reference in the data communication network is determined to be deemed to be outside of a lifespan of the volume of space time represented by the bubble spatio temporal information data. The method may include the step of repeating steps b through d upon the condition that the time reference in the data communication network is determined to be deemed to be outside of the lifespan of the volume of space time represented by the bubble spatio temporal information data. The method may include the step of deleting the bubble data upon the condition that the time reference in the data communication network is determined to be deemed to be outside of the lifespan of the volume of space time represented by the bubble spatio temporal information data. The spatio temporal information data includes at least one data selected from a group including a creation date, a start date, an end date, a timestamp, a longitude, a latitude, an altitude, a radius, or a diameter. The method further including the step of performing a subsequent assignment of an at least one other bubble data. The method further including the step of performing an initial assignment of channel data to regroup the bubble data and the at least one other bubble data into a channel. The method may include the step of assigning at least one bubble trail data that includes the bubble data in a sequence with the at least one other bubble data that are linked together in an orderly fashion represented by the bubble trail data where access to content data the at least one bubble data in the bubble trail data will be granted to the at least one user of the data communication network if the at least one user was granted access to the content data of the immediate predecessor of the at least one bubble data in the bubble trail data. The bubble data has a space time region attribute data that represents a predetermined shape in space time. The bubble data includes data points in time and space that need not be contiguous and that need not be connected to represent a predetermined space time region. The bubble other information data includes at least one data selected from a group including: a content type, an actions allowed, a bubble key, a shape id, a category, an owner id, a geo channels, a channel, an opacity, an elasticity, or a bubble id. The bubble data is modified to have different values at different points in time. The bubble data includes a geo channel data. The geo channel data includes geo channel server information data. The geo channel server information data includes at least one data selected from a group of a notificationserverurl, a bubblesserverurl, or a spacetimerecordserverurl for respective at least one of a notifications server, a bubbles server or a space time record server respectively in order to help load balance work done by one or more bubbles servers, notifications servers or space time record servers connected over the data communication network. The method may include the step of providing at least one interface selected from a group of: a communications interface, a user interface, or an application programming interface. The method may include the step of assigning to the spatio temporal information data to at least one data selected from a group of: a past time, a present time, a future time, a lifespan of the bubble data, a geo channel selection criteria, a bubble selection criteria, a device selection criteria, a node selection criteria, a user selection criteria, a surface element, a delaunay triangulation, or a voronoi diagram. The first and second information are each selected from a group of data may include: a time data, a location data, a latitude data, a longitude data, an altitude data, a start date data, an end date data, a creation date data, a lifespan data, a diameter data, an opacity data, an elasticity data, a permission data, a shape data, a category data, a content type data, a geo channel data, a channel data, an action data, or a bubble key data. The method may include at least one of the steps selected from a group may include of: creating, retrieving, updating, or deleting the bubble data. The method may include the step of communicating a space time region based communication including at least the content data via the data communication network with the at least one user of the data communication network. The method may include the act of communicating the space time region based communication using an at least one protocol selected from a group may include: an https protocol, an http protocol, a websockets protocol, or a sockjs protocol. The method may include the act of communicating the space time region based communication by including at least one message selected from a group of: a subscribe message, an unsubscribe message, a create new bubble message, a bubble created message, a new bubble message, a new bubble notification message, a bubble created in the past message, a space time notification message, a space time record message, a bubble contents message, a retrieve new bubbles message, a new bubbles message, a register to notifications message, a send space time record message, a create bubble message, a new bubble notification message, an answer message, or new answer notification message. The method may include the step of providing a trigger step to cause the determining step to occur. The trigger step is selected from a group may include: a communication trigger, a user interface trigger, or an application programming interface trigger. An owner user of the data communication network is deemed to be within the volume of space time represented by the bubble spatio temporal information data if the owner user triggered the step of performing the initial assignment of the bubble data. Implementations of the described techniques may include hardware, a method or process, or computer software on a computer-accessible medium.

One general aspect includes a computer readable memory having recorded thereon statements and instructions for execution by a computer. The computer readable memory also includes code means for performing an initial assignment of bubble data, the bubble data including a bubble spatio temporal information data representing a volume of space time, the bubble data further including a content data thereby assigned to the spatio temporal information data; code means for providing a spatio temporal coordinate data associated with a user of the data communication network, code means for determining if the spatio temporal coordinate data is deemed to be within the volume of space time represented by the bubble spatio temporal information data, and code means for granting access to the content data to the user of the data communication network if the spatio temporal coordinate data is determined to be deemed to be within the volume of space time represented by the bubble spatio temporal information data. Other embodiments of this aspect include corresponding computer systems, apparatus, and computer programs recorded on one or more computer storage devices, each configured to perform the actions of the methods.

One general aspect includes a computer program product may include a computer readable memory storing computer executable instructions thereon that when executed by a computer perform the steps. Other embodiments of this aspect include corresponding computer systems, apparatus, and computer programs recorded on one or more computer storage devices, each configured to perform the actions of the methods.

One general aspect includes a system for space time region based communications in a data communication network. The system also includes means for performing an initial assignment of bubble data, the bubble data including a bubble spatio temporal information data representing a volume of space time, the bubble data further including a content data thereby assigned to the spatio temporal information data; means for providing a spatio temporal coordinate data associated with a user of the data communication network, means for determining if the spatio temporal coordinate data is deemed to be within the volume of space time represented by the bubble spatio temporal information data, and means for granting access to the content data to the user of the data communication network if the spatio temporal coordinate data is determined to be deemed to be within the volume of space time represented by the bubble spatio temporal information data. Other embodiments of this aspect include corresponding computer systems, apparatus, and computer programs recorded on one or more computer storage devices, each configured to perform the actions of the methods.

One general aspect includes a computer-implemented method for space time region based communications in a data communication network. The method also includes performing an initial assignment of bubble data, the bubble data including a bubble spatio temporal information data representing a volume of space time, the bubble data further including a content data thereby assigned to the spatio temporal information data; providing a spatio temporal coordinate data associated with a user of the data communication network, determining if the spatio temporal coordinate data is deemed to be within the volume of space time represented by the bubble spatio temporal information data, and granting access to the content data to the user of the data communication network if the spatio temporal coordinate data is determined to be deemed to be within the volume of space time represented by the bubble spatio temporal information data. Other embodiments of this aspect include corresponding computer systems, apparatus, and computer programs recorded on one or more computer storage devices, each configured to perform the actions of the methods.

Other aspects of the present application will become apparent to a person of ordinary skill in the art to which they pertain in view of the accompanying drawings and their description.

BRIEF DESCRIPTION OF THE DRAWINGS

A complete understanding of the present application may be obtained by reference to the accompanying drawings, when considered in conjunction with the subsequent, detailed description, in which:

FIG. 18a is a relational view of an exemplary spatio temporal relationship between two bubbles and nine space time records;

FIG. 18b is a timeline view of an exemplary timeline of two bubbles and nine space time records;

FIG. 19a is a relational view of an exemplary spatio temporal relationship between three geo channels, a bubble, and two space time records;

FIG. 19b is a signalling view of an exemplary space time record and bubble content signalling;

FIG. 19c is a timeline view of an exemplary timeline for a bubble and two space time records;

FIG. 27 is a table view of an exemplary functionality enabled by corresponding data structure fields;

For purposes of clarity and brevity, like elements and components will bear the same designations and numbering throughout the Figures.

DETAILED DESCRIPTION OF THE DRAWINGS

Figure 1:
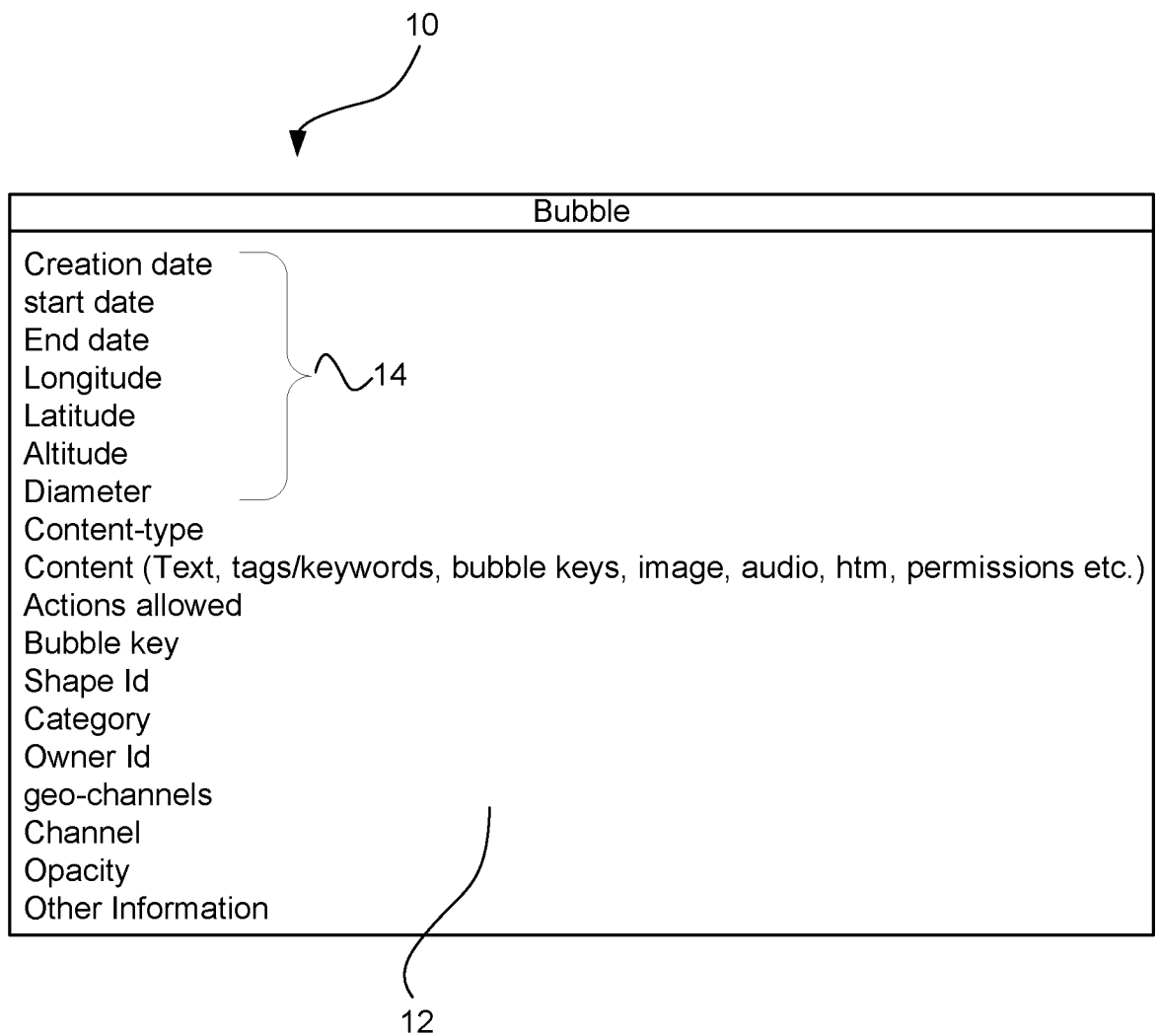
FIG. 1 is a data structure view of an exemplary bubble data structure.

Location based services and social networking services each independently face both privacy and security problems. When combined, the privacy and security problems are compounded. For example, using location based services and social networking services can reveal a user's location as well as their identity or other information related to their identity. Such information could be used in a manner that the user did not intend, such as by a stalker to stalk the user at their current location, or by a burglar to rob a user when the user is known not to be at a specific location such as their home or work. Although these two examples are extremes where knowledge of a users location and personally identifiable information have crossed the boundaries of use into nefarious purposes, other situations may dictate the boundaries of what is and is not socially acceptable.

In order to communicate with a party, prior knowledge of the other party's personally identifiable information is traditionally required. For example, a phone number, email address, knowledge of a web site, a network connection are respectively required in order to reach the party over the phone, via email, through a web page, or through social networks respectively. In order to communicate with a party instantly, that party traditionally has to be instantly available and/or willing to communicate, but knowledge of their availability and/or willingness is traditionally not possible without prior knowledge of their personally identifiable information. In locations where there are a large or small density of parties communicating, traditional communication systems may become oversubscribed or undersubscribed respectively. There is therefore a need for techniques that at least try to address these technical-problems, as well as other problems.

One aspect of the techniques of the present application addresses the above noted and other problems by enabling communications to be space time region based by a communication system that employ spatio temporal information in data structures and computer readable instructions in relation to a space time region if space time region based criteria are met, such as for example select parties are enabled to communicate whose location, captured using space time records, intersects the spatial portion of the spatio temporal information and/or space time region at any time during the temporal portion of the spatio temporal information and/or space time region. Another aspect of the techniques of the present application addresses the above noted and other problems by enabling a first party to be reached over space time region based communications if space time region based criteria are met, such as for example when the second party addresses communications to a space time region on a system instead of to the first party, and whereby the system enables the communications to the first party from the second party if the location of the first party captured in space time records intersects the spatial portion of space time region at any time during the temporal portion of the space time region. Yet another aspect of the techniques of the present application addresses the above noted and other problems by enabling space time records to be shared among unknown parties over the space time region based communication using an interface if space time region based criteria are met, such as for example when the system enables the automatic sharing of the location of the parties captured in space time records if the location of parties and/or space time records intersects the spatial portion of a specified space time region at any time during the temporal portion of the space time region. Still yet another aspect of the techniques of the present application addresses the above noted and other problems by enabling the exponential scalable deployment of space time region based communications if space time region based criteria are met, such as for example by using geo channel systems to provide virtual access to services via geo channels. Other aspects of the present application address other technical-problems, as well as other problems.

Advantageously, according to one aspect of the space time region based communications technique, communications are secured, private, and do not require any prior knowledge of the other party's personally identifiable information. Further advantageously, according to another aspect of the space time region based communications technique, parties whom traditional communications were unable to reach, can now be reached: unknown parties who were, are, or will be at a space time region in the past, present, or future can now be reached via space time region based communications. Yet further advantageously, according to yet another of the space time region based communications technique, parties instantly know that other parties are available and/or willing to communicate in relation to a space time region in the past, present, or future. Still yet further advantageously, according to still yet another aspect of the space time region based communications technique, an exponential scalable deployment of communications is provided that digitizes, deceptively grows, disrupts, dematerializes, demonetizes, and democratizes access to communications in comparison to traditional telecommunication access points. Other advantageous effects of the present application result from addressing the above noted technical-problems, and other problems.

FIG. 1 is a data structure view of an exemplary bubble 10 data structure. Bubble 10 includes bubble spatio temporal information 14 such as one or more of creation date, start date, end date, longitude, latitude, altitude and diameter. Bubble 10 also optionally includes bubble other information 12 such as at least one of content type, content (e.g. text, tags/keywords, bubble 10 keys, image, audio, htm, permissions etc.), actions allowed, bubble key 270, shape Id, category, owner Id, geo channels, channel, opacity, bubble 10 ID and/or other information. The bubble 10 (and all information therein) represents information that occupies the specified bubble spatio temporal information 14 (e.g. a lifespan from a start date to an end date at the specified longitude, latitude, altitude and diameter, all of which could be time dependent, e.g. have different values at different points in time). Furthermore, the bubble other information 12 could also be time dependant, e.g. have different values at different points in time. For the sake of brevity however, the remainder of the specification can be read assuming fixed bubble spatio temporal information 14 and fixed bubble other information 12. Operationally, a bubble 10 is the basic information container in the context of the present communication apparatus and method. It has location, temporal and size attributes as well as various others that govern access to the information it contains. The start time and the end time of a bubble 10 determine its lifespan which is the time during which the enclosed information is accessible by users. The latitude, longitude, altitude and diameter determine a bubble's spatial dimensions and combined with its lifespan it determines the volume it occupies in space time (4 dimensional space). The choice of space coordinates is application dependant. In one embodiment, space coordinates are given by the GPS system and so are limited to the space near the surface of the earth. The content type attribute determines how the content of a bubble 10 is to be interpreted by an apparatus or method operating on a given device 82. The content is the actual data enclosed in the bubble 10 and it can be any kind of data, such as for example: text, image, video, audio, access permissions, passwords etc. In some embodiments, users accessing a bubble 10 are allowed to enter comments that will be broadcast in real time to other users who are inside the bubble 10. For example bubbles used for socializing (sharing pictures, events, opinions etc.) can benefit from allowing commenting. This makes a bubble 10 not only a container for information but also a space for interacting in real time. By creating a bubble 10 within a client application, users are in fact dynamically creating spatio temporally localized spaces of interaction. In some embodiments, users may be granted or disallowed certain permissions to a bubble 10. For example, commenting by general users can be disallowed for a bubble 10 that only serves to deliver announcements to a target area. Consider an embodiment in which a bubble 10 used by restaurants or retailers to deliver promotional coupons to potential customers wherein the only action allowed by general users on one hand is claiming the coupon. On the other hand, announcing and granting the coupon will then be the actions allowed to the restaurant/retailer user. Each content type may have its associated set of actions allowed, and those actions may be limited by user category or user. A person of ordinary skill in the art in view of this specification understands that specific application specific functions need to be implemented both on the client side and server side of embodiments of the apparatus and method in order to interpret and process the actions allowed for each content type. In some embodiments, channels are used to regroup bubbles that should be accessible in the context of specific applications. For instance, in one embodiment there is a main channel accessible to all users by default where they can share contents, opinions, and ask questions. That same channel may contain both public and commercial announcements. Channels can be created for use with bubble 10 based games, treasure hunts etc. or for application specific usage such as dating, space time todo lists etc. In some embodiments, inside a channel, a bubble 10 can be hidden and made available to the user only when the user meets a specified condition, for example possessing a specific alpha numeric key, or bubble key 270. This allows sharing hidden information within a channel that can itself be public or private. At the time of creation of a bubble 10 the user has the option to associate it with a unique bubble key 270 of his choice. Although bubbles can have a spherical shape, in some embodiments, information can be embedded within arbitrary shapes or more generally regions. The term bubble 10 as used herein means an arbitrary shape in space time where information can be embedded within that arbitrary shape or more generally a space time region 100. In some embodiments, those shapes can be approximated by the union of several bubbles having different locations and possibly different diameters and different lifespan. Some of the bubbles can exist at different points in time and a region need not be connected (two or more non intersecting bubbles is an example of a generalized space time region 100). It is then possible to create information and interaction containers whose arbitrary shape evolves in time. A simple example would be a zone that is expanding or shrinking in time, and/or is moving in space. In some embodiments, bubbles forming a region have the exact same content type as well as content and share the same region id which uniquely identifies the region. In some embodiments, within a given channel, bubbles can be tagged as belonging to different categories. This enables different applications to interact thereby providing a communications platform that can be adapted to be either application specific or application agnostic as needed. In some embodiments, bubble 10 trails are provided that consist of a sequences of bubbles that are linked together in an orderly fashion. A given bubble 10 in the trail will be revealed to the user only when he has visited its immediate predecessor in the trail first. Bubble 10 trails can be implemented using bubble keys. There can be automatic bubble 10 trails where each bubble 10 contains the bubble key 270 to the next bubble 10 in the sequence, making it possible for the application to automatically unlock it when the user visits each bubble 10 and/or meets pre defined criteria. Trails can also require interaction between each user and the author of the trail who will decide to grant or not the key to each bubble 10 one by one. Bubble 10 trails enable creating simple games such as treasure hunts or can be used in the context of bubble based dating/meeting applications. In some embodiments, a bubble 10 can be opaque or transparent. In some embodiments, an opaque bubble 10 will only reveal its content to users that are physically inside it. In some embodiments, transparent bubbles can be browsed by choosing locations on a map and a time frame (e.g. using sliders for selecting a time frame). The latter case is also an embodiment of historical browsing both in space and time for user generated content.

Figure 2:
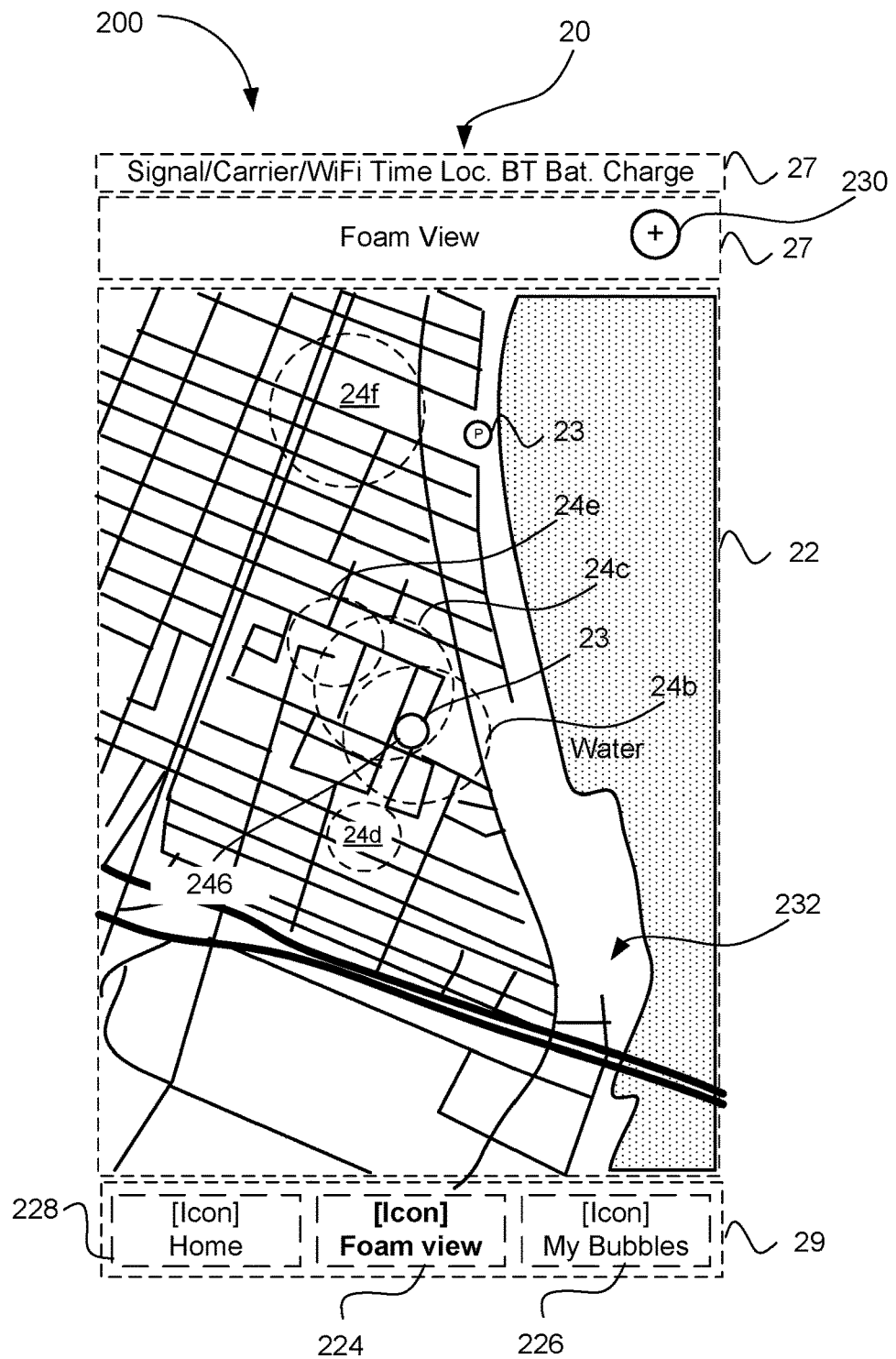
FIG. 2 is a user interface view of an exemplary bubble user interface.

FIG. 2 is a user interface view of an exemplary bubble 10 user interface 20. User interface 20 includes an other interface element 27, a map foam view 22 a mode interface element 29, a location interface element 23 and several instances of a bubble interface element 24: 24b, 24c, 24d, 24e and 24f. The user interface 20 may also include one or more other interface element 27. Operationally, by manipulating the user interface 20, a user can view various aspects of instances of bubble 10 illustrated in FIG. 1. The specific manner in which the user can interact with user interface 20 depends in this example on the mode of the user interface 20 as selected by the user using the mode interface element 29. As illustrated in FIG. 2, the other interface element 27 indicates that the user interface 20 is operating in a mode that favours the display of a foam view as illustrated in the map foam view 22. In this mode, the instantaneous spatial relationships between various instances of bubble 10 are represented graphically by corresponding instances of a bubble interface element 24. The instances of the shown bubble interface element 24 are rendered onto a map by the map foam view 22, wherein is also indicated the current location of the user of the user interface 20 by location interface element 23. In this example, the user can create a new bubble 10 at the location indicated by the location interface element 23 by pressing on the (+) symbol in the other interface element 27. The bubbles already created on the map foam view 22 are represented by their bubble interface element 24. In some embodiments, the contents of these bubbles cannot be seen from this view when the bubbles are opaque: only tags, keywords or other hints on the contents can be seen. The map foam view 22 includes a map interface element 232, five instances of a bubble interface element 24 b f, and two instances of a location interface element 23. The map interface element 232 shows various geographic features such as streets, points of interest, and water ways that are typically found on a map. Bubble interface element 24 b f show the location and size of bubbles on the map foam view 22 of the user interface 20, overlaid on top of the map interface element 232. The location interface element 23 marked with the letter 'P' is an overlay showing the position of a park in the map interface element 232. The location interface element 23 at the centre of the map foam view 22 shows the user position 246 of the user operating the device 82 in which the user interface 20 is being manipulated. Mode interface element 29 includes three buttons: a mode interface element home 228, a mode interface element foam 224, and a mode interface element own 226 to enable a user to switch the user interface 20 into a mode to interface with bubble 10 feeds, a mode to interface with bubble 10 foam, and a mode to interface with the users own bubbles that he created, respectively. As illustrated, the mode interface element foam 224 is active in FIG. 2 as it is shown in bold. The first other interface element 27 at the top of the user interface 20 includes information typically provided by the operating system, such as signal/carrier/wifi information, time information, location service information, Bluetooth information, Battery charge level information, and charging information. The second other interface element 27 includes the text 'Foam view' as well as a button mode interface element create 230 (+) to enable a user to switch the user interface 20 into a mode to create a bubble 10.

Figure 3:
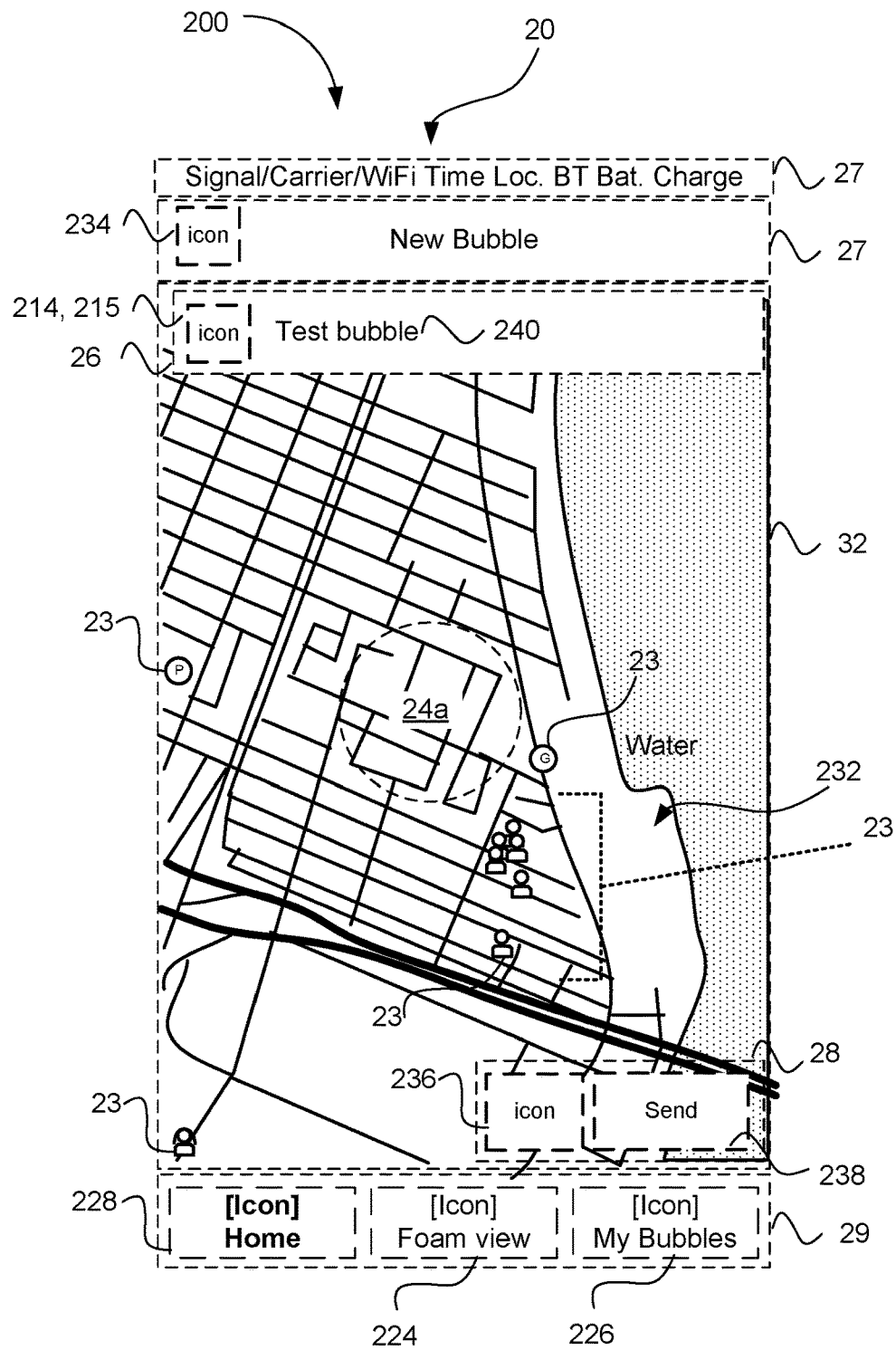
FIG. 3 is a user interface view of an exemplary bubble user interface.

FIG. 3 is a user interface view of an exemplary bubble 10 user interface 20. User interface 20 includes an other interface element 27, a map bubble view 32 a mode interface element 29, a bubble content creation element 26 and a bubble action interface element 28 as well as a bubble interface element 24 (24a). Operationally, a new bubble 10 has been created and is represented by bubble interface element 24 (24a), The user can manipulate the user interface 20 to alter the information inside the bubble content creation element 26, such as for example by changing the icon and text displayed therein, and/or by adding a picture or other content using the bubble action interface element 28. When the user has completed creating the bubble 10, the user selects the send action by manipulating the bubble action interface element 28. The user can create bubbles containing text and image at a location on a map. The user can position the bubble 10 in space by dragging it on the map and resize it. In some embodiments, limitations can be imposed as rules depending on the context of the application and its intended usage. In this example, the user created the bubble 10 in the current location, and other users are advantageously only able to access the information enclosed in the bubble 10 when they are physically in the space region delimited by the bubble 10, thereby enabling the users to achieve space time region 100 based communication. Map bubble view 32 includes a map interface element 232, a bubble interface element 24 a, a bubble action interface element 28, a bubble content creation element 26, and a plurality of instances of a location interface element 23. The map interface element 232 shows various geographic features such as streets, points of interest, and water ways that are typically found on a map. Bubble interface element 24a show the location and size of a bubble 10 that is in the process of being created or dropped on the map bubble view 32 of the user interface 20, overlaid on top of the map interface element 232. This bubble interface element 24 can be manipulated by the user to change its spatial attributes (size and location). Bubble content creation element 26 includes a bubble content viewing icon 214 and bubble content creation text 240, which in this example reads 'Test bubble', and is manipulable by the user for specific applications, as is the choice of bubble content viewing icon 214, to for example denote a specific channel, e.g. a megaphone to denote an announcement, a broken car to denote need for road side assistance, etc. . . . The plurality of location interface element 23 include location interface element 23 representing the position of devices of users, and location interface element 23 representing other positions, such as a park marked with the letter 'P' and a gas station marked with the letter 'G'. Bubble action interface element 28 includes two buttons: bubble action attach interface element 236 and bubble action send interface element 238, whereby the user can attach an item, such as a picture for example, and send or drop the bubble 10 respectively. Icons or text can be used inside the bubble action interface element 28 to denote the action a user would achieve by manipulating the user interface 20. In the example shown, a camera icon (not explicitly shown) denotes an attach action for a picture, and the word ' Send' denotes the send or drop action enabled by the user interface 20. Mode interface element 29 includes three buttons: a mode interface element home 228, a mode interface element foam 224, and a mode interface element own 226 to enable a user to switch the user interface 20 into a mode to interface with bubble 10 feeds, a mode to interface with bubble 10 foam, and a mode to interface with the users own bubbles that he created, respectively. As illustrated, the mode interface element home 228 is active in FIG. 3 as it is shown in bold. Other interface element 27 includes the text 'New Bubble' as well as a button bubble action cancel interface element 234 to enable a user to cancel the creation of a bubble 10. Although not explicitly shown in FIG. 3, it is contemplated that a user may manipulate the temporal attributes of bubble interface element 24 using user interface 20.

Figure 4:
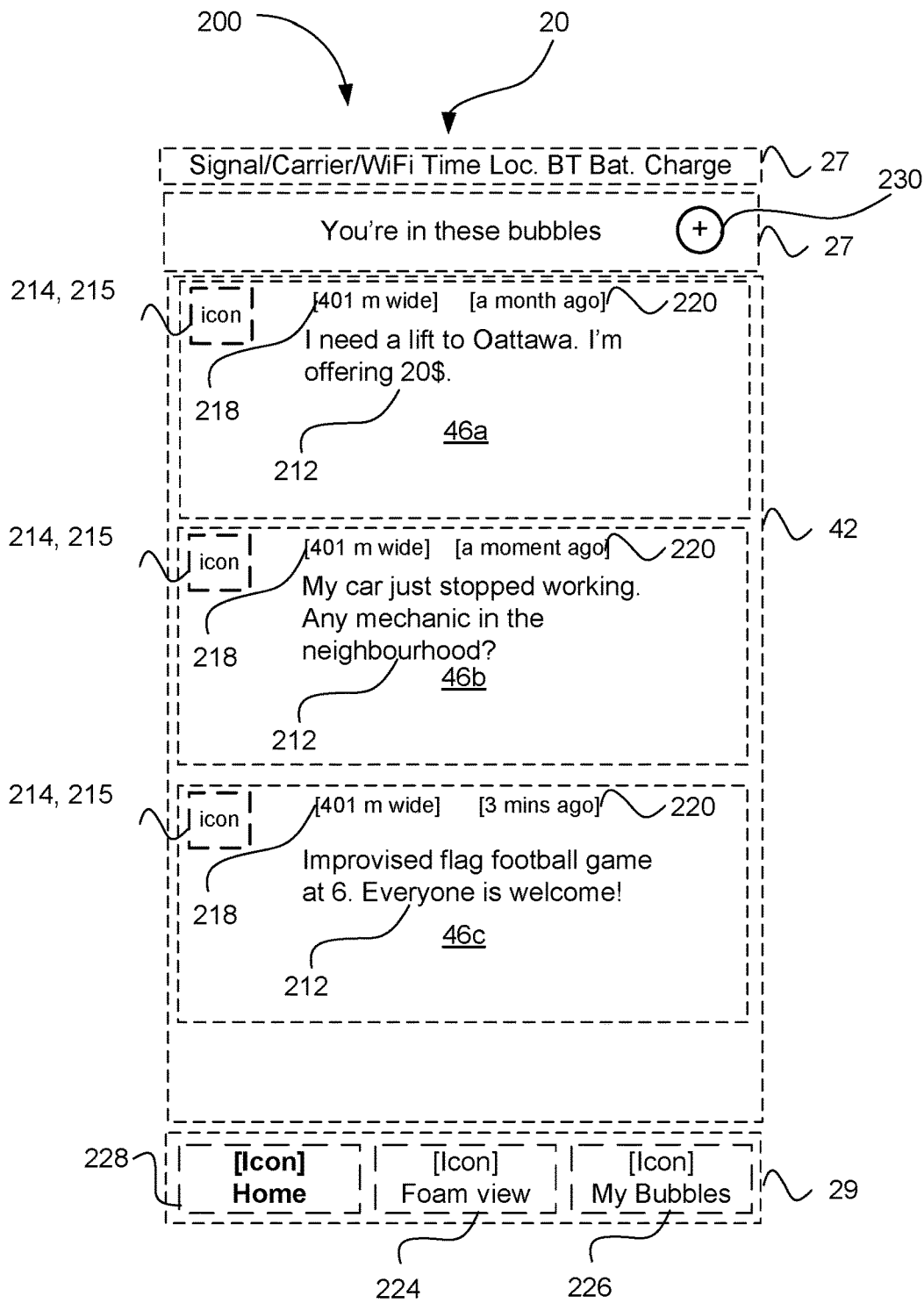
FIG. 4 is a user interface view of an exemplary bubble user interface.

FIG. 4 is a user interface view of an exemplary bubble 10 user interface. User interface 20 includes an other interface element 27, a bubble feed view 42 a mode interface element 29, an other interface element 27 and several instances of a bubble content viewing element 46: 46*a*, 46*b*, and 46*c*. Operationally, the user of user interface 20 is located in the space time coordinates that are deemed to be inside the space time region represented by three instances of a bubble 10, illustrated as 24*a*, 24*b*, and 24*c* in the user interface 20 of FIG. 3 and FIG. 2. Consequently, the user interface 20 and more specifically bubble feed view 42 shows the corresponding content of those instance of bubble 10 via respective bubble content viewing element 46: 46*a*, 46*b*, and 46*c*. As illustrated, all three instances of bubble 10 (24*a*, 24*b*, and 24*c*) have the same diameter. However, the location and content of each bubble 10 is different and reflects the interests of the user who created each bubble 10. As shown in the example, the user will see in this bubble feed view 42 a summary of the contents of each bubble 10 they are physically in at the moment. What the user sees may change when the user moves from a location to another; if for example, the user leaves the space time region of some bubbles and enters the space time region of other bubbles. The user can select a bubble content viewing element 46 entry in the bubble feed view 42 in order to see the contents of a specific bubble 10 in greater detail and interact with other users in the same bubble 10 in a manner that corresponds to the content type of the bubble 10. Bubble feed view 42 includes three instances of a bubble content viewing element 46, 46*a*, 46*b* and 46*c*. Bubble content viewing element 46 includes a bubble content viewing icon 214, bubble content viewing spatial information 218, bubble content viewing temporal information 220, and bubble content viewing text 212. Bubble content viewing element 46 includes bubble content viewing icon 214 showing a bubble content viewing symbol 215, corresponding for example to a channel. Mode interface element 29 includes three buttons: a mode interface element home 228, a mode interface element foam 224, and a mode interface element own 226 to enable a user to switch the user interface 20 into a mode to interface with bubble 10 feeds, a mode to interface with bubble 10 foam, and a mode to interface with the users own bubbles that he created, respectively. As illustrated, the mode interface element home 228 is active in FIG. 4 as it is shown in bold. Other interface element 27 includes the text 'You're in these bubbles' as well as a button mode interface element create 230 to enable a user to switch the user interface 20 into a mode to create a bubble 10.

Figure 5:
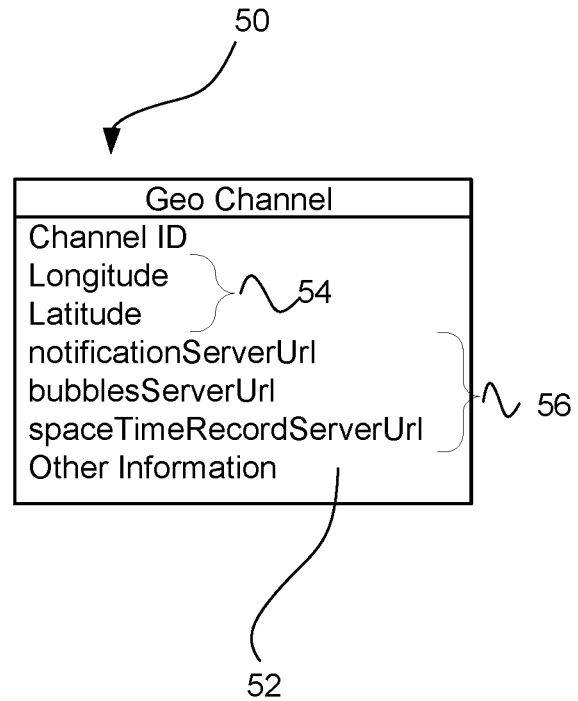
FIG. 5 is a data structure view of an exemplary geo channel data structure.

FIG. 5 is a data structure view of an exemplary geo channel 50 data structure. Geo channel 50 includes geo channel spatio temporal information 54 and geo channel server information 56 as well as optionally including geo channel other information 52. As illustrated, geo channel spatio temporal information 54 includes longitude and latitude, but although not expressly shown in the drawing, geo channel spatio temporal information 54 can include one or more of creation date, start date, end date, longitude, latitude and altitude. Geo channel server information 56 includes notificationServerUrl, bubblesServerUrl, and spaceTimeRecordUrl for communicating with notifications server 67, bubbles server 66 and space time record server 68 respectively. Geo channel other information 52 includes Channel ID and Other Information. As illustrated in this example, each geo channel 50 has a unique alpha numeric Channel ID, has longitude and latitude coordinates, and can figuratively be represented as a kind of antenna planted at a specific point on a map at a given time. A geo channel 50 also has the three aforementioned urls: bubbleServerUrl, notificationServerUrl and spaceTimeRecordServerUrl. Operationally, a geo channel 50 delimits a space time region covering a small area (e.g. a few hundred meters or a few kilometers across) in order to help load balance the work done by one or more bubbles server 66, notifications server 67 and space time record server 68. As illustrated in this example, each geo channel 50 has space coordinates (longitude and latitude) as well as the three servers it is associated with: bubbles server 66, notifications server 67 and space time record server 68. In general, several geo channels will be associated with the same servers to cover a given region such as a small city or part of a larger one. We call such a set of related geo channels a geo channel 50 system. The spatial density of geo channels will vary from one area to another depending on the density of population for each area. Geo channel 50 systems are entirely independent from each other and form a very scalable pattern of deployment.

Figure 6:
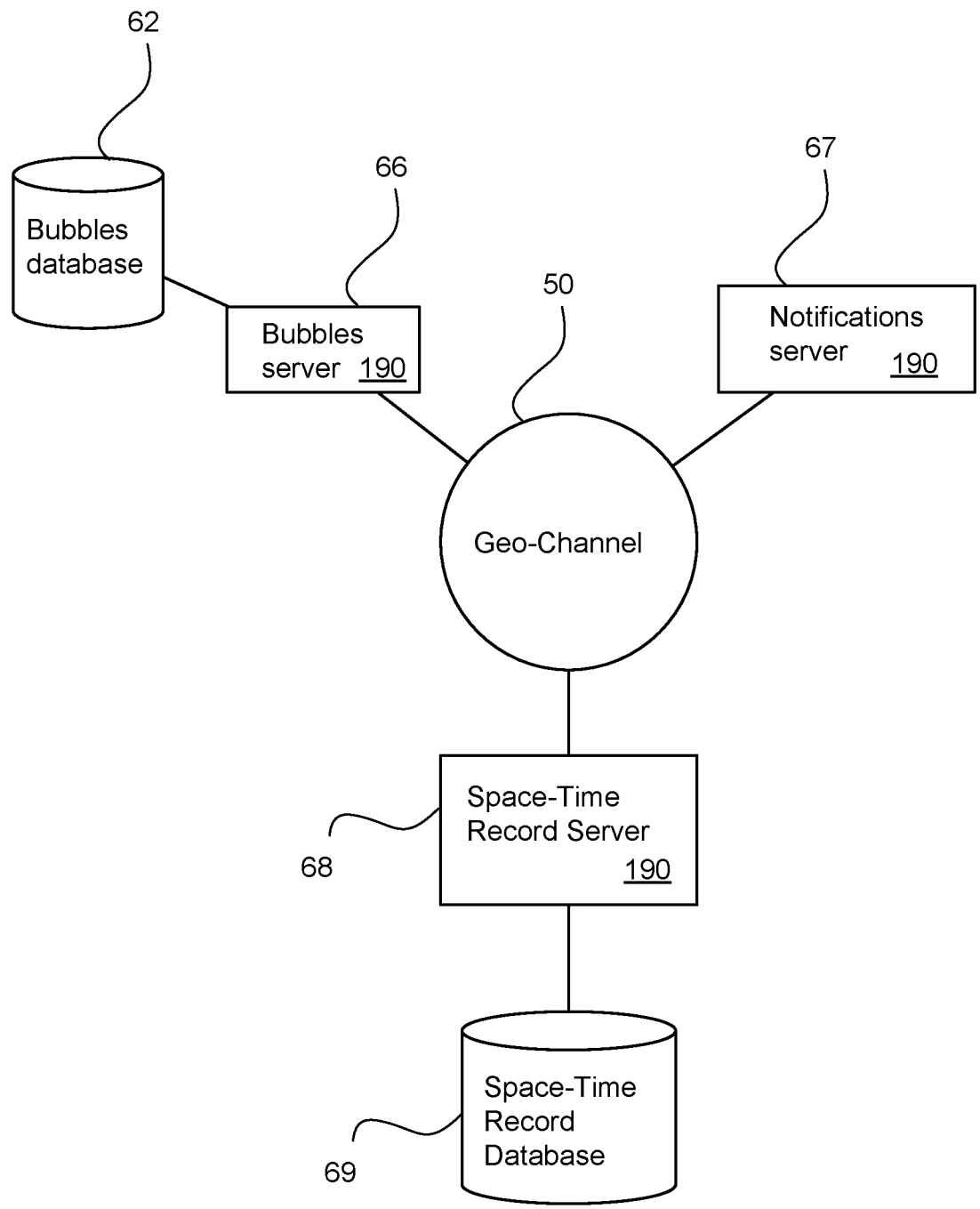
FIG. 6 is a relational view of an exemplary relation between a geo channel and three servers.

FIG. 6 is a relational view of an exemplary relation between a geo channel 50 and three servers. Geo channel 50 includes information such that a node (not explicitly shown in FIG. 6) that has access to the information in geo channel 50 has access to the URLs for communicating with bubbles server 66, notifications server 67, and space time record server 68. Typically this node would be a device 82 operating a user interface 20 to enable a user to achieve space time region 100 based communications. Thus, what is depicted are the servers associated to a geo channel 50: bubbles server 66, notifications server 67 and space time record server 68. Also shown are the bubbles database 62 that is accessible to the bubbles server 66, and the space time record database 69 that is associated with the space time record server 68. Although not expressly shown in the drawing, a person of ordinary skill in the art may make other associations in addition to or as an alternative to those depicted via data and/or voice networks, e.g. the Internet, telephony networks, etc. to other servers and databases or services (e.g. voice service), as may be contemplated as needed by a specific application, in view of the present specification. Operationally, in some embodiments, several geo channels will typically be associated with the same servers in order to cover a region such as a small city of a portion of a larger one. The three kinds of server constitute a functional factorization that allows for greater flexibility when scaling, but another partition of functionality is within the scope of the present specification and would be obvious to a person of ordinary skill in the art in view of this specification. In some embodiments, all three servers could also be merged into a single one for simplicity. A collection of one or more geo channels operates as a geo channel 50 system. A bubbles server 66 is an application server running (executing) a server application (computer readable instructions) responsible for creating, retrieving, updating and deleting bubbles. Each bubbles server 66 interacts with a bubbles database 62. In alternative embodiments, such a database could be entirely integrated into the bubbles server 66, or achieved through the use of an external database. In some embodiments, instances of bubble 10 can be complemented by information obtained from content service providers or other web services. In some embodiments, the bubbles database 62 could be implemented using, for example MySQL, MongoDb, Riak, or the like, in order to carry out the task required by each incoming request. In some embodiments, mobile devices and bubbles server 66 interact using an implementation of the hops protocol. A notifications server 67 is an application server running (executing) a server application (computer readable instructions) that notifies devices in real time of events occurring such as for example at least one of bubble 10 creation, answers to bubbles, bubble 10 state change, device 82 entering or leaving bubble 10, or other information. In one embodiment, mobile devices and notifications server 67 interact using an implementation of the web sockets protocol such as for example sockjs or the like. In one embodiment, messages sent to a notifications server 67 through one of its associated geo channel 50 will be rebroadcast to all mobile devices subscribed to that geo channel 50. A space time record server 68 is an application server running (executing) a server application (computer readable instructions) that is responsible for creating, retrieving, updating and deleting instance of a space time record 110. In some embodiments, a client application running on a mobile device 82 can be connected to at least three geo channels at any time and thus possibly to one or more space time record server 68. Each time the mobile device 82 changes location significantly (what significantly means is determined by the client application) a space time record 110 is sent to the appropriate one or more space time record server 68. This space time record 110 is stored in the associated space time record database 69 and contains at least spatio temporal information such as location and timestamp, and optionally one of the following: user id, device 82 id, agent type, or other information. This enables tracking movements of users or devices in general and the creation of a bubble 10 in the past, as described in this specification.

Figure 7:
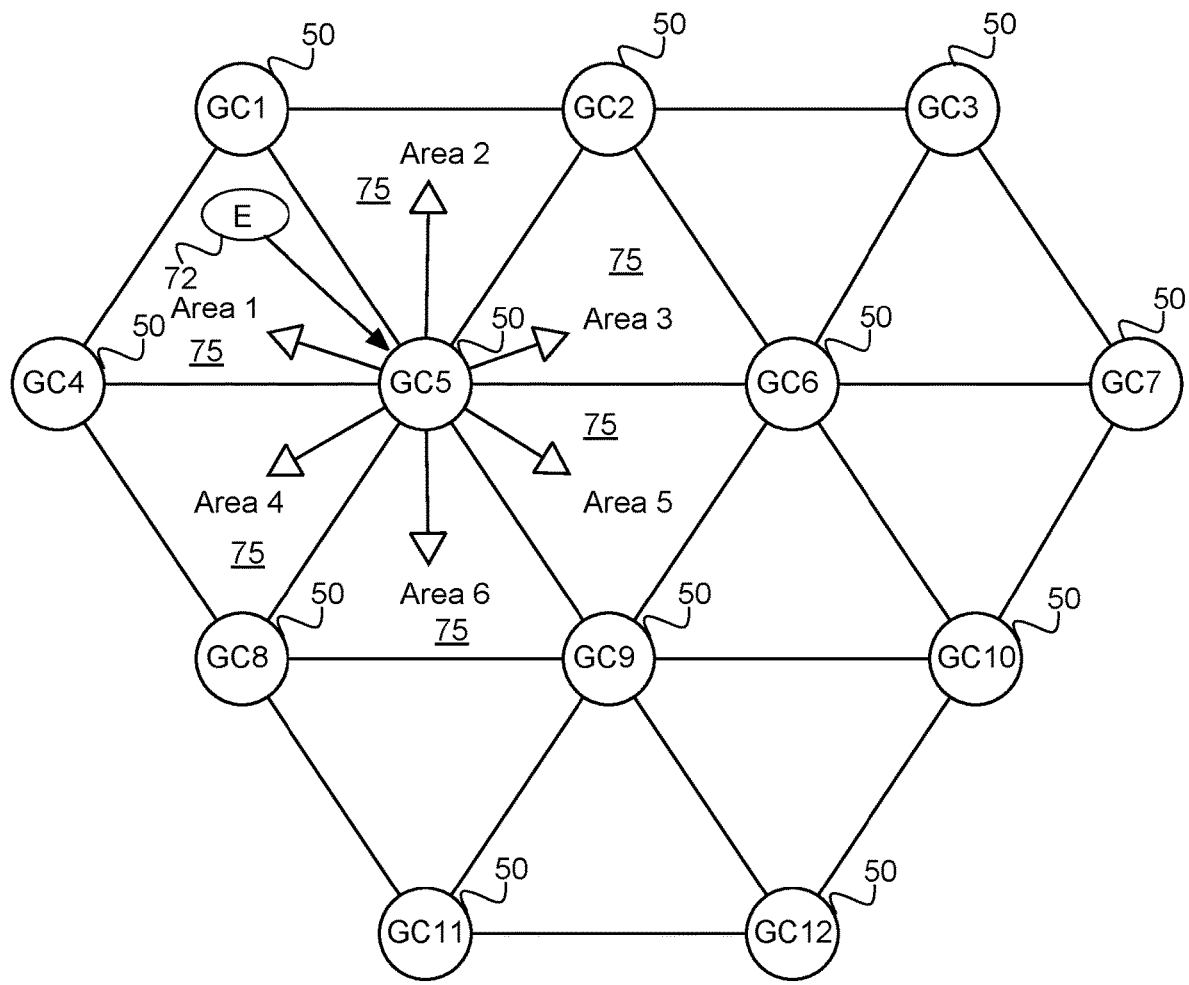
FIG. 7 is a relational view of an exemplary spatio temporal relationship between twelve geo channels and an event.

FIG. 7 is a relational view of an exemplary spatio temporal relationship between twelve geo channels and an event. The exemplary portion of the geo channel 50 system depicted in FIG. 7 includes twelve instances of a geo channel 50 labelled GC1 12. A spatio temporal event 72 labelled E occurs in the spatio temporal area 75 labelled Area 1 delimited by the geo channel spatio temporal information 54 of geo channel 50 GC1, GC4 and GC5. The event E will trigger messages to be sent through geo channels GC1, GC4 and GC5. Here we only illustrate the case where a message is sent to GC5 for brevity. The notifications server 67 associated with geo channel 50 GC5 will then send a notification to all mobile devices subscribed to that geo channel 50. This means all active devices located in spatio temporal area 75 labelled as Area 1 6 in the illustration will be sent the notification. Since a message will also be sent to each of the notification server associated with geo channels GC1 and GC4, all areas surrounding those channels will be notified too. In some embodiments duplicate notifications can be dropped at the server side if deemed possible (e.g. when sent to the same client device 82; e.g. some of the notifications server 67 may be the same in geo channels GC1 and GC4). In some embodiments duplicate notifications can be dropped on the device 82 side if deemed possible (e.g. when sent to the same server).

Figure 8A:
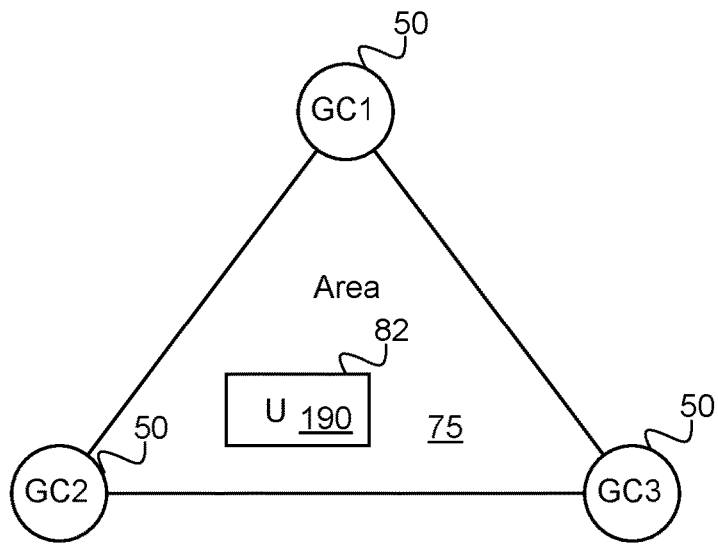
FIG. 8a is a relational view of an exemplary spatio temporal relationship between three geo channels and a user.

FIG. 8a is a relational view of an exemplary spatio temporal relationship between three geo channels and a user. As depicted, three instances of a geo channel 50 labelled GC1, GC2 and GC3 delimit a spatio temporal area 75 wherein is relatively situated a device 82 U. The device 82 U is a mobile device 82 such that device 82 U could have either just powered up or started a bubble 10 user interface 20 application in the spatio temporal area 75, or moved into the spatio temporal area 75 from another spatio temporal area 75.

Figure 8B:
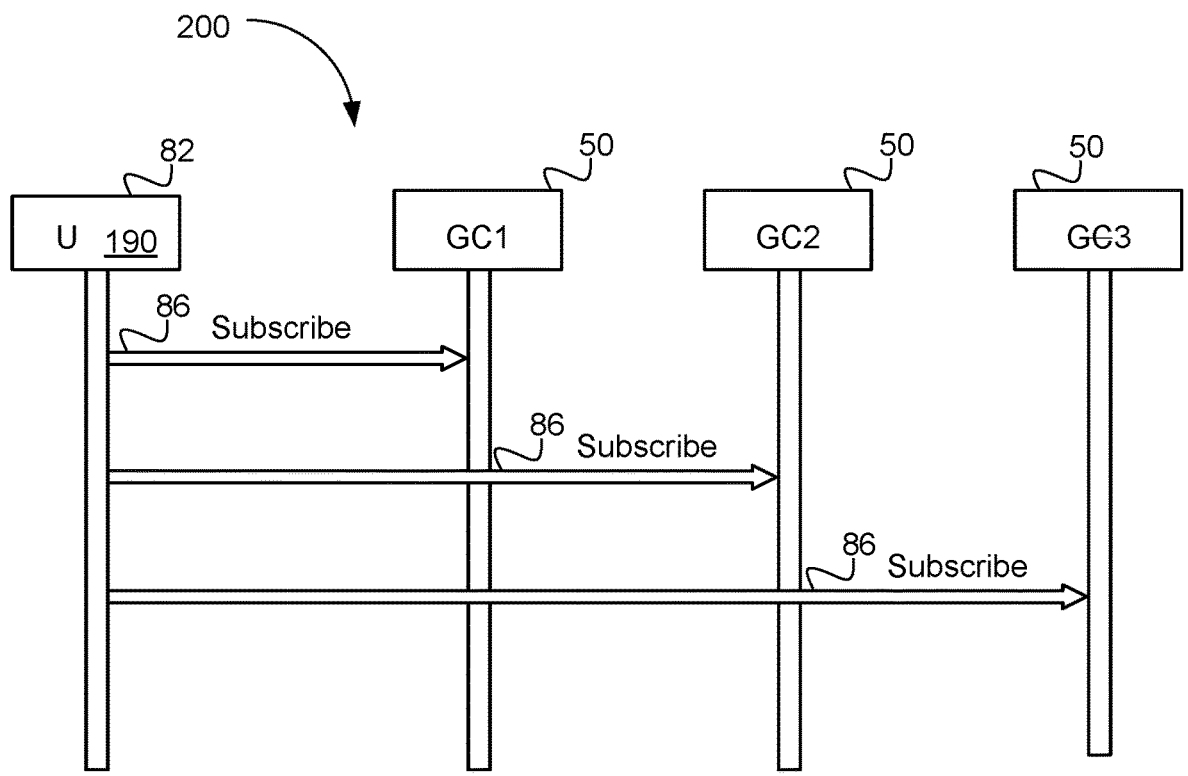
FIG. 8b is a signalling view of an exemplary user geo channel subscription signalling.

FIG. 8b is a signalling view of an exemplary user geo channel 50 subscription signalling Time flows downward in the signalling view depicted in FIG. 8b and can be considered in relation to FIG. 8a. Device 82 U sends a subscribe message 86 to each of the servers associated with geo channel 50 labelled GC1 3. Although the drawing does not show the individual servers to which the subscribe message 86 is sent, it is to be understood that the subscribe message 86 is sent to the servers indicated in the geo channel server information 56 contained in each of respective geo channel 50 labelled GC1 3. Refer to FIG. 6 for an example of specific servers associated with specific geo channel server information 56 for a given geo channel 50.

Figure 9A:
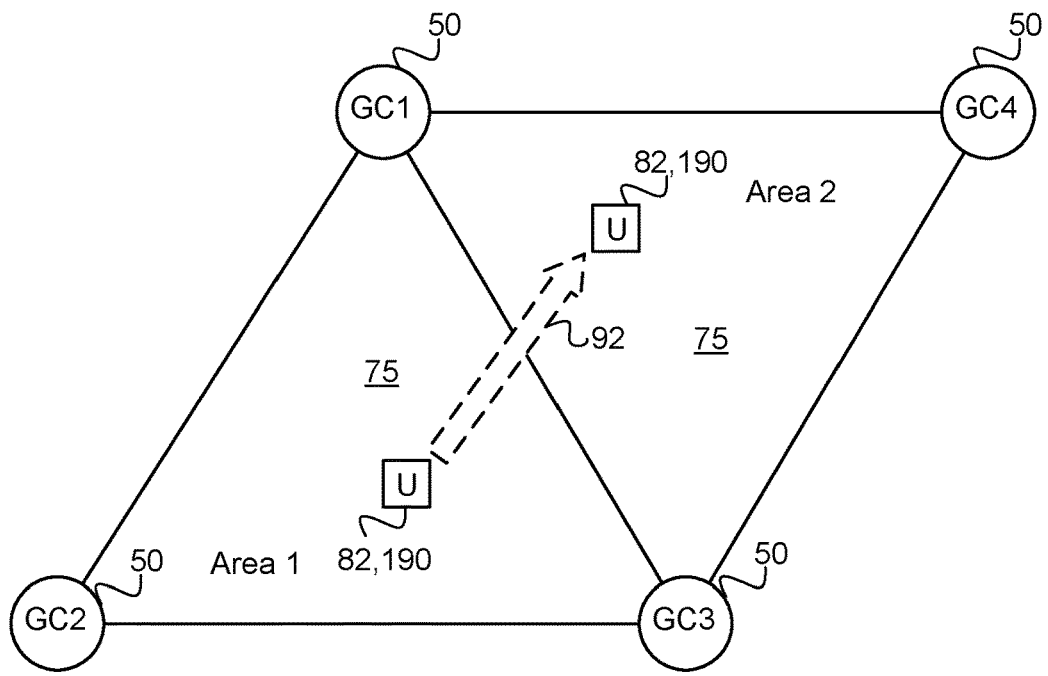
FIG. 9a is a relational view of an exemplary spatio temporal relationship between four geo channels and a user.

FIG. 9a is a relational view of an exemplary spatio temporal relationship between four geo channels and a user. As depicted, four instances of a geo channel 50 labelled GC1 4 delimit two spatio temporal area 75 labelled Area 1 2. Device 82 U is initially situated in spatio temporal area 75 Area 1 delimited by and relative to geo channel 50 GC1, GC2, and GC3 as in FIG. 8a. Due to a spatio temporal displacement 92, device 82 U is then situated in spatio temporal area 75 Area 2 delimited by and relative to geo channel 50 GC1, GC3 and GC4.

Figure 9B:
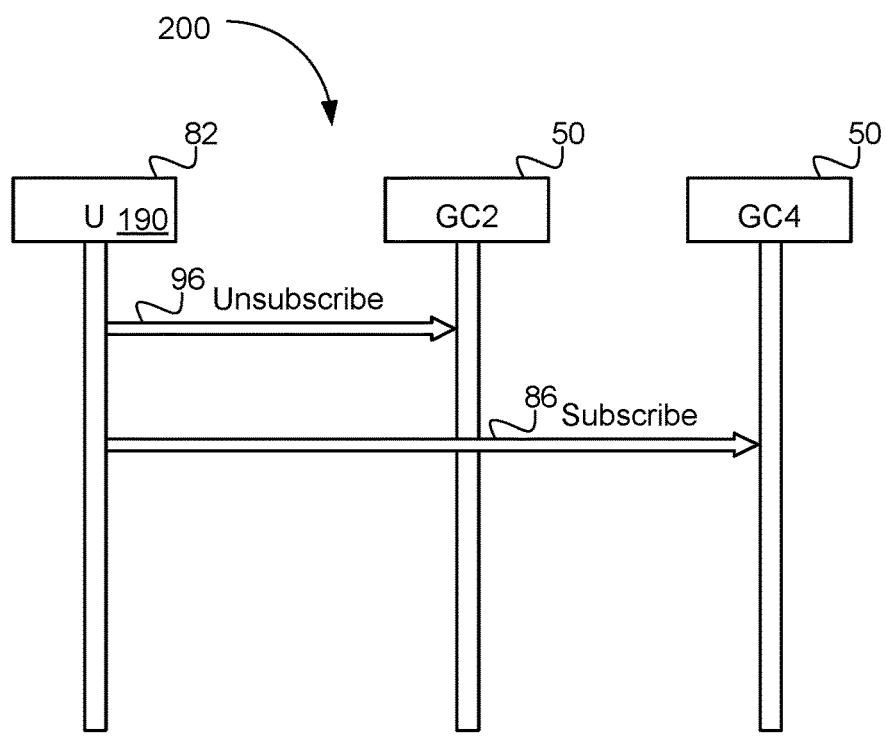
FIG. 9b is a signalling view of an exemplary user geo channel update signalling.

FIG. 9b is a signalling view of an exemplary user geo channel 50 update signalling Time flows downward in the signalling view depicted in FIG. 9b and can be considered in relation to FIG. 9a. Device 82 U sends an unsubscribe message 96 to geo channel 50 labelled GC2 and a subscribe message 86 to geo channel 50 labelled GC4. In alternative embodiments, the order of the messages could be reversed, or the messages could be sent simultaneously. Although the drawing does not show the individual servers to which the subscribe message 86 and unsubscribe message 96 are sent, it is to be understood that the subscribe message 86 and unsubscribe message 96 are sent to the servers indicated in the geo channel server information 56 contained in each of respective geo channel 50 labelled GC2 and GC4 respectively. Refer to FIG. 6 for an example of specific servers associated with specific geo channel server information 56 for a given geo channel 50. Advantageously, only one subscribe message 86 and one unsubscribe message 96 were required to account for the spatio temporal displacement 92 such that device 82 U remained subscribed to geo channel 50 labelled GC1 and GC3 during the spatio temporal displacement 92.

Figure 10:
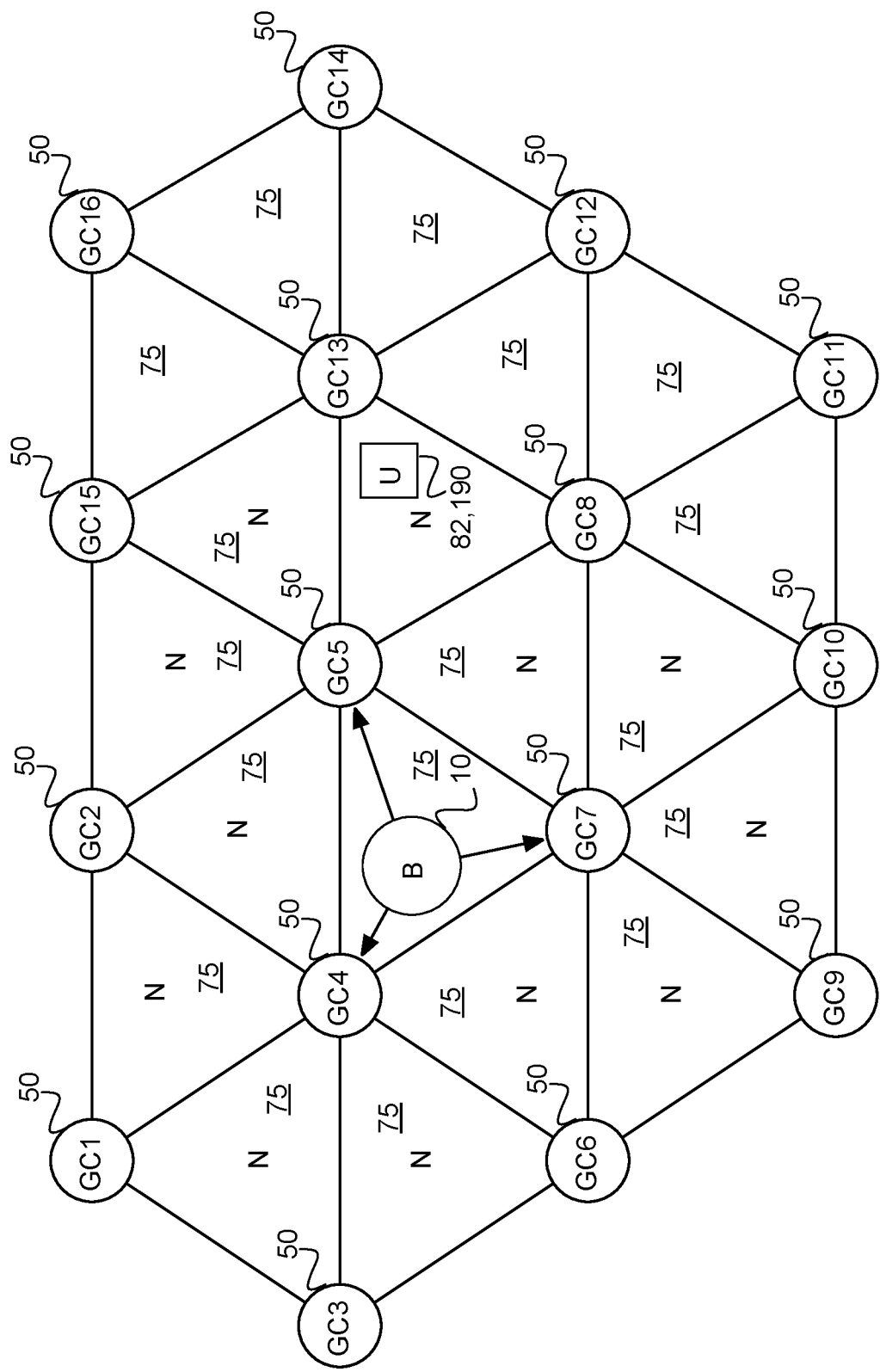
FIG. 10 is a relational view of an exemplary spatio temporal relationship between sixteen geo channels, a bubble, and a user.

FIG. 10 is a relational view of an exemplary spatio temporal relationship between sixteen geo channels, a bubble 10, and a user. As depicted, geo channel 50 labelled GC1 16 include spatio temporal area 75 delimited by geo channel 50 GC4, GC5, and GC7 wherein is situated relative thereto bubble 10 B and spatio temporal area 75 delimited by geo channel 50 GC5, GC13 and GC8. Operationally, when a user creates a bubble 10 the device 82 (either using e.g. defaults or other predetermined way, or by user interaction) will determine size, location, and time. The space time covered by the bubble 10 will determine the set of geo channel 50 to be associated with the bubble 10 via a geo channel 50 selection algorithm. The one or more bubbles server 66 associated with those selected geo channel 50 will be sent the request to create and store the bubble 10 in their respective bubbles database 62. It may happen that a given bubble 10 will be stored on more than one bubbles database 62 when the geo channel 50 involved point to distinct bubbles server 66. This can occur, for example, when a bubble 10 is created at the boundary of two or more geo channel 50 systems. In the example depicted, the geo channel 50 selection algorithm used broadcast notification of the creation of the bubble 10 to geo channel 50 GC4, GC5 and GC7. These selected geo channel 50 then notify device 82 in the spatio temporal area 75 labelled N that the selected geo channel 50 delimit. Since device 82 U is in one such spatio temporal area 75 labelled N delimited by geo channel 50 GC5, GC13 and GC8, device 82 U will receive the notification form the notifications server 67 associated with geo channel 50 GC5.

Figure 11:
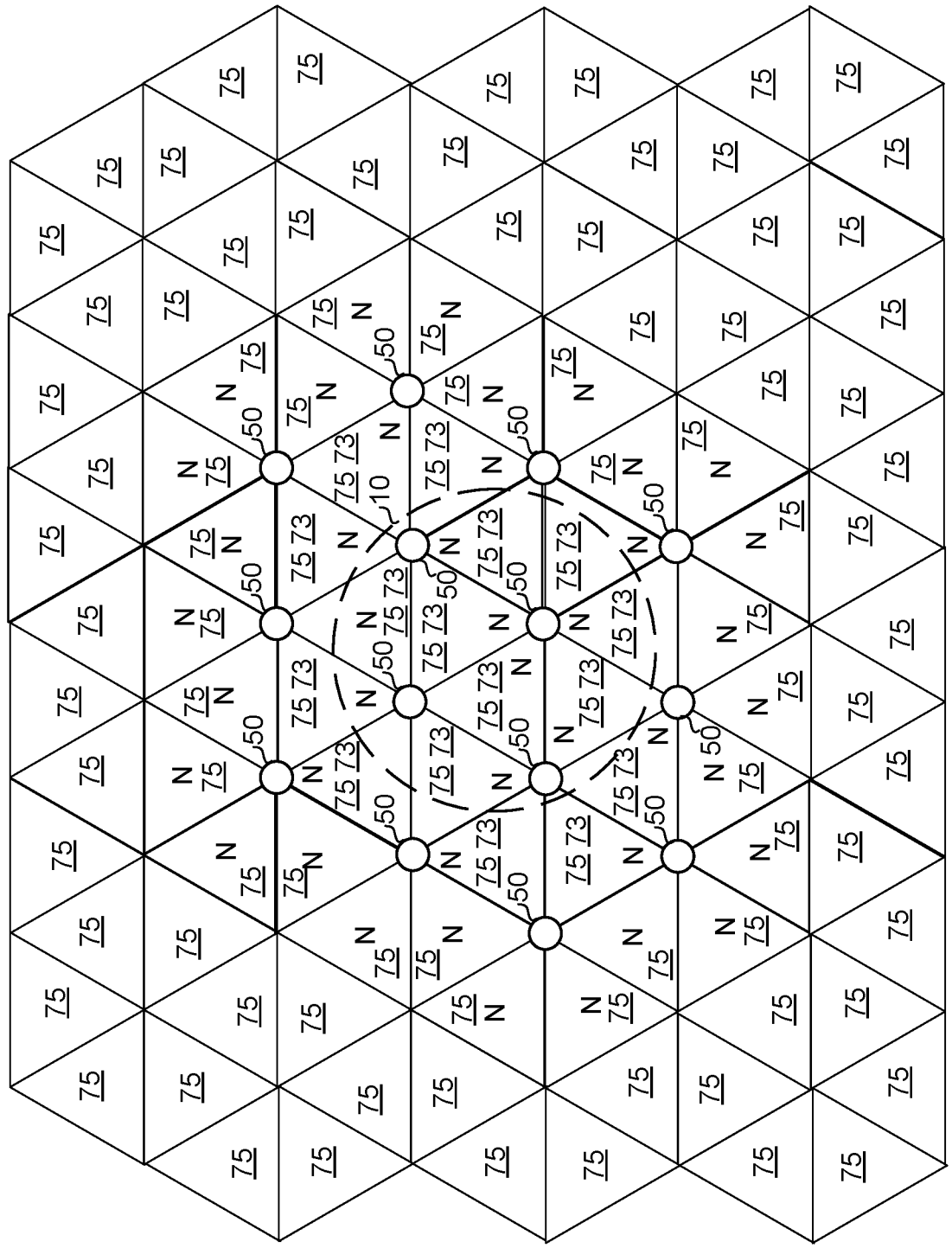
FIG. 11 is a relational view of an exemplary spatio temporal relationship between a bubble and geo channels.

FIG. 11 is a relational view of an exemplary spatio temporal relationship between a bubble 10 and geo channels. As depicted, a plurality of geo channel 50 delimit a multitude of spatio temporal area 75, and a bubble 10 is situated relative thereto. In this example the bubble 10 spans multiple spatio temporal area 75 each of which is a select spatio temporal area 73. Operationally, in some embodiments, the set of geo channels involved in the creation of a bubble 10 are those that are the vertices of triangles intersecting the projection of the bubble 10 onto the surface of the ground. In this illustration white circles represent such geo channel 50 and the triangles they are the vertices of are select spatio temporal area 73, a subset of the set of spatio temporal area 75 depicted. Spatio temporal area 75 that will be notified of the creation of the bubble 10 in this example are the ones delimited by triangles having at least one selected geo channel 50 as vertex. Those spatio temporal area 75 involved in notification are labelled with an N. mobile devices located in any of those areas will be notified of the creation of the bubble 10. The device 82 (not shown) in any of the spatio temporal area 75 labelled N receive notification of the creation of the bubble 10.

Figure 12:
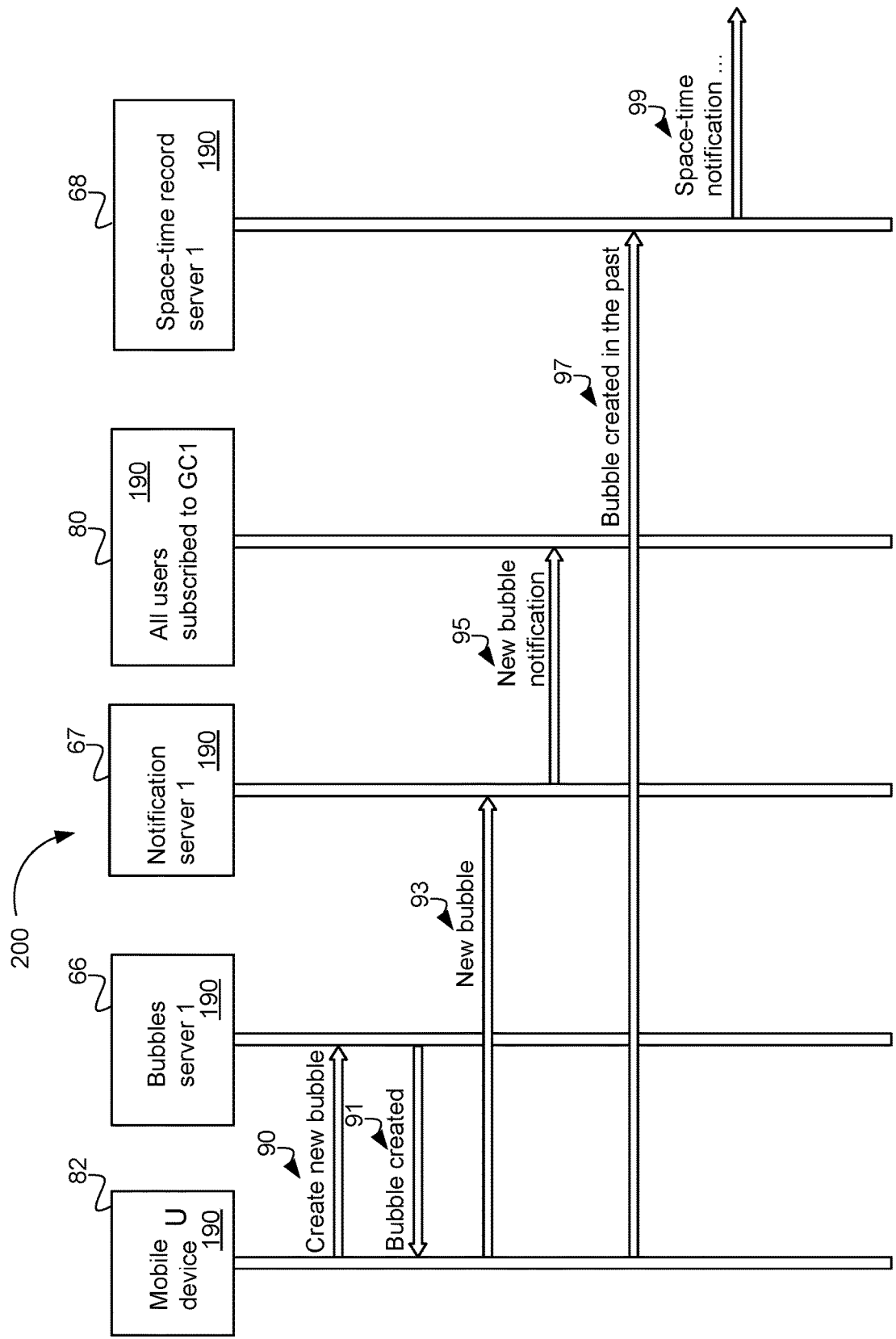
FIG. 12 is a signalling view of an exemplary bubble creation signalling.

FIG. 12 is a signalling view of an exemplary bubble 10 creation signalling Device 82 U communicates initially with one or more servers specified in the geo channel server information 56 of a geo channel 50 GC1 (not shown), including at least bubbles server 66 Bubbles server 1, then in some embodiments with notifications server 67 Notification server 1, and in some embodiments with space time record server 68 Space time record server 1. Bubbles server 66 bubbles server 1 communicates with device 82 U. Notifications server 67 Notification server 1 communicates with device 82 U and with zero or more subscribed devices 80 All users subscribed to GC1. Space time record server 68 Space time record server 1 communicates with device 82 U and with zero or more other nodes (not shown). In some embodiments, messages communicated include create new bubble message 90, bubble created message 91, new bubble message 93, new bubble notification message 95, bubble created in the past message 97 and space time notification message 99. Operationally, in the example depicted, when a bubble 10 is created the following sequence of events take place. First the set of geo channel 50 involved in the creation is determined. Then an identifier for each of the set of those geo channel 50, such as for example one or more geo channel other information 52 such as Channel ID, become an attribute of the bubble 10 being created, in for example bubble other information 12 such as geo channels. A request create new bubble message 90 is sent to the appropriate one or more bubbles server 66 (in this case only Bubbles server 1 is depicted for brevity) to create and store the new bubble 10. Most of the time a single server is involved but this may not always be the case and the techniques taught herein apply in those situations as well. The creation of the bubble 10 is determined to be successful by the device 82 U upon receipt of a bubble created message 91 from the appropriate bubbles server 66, after which device 82 U sends a new bubble message 93 to each notifications server 67 involved (in this case only Notification server 1 is depicted for brevity). Each notifications server 67 in turn will broadcast a new bubble notification message 95 to all subscribed devices 80 via appropriate geo channel 50 (only the case of GC1 is depicted for brevity but in the general case all appropriate geo channel 50 are used) so that subscribed device 82 will receive notifications in real time. The third step involves space time record server 68. This step is triggered when the bubble 10 is created in the past or more generally when the start time of the bubble 10 is set to be before its created time in the bubble spatio temporal information 14. This is a kind of retroactive bubble 10 creation an in such case device 82 U sends bubble created in the past message 97 to appropriate space time record server 68 (in this case only Space time record server 1 is depicted for brevity), which in turn optionally sends space time notification message 99 to appropriate other nodes that are not shown for brevity.

Figure 13A:
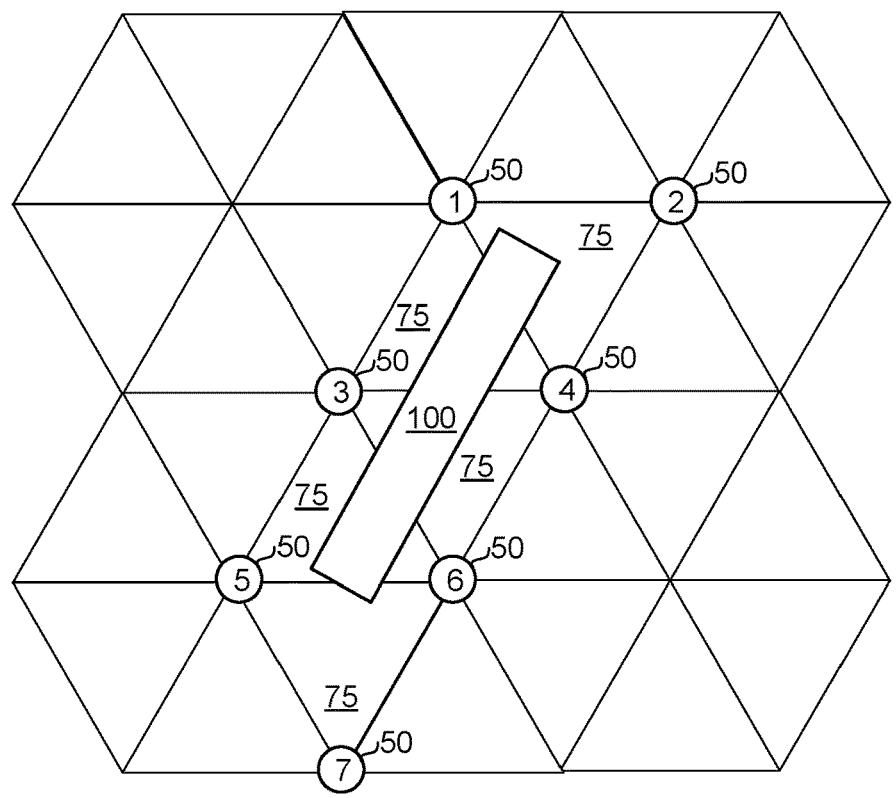
FIG. 13a is a relational view of an exemplary spatio temporal relationship between seven geo channels and a region.

FIG. 13a is a relational view of an exemplary spatio temporal relationship between seven geo channels and a region. Geo channel 50 labelled 1 7 delimit five spatio temporal area 75 whereat is situated relative thereto a space time region 100 that in this example is rectangular. Up until this point, spherical bubbles were the basic information container shape depicted in the specification. However this specification contemplates to create regions having arbitrary shapes in space, connected or not, that serve as an information or interaction container. Furthermore, this specification contemplates that those regions can more generally be created in 4 dimensional space time meaning they can have parts that exist only at certain locations in space and at certain points in time. Thus space time region 100 could be realized by use of a bubble 10 data structure wherein the bubble spatio temporal information 14 would include those parameters needed to define the illustrated region and/or wherein the bubble other information 12 includes a Shape Id to differentiate between different space time region 100 shape.

Figure 13B:
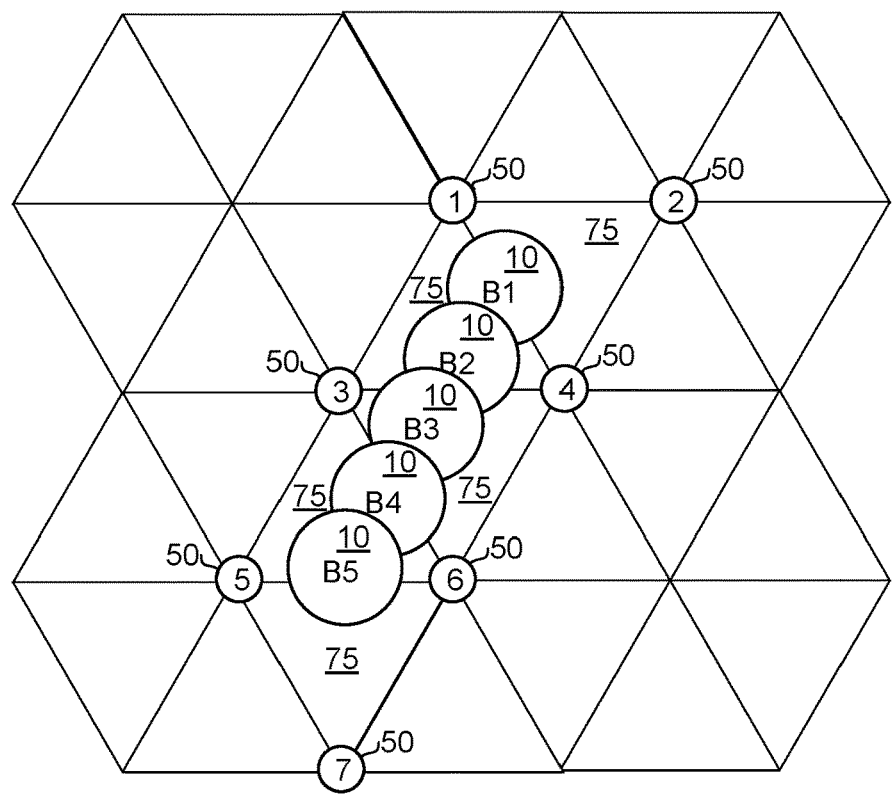
FIG. 13b is a relational view of an exemplary spatio temporal relationship between seven geo channels and five bubbles representing a region.

FIG. 13b is a relational view of an exemplary relationship between seven geo channels and five bubbles representing a region. Geo channel 50 labelled 1 7 delimit five spatio temporal area 75 whereat is situated relative thereto a set of five bubble 10 labelled B1 B5. The rectangular space time region 100 of FIG. 13a is approximated by a set of bubbles B1 B5. The set of bubbles B1 B5 used to approximate the rectangular space time region 100 appear as a single entity. To this end, in some embodiments all of the bubbles B1 B5 have the exact same content and are tagged with the union of geo channel 50 each bubble 10 would be tagged with individually. This ensures a message sent from inside one of the bubble 10 B1 B5 forming the set will be broadcast in real time to all device 82 within any bubble 10 in the set. Also in some embodiments, all bubble 10 B1 B5 in the set share some common bubble other information 12 such as a same unique region ID. When becoming aware of a bubble 10 in the set a device 82 then has all the information necessary to retrieve all bubble 10 B1 B5 in the set if required: it knows all geo channel 50 associated with the set of bubble 10 B1 B5 hence the geo channel server information 56 including the Url of all bubbles server 66 where bubble 10 B1 B5 in the set are stored.

Figure 14:
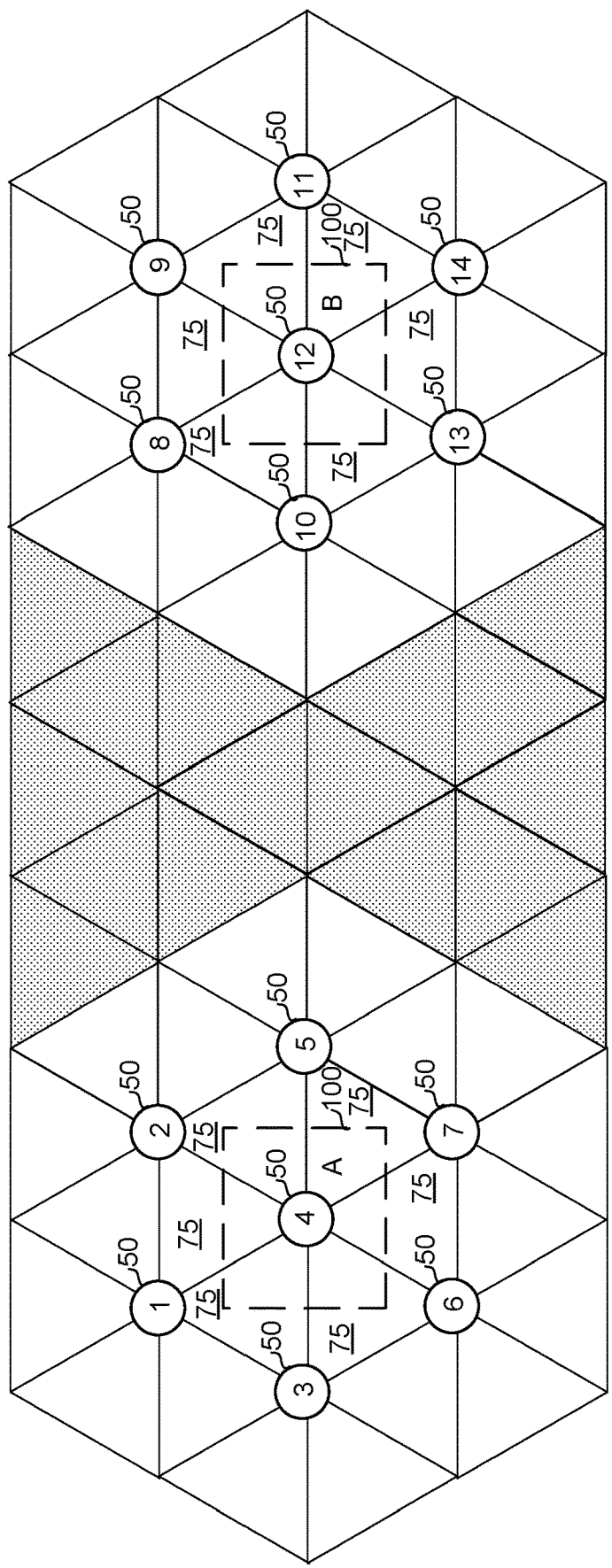
FIG. 14 is a relational view of an exemplary spatio temporal relationship between fourteen geo channels and a two part region.

FIG. 14 is a relational view of an exemplary spatio temporal relationship between fourteen geo channels and a two part region. Geo channel 50 labelled 1 7 delimit six spatio temporal area 75 whereat is situated relative thereto a first portion A of space time region 100. Geo channel 50 labelled 8 14 delimit another six spatio temporal area 75 whereat is situated relative thereto a second portion B of space time region 100 B. The space time region 100 of this example is instantaneously in two parts A B and more generally can be in 4 dimensional space time such that parts A and B may only exist at certain locations in space and at certain points in time.

Figure 15:
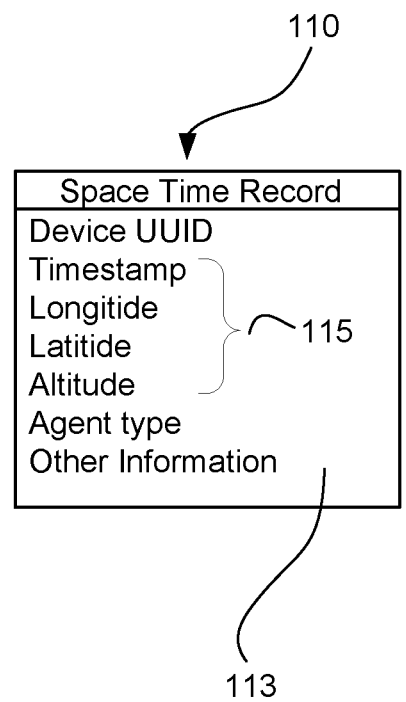
FIG. 15 is a data structure view of an exemplary space time record data structure.

FIG. 15 is a data structure view of an exemplary space time record 110 data structure. Space time record 110 includes space time record spatio temporal information 115 as well as space time record other information 113. Space time record 110 spatio temporal information can include for example at least one of a timestamp, longitude, latitude and altitude. Space time record other information 113 can include for example at least one of a device 82 UUID, Agent type and more generally Other Information. Operationally, in some embodiments a device 82 will be connected to at least three geo channel 50 at any time and thus possibly to one or more space time record server 68. Each time the location of a device 82 changes significantly (what significantly is determined by the device 82 depending on the application) a space time record 110 is sent by the device 82 to the appropriate space time record server 68. This space time record 110 is stored in the associated space time record database 69 and in some embodiments contains at least the following information: space time record spatio temporal information 115 (e.g. new location, timestamp) and space time record other information 113 (e.g. user id, agent type). This enables the tracking of movements of device 82 in general and the creation of bubble 10 in the past (e.g. where the start date can be inferred to be before the creation date from the bubble spatio temporal information 14 of a bubble 10).

Figure 16A:
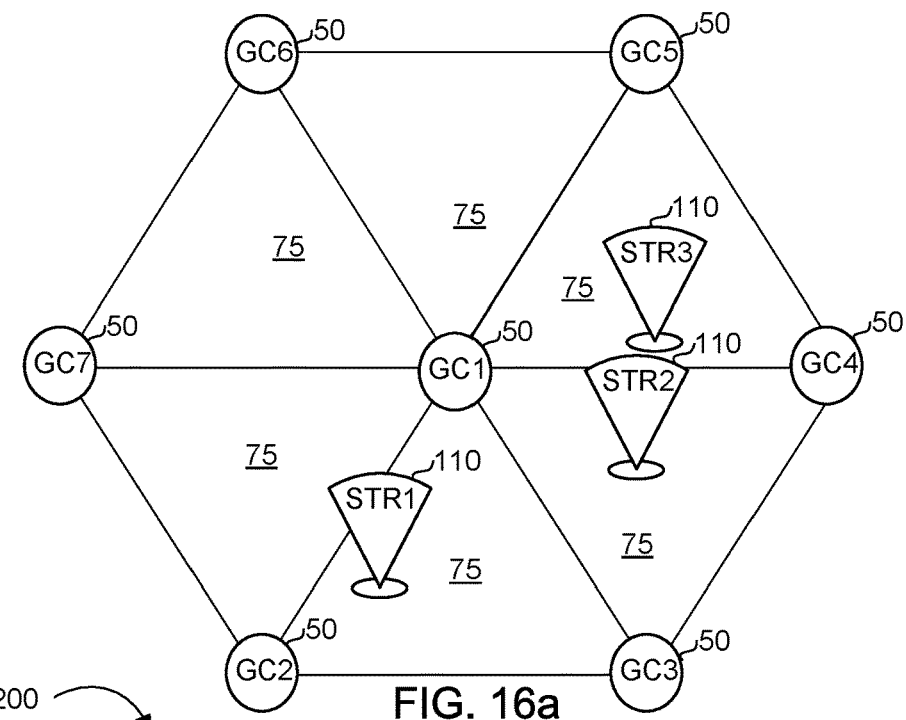
FIG. 16a is a relational view of an exemplary spatio temporal relationship between seven geo channels and three space time records.

FIG. 16a is a relational view of an exemplary spatio temporal relationship between seven geo channels and three space time records. Geo channel 50 labelled GC1 GC7 delimit six spatio temporal area 75 whereat are situated relative thereto three space time record 110 labelled STR1 3. Space time record 110 STR1 is situated in the spatio temporal area 75 delimited by geo channel 50 GC1, GC2 and GC3. Space time record 110 STR2 is situated in the spatio temporal area 75 delimited by geo channel 50 GC1, GC3 and GC4. Space time record 110 STR3 is situated in the spatio temporal area 75 delimited by geo channel 50 GC1, GC4 and GC5. Consequently, only the set of geo channel 50 GC1 5 are involved in communications related to space time record 110 STR1, STR2 and STR3.

Figure 16B:
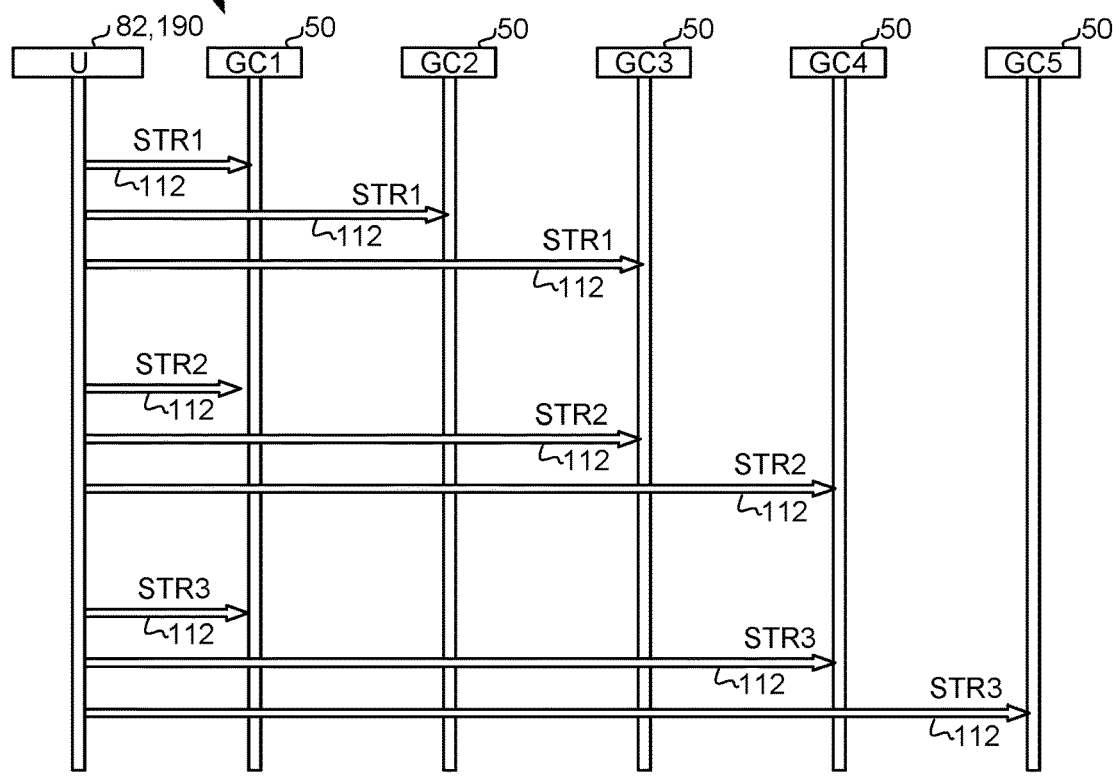
FIG. 16b is a signalling view of an exemplary space time record signalling.

FIG. 16b is a signalling view of an exemplary space time record 110 signalling Communications between a device 82 U and geo channel 50 GC1 GC5 are illustrated. Time generally flows downward in FIG. 16b. Device 82 U sends space time record message 112 STR1 to geo channel 50 GC1, GC2 and GC3. What is meant by this is that since device 82 U is situated in the spatio temporal area 75 delimited by geo channel 50 GC1, GC2 and GC3, device 82 U knows the geo channel server information 56 associated with each of geo channel 50 GC1, GC2, and GC3, and therefore for example can send space time record 110 STR1 to the space time record server 68 whose Url is stored in the geo channel server information 56 contained in the respective geo channel 50 GC1, GC2 and GC3. The order that device 82 U sends the space time record message 112 STR1 is illustrative only and could be simultaneous, or in any other permutation. At a later point in time, device 82 U has changed its location significantly and is now situated in spatio temporal area 75 delimited by geo channel 50 GC1, GC3 and GC4. Consequently, device 82 U sends space time record message 112 STR2 to geo channel 50 GC1, GC3 and GC4. Again at a later point in time, device 82 U has changed its location significantly and is now situated in spatio temporal area 75 delimited by geo channel 50 GC1, GC4 and GC5. Consequently, device 82 U sends space time record message 112 STR3 to geo channel 50 GC1, GC4 and GC5. In some embodiments, such other notification message could be sent via email, instant messaging, SMS, or any other form of communication. The conditions for sending such notification could be to devices whose space time path 140 cross the bubble 10, or have another need to know, according to predetermined criteria that depend on the application.

Figure 16C:
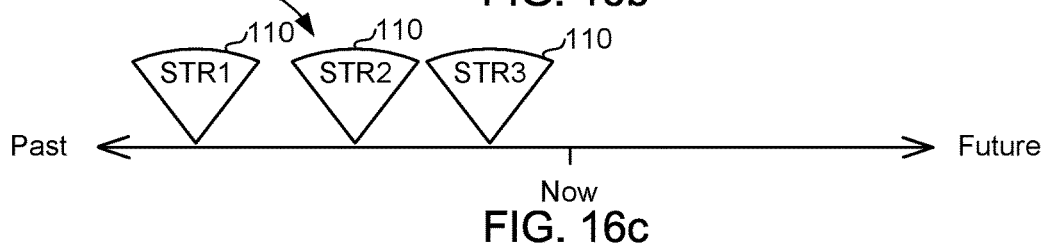
FIG. 16c is a timeline view of an exemplary timeline of three space time records.

FIG. 16c is a timeline view of an exemplary timeline of three space time records. The time portion of space time record spatio temporal information 115 of space time record 110 STR1, STR2 and STR3 are shown relative to each other and to the present time (labelled as Now) in a timeline spanning past and future points in time.

Figure 17A:
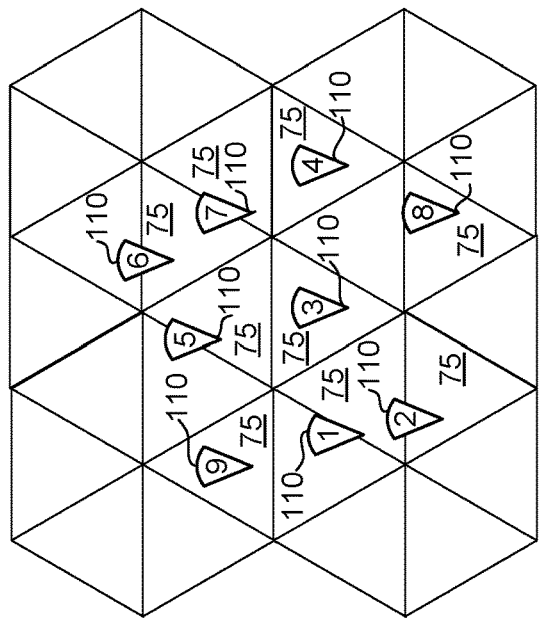
FIG. 17a is a relational view of an exemplary spatio temporal relationship between nine space time records.

FIG. 17a is a relational view of an exemplary spatio temporal relationship between nine space time records. Spatio temporal area 75 are illustrated whereat are situated relative thereto space time record 110 labelled 1 to 9.

Figure 17B:
FIG. 17b is a timeline view of an exemplary timeline of nine space time records.

FIG. 17b is a timeline view of an exemplary timeline of nine space time records. The time portion of space time record spatio temporal information 115 of space time record 110 labelled 1 to 9 are shown relative to each other and to the present time (labelled as Now) in a timeline spanning past and future points in time.

FIG. 18a is a relational view of an exemplary spatio temporal relationship between two bubbles and nine space time records. Spatio temporal area 75 are illustrated whereat are situated relative thereto space time record 110 labelled 1 to 9 and bubble 10 1 and bubble 10 2. Space time record 110 1 and 2 are located in positions that coincide within the spatial boundaries of bubble 10 1. Space time record 110 5, 6 and 7 are located in positions that coincide within the spatial boundaries of bubble 10 2. Space time record 110 labelled 3, 4, 8 and 9 are located in positions that are outside the spatial boundaries of bubble 10 1 and bubble 10 2.

FIG. 18b is a timeline view of an exemplary timeline of two bubbles and nine space time records. The time portion of space time record spatio temporal information 115 of space time record 110 labelled 1 to 9 are shown relative to each other and to the present time (labelled as Now) in a timeline spanning past and future points in time. The lifespan of bubble 10 1 and bubble 10 2 are depicted by respective bubble lifespan 114. As shown, space time record 110 labelled 1 5 are situated in time outside of the lifespan of either bubble 10 1 or 2. Space time record 110 6 9 are situated in time inside the lifespan of bubble 10 2. There are no space time record 110 situated inside the lifespan of bubble 10 1. Bubble lifespan 114 for bubble 10 2 is retroactive, hence, in view of both spatial and temporal information, it is only space time record 110 6 and 7 that are inside bubble 10 2 at least at the present time. As time moves forward from the point labelled Now, new space time record 110 may be created within both the spatial and temporal boundaries of bubble 10 1 or bubble 10 2, and therefore would be considered inside bubble 10 1 or bubble 10 2.

FIG. 19a is a relational view of an exemplary spatio temporal relationship between three geo channels, a bubble 10, and two space time records. Geo channel 50 GC1, GC2 and GC3 delimit spatio temporal area 75 whereat is situated relative thereto two space time record 110 STR1, STR2 and bubble 10 1. As shown, the spatial portion of space time record spatio temporal information 115 of space time record 110 STR1 and STR2 are situated within the boundary of the spatial portion of bubble spatio temporal information 14 of bubble 10 1.

FIG. 19b is a signalling view of an exemplary space time record 110 and bubble 10 content signalling Time flows downward in the signalling view depicted in FIG. 19b and can be considered in relation to FIGS. 19a and 19c. Device 82 U sends space time record message 112 STR1 to space time record server 68 associated with GC1, GC2 and GC3. The space time record server 68 sends bubble contents message 116 to the device 82 associated with STR2.

FIG. 19c is a timeline view of an exemplary timeline for a bubble 10 and two space time records. The time portion of space time record spatio temporal information 115 of space time record 110 labelled STR1 and STR2 are shown relative to each other and to the present time (labelled Now) in a timeline spanning past and future points in time. Bubble lifespan 114 for bubble 10 1 captures the spatio temporal information of space time record 110 labelled 2 such that it is considered to be inside bubble 10 1 whereas space time record 110 labelled 1 is not.

Figure 20:
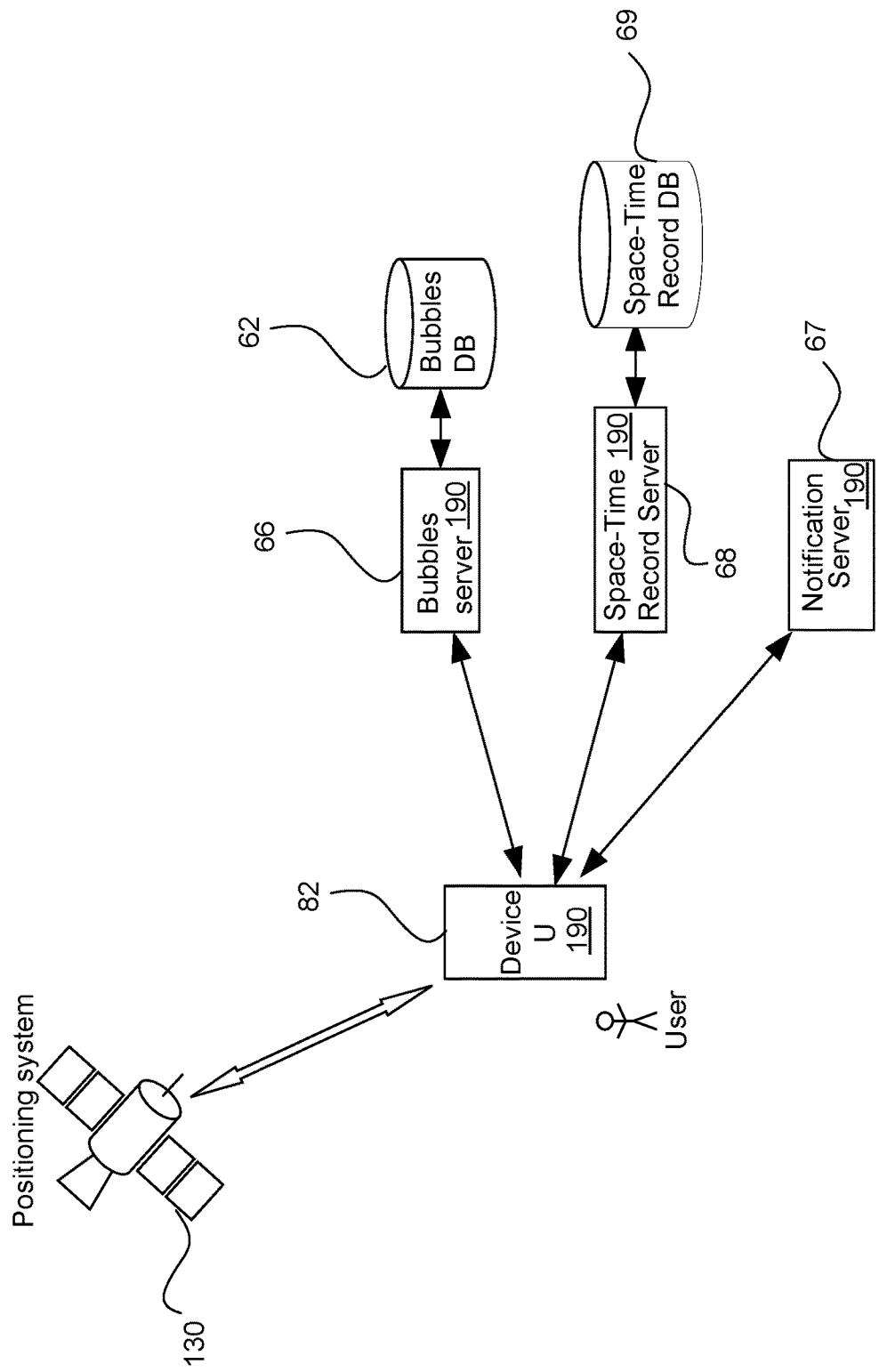
FIG. 20 is a relational view of an exemplary relation between a device and three servers.

FIG. 20 is a relational view of an exemplary relation between a device 82 and three servers. Device 82 U is location aware due to compatibility with one or more techniques for determining its position such as positioning system 130. Device 82 U is also capable of communicating with one or more servers such bubbles server 66, space time record server 68 and notifications server 67. Bubbles server 66 is an application server enabling device 82 U to query one or more bubbles database 62. Space time record server 68 is an application server enabling device 82 U to query one or more space time records database. Notifications server 67 enables device 82 U to either receive or send notifications to or from other nodes or devices. Although the various servers and positioning system illustrated are shown as separate entities, it is contemplated that in some embodiments, these servers and/or positioning systems may be hosted on one or more nodes as needed by a specific application. Operationally, what is shown is an implementation of a platform in order to highlight some concepts, as well as the point of view of a user. As shown, bubbles server 66, notifications server 67, and space time record server 68, and a positioning system 130 enable a mobile devices with Internet access to derive its position and interact with the servers. In one embodiment the mobile device 82 U is typically a Smartphone or a tablet but can be any device 82 capable of Internet connection, whether mobile or not, executing computer readable instructions capable of obtaining information about the position of device 82 U and sending https requests in order to create bubbles or retrieve them and connecting to a server via web sockets protocol. The positioning system is any system that the mobile device 82 can interact with in order to obtain information about its position, or in some cases, can be a hard coded position for non mobile nodes. Bubbles server 66 manages the creation, updating, reading and deleting of bubbles. Notifications server 67 is responsible for notifying users about various events occurring related to bubbles. The space time record 110 server serves tracking and messaging purposes. In some embodiments some of those components could be absent as will be explained below under the heading ALTERNATIVE EMBODIMENTS.

Figure 21:
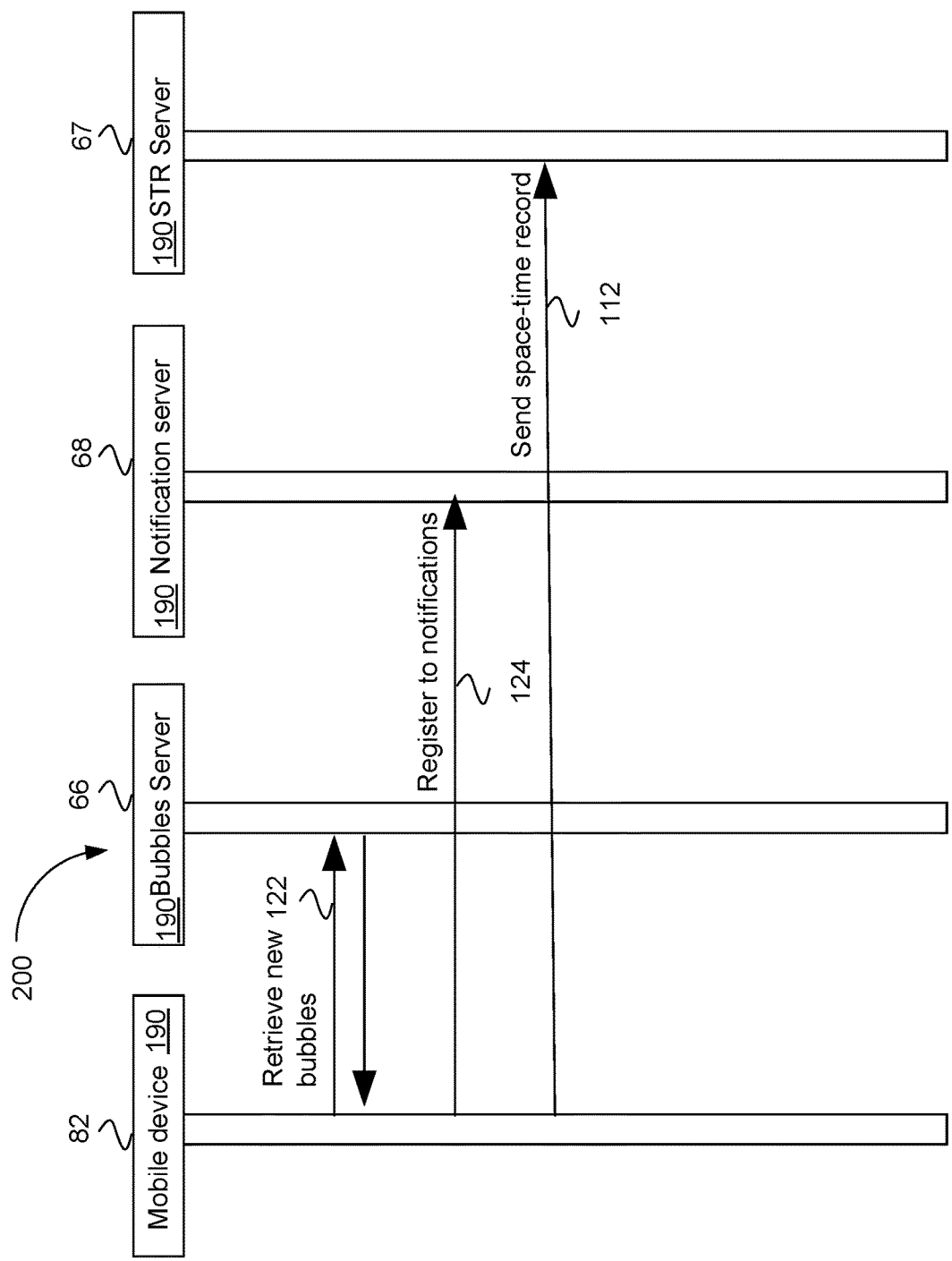
FIG. 21 is a signalling view of an exemplary device and server signalling.

FIG. 21 is a signalling view of an exemplary device 82 and server signalling Mobile device 82, bubbles server 66, notifications server 67 and space time record server 68 participate in signalling Messages sent from mobile device 82 include retrieve new bubbles message 122, register to notifications message 124 and space time record message 112 to bubbles server 66, notifications server 67, and space time record server 68 respectively. Mobile device 82 receives bubbles from bubbles server 66, and although not explicitly shown, in some embodiments notifications or space time records from notification server or space time record server 68. Depicted are the main events occurring upon computer readable instruction initialization: registering the user (if needed), retrieving bubbles, registering to the notification server and sending a space time record 110 STR via a space time record message 112 to the space time record server. Upon sending the first STR, user information about the mobile device 82 will be stored on the space time record server 68 so that it knows how to notify the mobile device 82 when needed. Operationally, when a user starts the computer readable instructions (client application) in the mobile device 82, a sequence of events is triggered. First, although not shown, the computer readable instructions in the mobile device 82 will try to acquire location information for the mobile device 82 it executes on: this could be using a positioning system or using the last known location for the mobile device 82, or in the case of a non mobile device 82 a predetermined location. Then a request is made to the bubbles server 66 such as retrieve new bubbles message 122 in order to retrieve bubbles that were created or modified since the last time such a request was made. In an alternative embodiment, all current bubbles are sent. In one embodiment, one of the parameters sent to the bubbles server 66 is a unique ID for the mobile device 82 which the bubbles server 66 uses to match the request with a user it has in its bubbles database 62. If this is the first time such a request is made a new user will be created in the bubbles database 62. The response of the request is a list of bubbles which the computer readable instructions enable the mobile device 82 to store and manage locally. A third event that takes place is that the computer readable instructions in the mobile device 82 registers the mobile device 82 with the notifications server 67, such as using register to notifications message 124 in order to receive in realtime notifications such as bubble 10 creation, new answers to bubbles, bubble 10 state changes etc. The fourth event that takes place is the sending of a data structure containing the unique ID of the device 82, its current location and a time stamp to the space time record server 68. That data structure is a space time record 110 (STR).

Figure 22A:
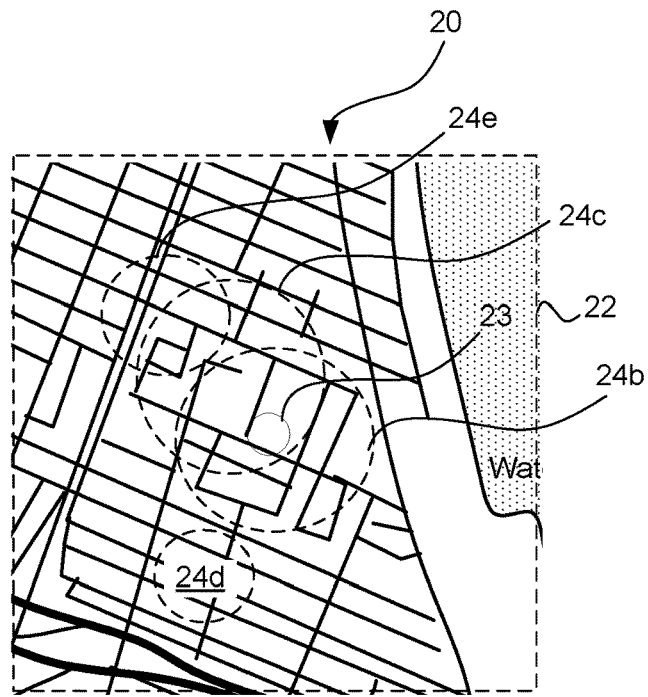
FIG. 22a is a user interface view of an exemplary bubble user interface.

FIG. 22a is a user interface view of an exemplary bubble 10 user interface. Operationally, in some embodiments, the computer readable instructions in the mobile device 82 will monitor the mobile device 82 position and match it against bubbles it has stored locally to determine relevant bubbles, such as for example bubbles the device 82 is currently inside of. In some embodiments, this is done periodically. In some embodiments, the main feed of the user interface 20 includes a summary of the information contained in each bubble 10 whose bubble spatio temporal information 14 instantaneously contains the location of the mobile device 82. In some embodiments, this list of relevant bubbles will change dynamically with user movements, or if the bubble spatio temporal information 14 changes or bubbles are created and their lifespan either begins or ends. The map foam view 22 (or Foam map bubble view 32) will display all the bubbles such as bubble 10 be the computer readable instructions determines to be relevant on a map along with a location interface element 23 such as an icon representing the location of the device 82. In some embodiments, each time the location of the device 82 changes significantly a new STR will be sent to the space time record server 68. Computer readable instructions executable in mobile device 82 determine which bubbles are containing the device 82 at any time. Here the circles on the map represent bubbles, two of which 24*b* and 24*c* contain the device 82 whose location is represented as a blue circle with a white border 23. Computer readable instructions executable in mobile device 82 will make available to the user only the information associated with the bubbles the device 82 is intend to view, such as bubbles in which the device 82 location is contained in. That information will appear in the main feed of the user interface 20.

Figure 22B:
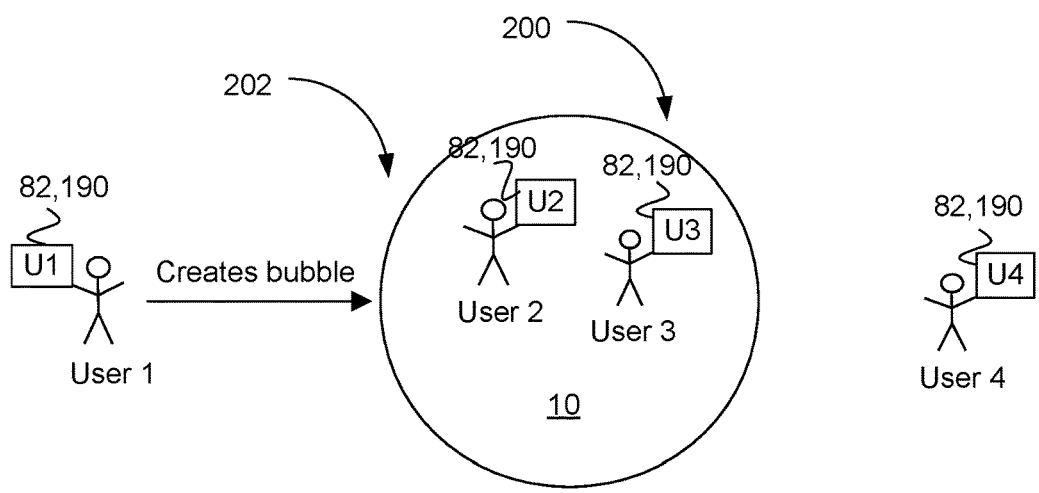
FIG. 22b is a relational view of an exemplary spatio temporal relationship between three devices and a bubble.

FIG. 22*b* is a relational view of an exemplary spatio temporal relationship between three devices and a bubble 10. Device 82 U1 creates a bubble 10. Since device 82 U2 and device 82 U3 are contained in the bubble 10, in this example the only condition required for access, the devices have access to the information contained in the bubble 10. Device 82 U4 may be notified of the creation of the new bubble 10 but the bubble 10 may only be visible on the map of the user interface 20 running on it, not revealing its content to user 4 of device 82 U4 since device 82 U4 has not met the condition for access. Operationally, in some embodiments, the creation of a bubble 10 from the user's perspective involves choosing its size and location on a map (both or either of which can have default values), possibly targeting groups of individuals represented as anonymous dots or user icons, or entering text information and joining a picture (chosen from a gallery in the mobile device 82 or taken on the spot with its camera). In some embodiments, when the user interacts with the user interface 20 operating at a device 82, such as by hitting a 'create' button, the bubble 10 creation sequence is initiated. First a POST request is sent to the bubbles server 66 in order to save the bubble 10 in its bubbles database 62. Upon successful creation, a bubble 10 data structure stamped with a unique id is returned to the computer readable instructions executed in the device 82. Once the bubble 10 creation is determined to be successful, the bubble 10 data structure returned by the bubbles server 66 is sent to the notifications server 67 in order to notify other mobile devices of the existence of a new bubble 10. Mobiles devices receiving the notification will store the bubbles locally and they will be considered among others during each 'inclusion monitoring loop'. They will be visible in the bubbles view map but will appear in the main feed only if/when it is determined appropriate to do so, such as if they contain the location of the device 82.

Figure 23:
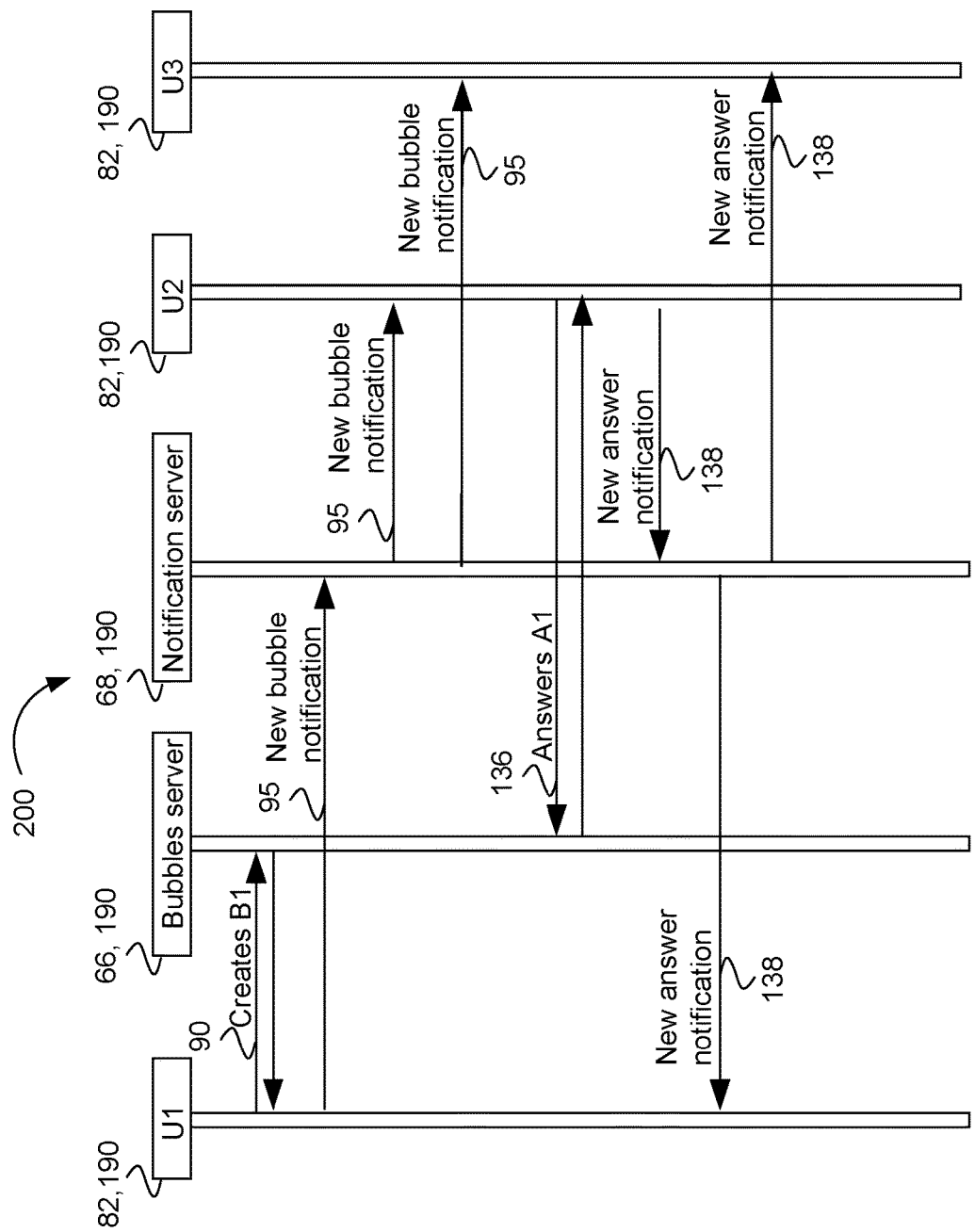
FIG. 23 is a signalling view of an exemplary bubble creation and answer signalling.

FIG. 23 is a signalling view of an exemplary bubble 10 creation and answer signalling Device 82 U1, U2 and U3 communicate via bubbles server 66 and notifications server 67. Device 82 U1 sends create bubble 304 message B1 to bubbles server 66, and new bubble notification message 95 to notifications server 67, as well as receiving new answer notification 138 message from notification server. Bubbles server 66 receives create bubble 304 message B1 from device 82 U1, and answer message 136 A1 from device 82 U2. Notification server receives new bubble notification message 95 from device 82 U1 and sends new bubble notification message 95 to device 82 U2 and device 82 U3, receives new answer notification 138 from device 82 U2, and sends new answer notification 138 to device 82 U1 and device 82 U3. In some embodiments, most kinds of bubbles are characterized by a main message which can be a request, a discussion topic, pictures or videos, for instance. They often allow commenting which happens in realtime for users who are online. As such each bubble 10 is potentially an interaction space in itself. Bubble 10 answers are stored on the bubbles server 66. The realtime aspect of answering bubbles is handled by the notifications server 67 as illustrated in FIG. 23. Operationally, the computer readable instructions executing on device 82 U1 creates bubble 10 B1 which is sent to the bubbles server 66. B1 could contain a message such as 'is there someone here?'. Once the response is received confirming the creation of the bubble 10 B1, the computer readable instructions operating in device 82 U 1 sends a new bubble notification message 95 to the notifications server 67 which then broadcasts the data structure representing the new bubble 10 to device 82 U2 and device 82 U3. Computer readable instructions executable in device 82 U2 then answers bubble 10 B1. The answer could be something such as 'yes I'm here' obtained from the user interface 20 provided by computer readable instructions executing in device 82 U2. Device 82 U2 sends the answer to the bubbles server 66 which saves the answer in its bubbles database 62. Bubbles server 66 confirms that the answer was received to device 82 U2 which then sends the validated answer to the notifications server 67 via new answer notification 138. The notifications server 67 then sends (e.g. broadcasts) the answer to device 82 U1 and device 82 U3. The answer will be made available to users of device 82 U1 and U2 if it is deemed appropriate, e.g. if they still are in the bubble 10 B1, or according to a rule that could be relaxed such that they would be notified even if they left the bubble 10.

Figure 24A:
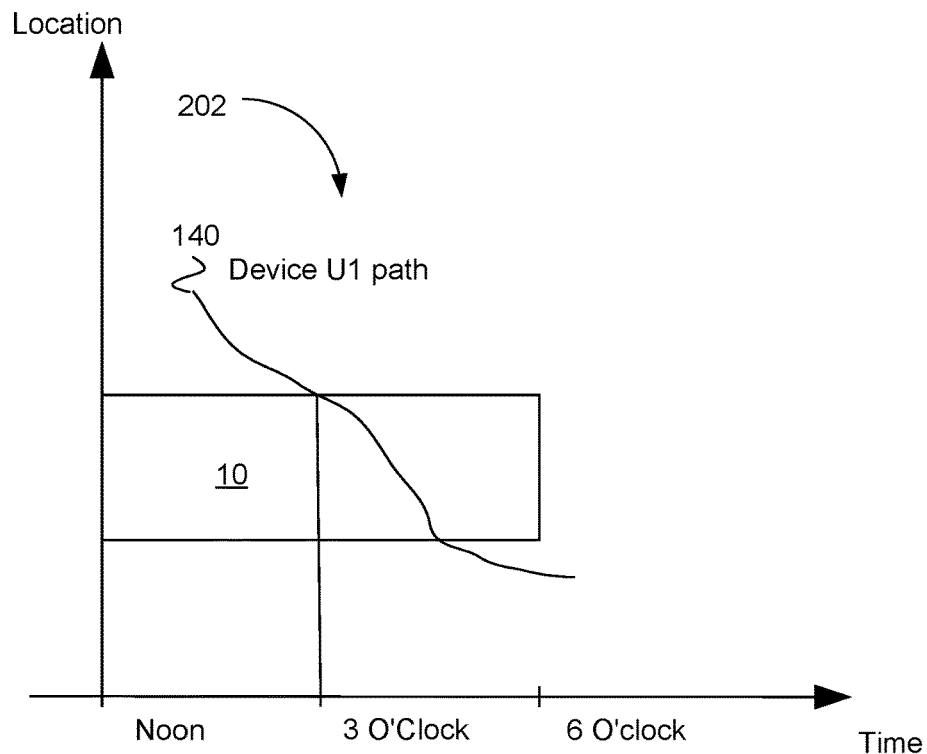
FIG. 24a is a timeline view of an exemplary path of a device in relation to a bubble.

FIG. 24*a* is a timeline view of an exemplary path 140 of a device 82 in relation to a bubble 10. Depicted is a user device 82 U1 trajectory in space time. The vertical axis represents location (which really consists of 3 spatial dimensions: longitude, latitude and altitude, but for brevity is illustrated as distance from the origin of the vertical axis) and the horizontal axis represents time. The rectangle represents the space time region 100 a bubble 10 takes in space time. We can see that the bubble 10 starts to exist at noon and ends at 6 o'clock. The curved line represents the path 140 that device 82 U1 takes as it is moving in space time. Device 82 U1 enters the bubble 10 at 3 o'clock and exits approximately an hour and a half later. During that time the user holding device 82 U1 should have access to the bubble's contents. More generally, consider space and time dimensions together and user movements as paths in that 4 dimensional space (longitude, latitude, altitude ant time). Bubbles are volumes in that 4D space time and mobile devices moving on (or even beneath and above) the surface of the earth can be pictured as paths in that space. Each path 140 naturally has a unique ID, which is the unique ID of the device 82. If a device's path 140 intersects the volume occupied by a bubble 10 in the 4D space time this means that the device 82 has been, is, or will be in the bubble 10 at some point in time. In such a case and when this is the case the computer readable instructions executable in the device 82 will make the contents of the bubble 10 accessible to the user of that device 82. Furthermore, users having access to the bubble's contents can also interact. Viewed in this manner, bubbles are a way to select a group of individuals by cutting a specific volume in space time and allow them to access a definite piece of information and discuss.

Figure 24B:
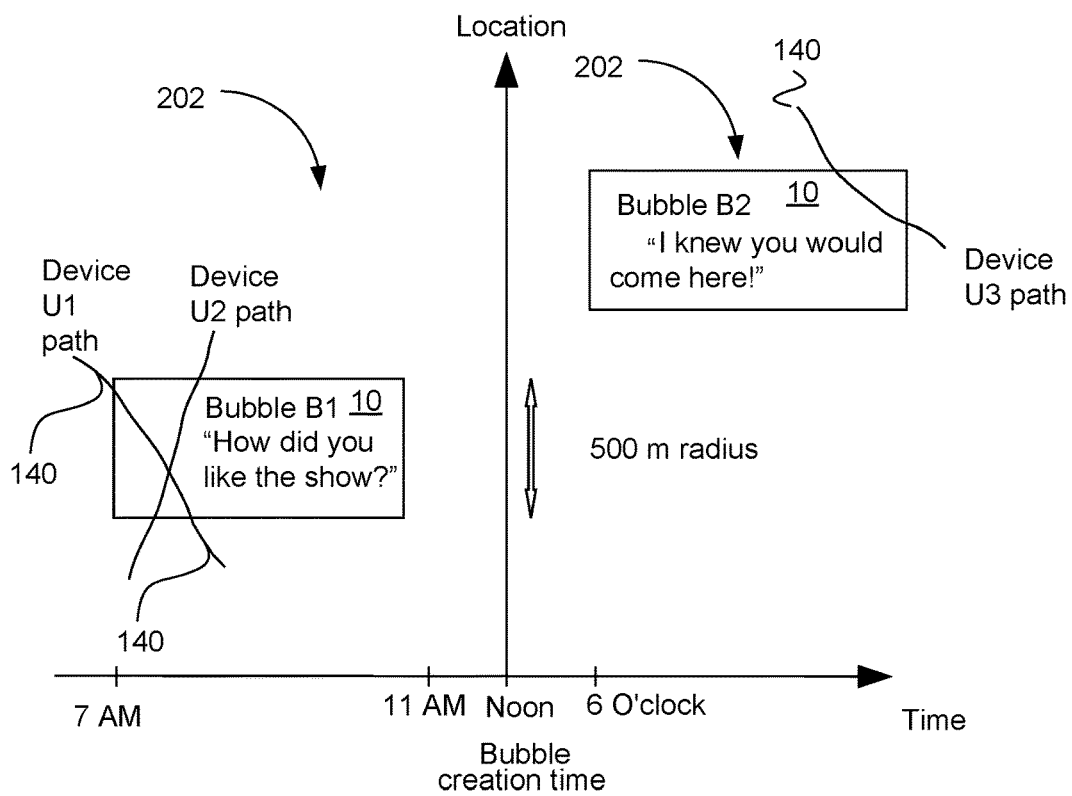
FIG. 24b is a timeline view of an exemplary path of three devices in relation to two bubbles.

FIG. 24*b* is a timeline view of an exemplary path 140 of three devices in relation to two bubbles. Device 82 U1 path 140 and device 82 U2 path 140 intersect bubble 10 B1 whereas device 82 U3 path 140 intersect bubble 10 B2.

Operationally, in this example, bubble 10 B1 is created in the past and bubble 10 B2 is created in the future. More precisely bubble 10 B1 is created at noon but its lifespan is specified to be in the past: from 7 AM to 11 AM. Bubble 10 B2 is also created at noon but is configured to start its lifespan at 6 O'clock and expire a few hours later. Bubble 10 B1 contains the message 'how did you like the show?' and bubble 10 B2 has the message: 'I knew you would come here'. The bubble 10 B1 and B2 are created at different locations and have approximately the same radius which is 500 m. Since device 82 U1 and device 82 U2 have path 140 that intersect bubble 10 B1, those two device 82 U1, U2 will be notified with a message containing the message in bubble 10 B1: 'how did you like the show?'. The path 140 of device 82 U3 is crossing bubble 10 B2 sometime in the future. When this happens then device 82 U3 will be notified with the message: 'I knew you would come here'. The lifespan of bubbles can be specified in certain contexts. It is delimited by a start time and an end time. When the end time of a bubble 10 is reached it will cease to exist from the user's point of view and it's contents will no longer be available in the standard way. That is there is no means to enter inside a bubble 10 that has ceased to exist. However the communication platform allows to create bubbles with arbitrary start time and end time values in particular a start time that can be in the past. This is useful in cases where one would like to reach users that were at a certain location during a certain period in the past. This is where Space Time Records are useful.

Figure 25:
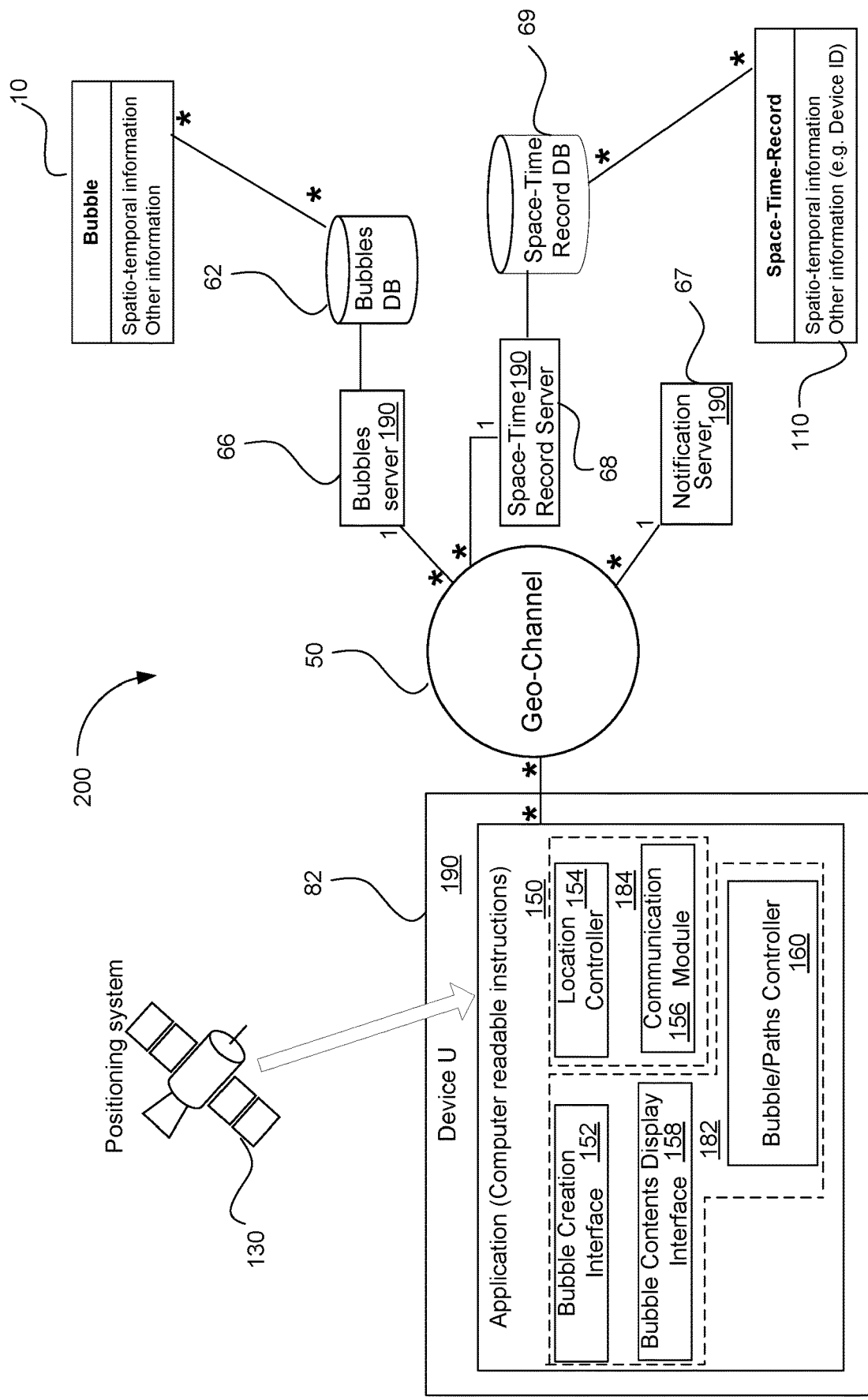
FIG. 25 is a relational view of an exemplary relation between an application, a geo channel, and three servers.

FIG. 25 is a relational view of an exemplary relation between an application, a geo channel 50, and three servers. Client application 150 includes bubble creation interface 152, location controller 154, bubble contents display interface 158, communication module 156, and bubble paths controller 160. The client application 150 running on the mobile device 82 U in this example has the following main components: bubble creation interface 152, bubble contents display interface 158, location controller 154, bubble paths controller 160 and communication module 156 (http/websockets). One or more client application 150 are related to one or more geo channel 50. One or more geo channel 50 are related to a bubbles server 66, a space time record server 68, and a notification server. Each bubbles server 66 is treated to a bubbles database 62. Each space time record server 68 is related to a space time record database 69. One or more bubbles database 62 are related to bubbles data structures. One or more space time record database 69 are related to space time record 110 data structures. Operationally, the bubble creation interface 152 may be a human machine interface but can also be a source of data for the fields of a bubble 10 data structure at the time of creation. A possible embodiment may consist of a view with map, a text field and other user interface components that allow adding pictures or videos to a bubble 10 data structure. The bubble creation interface 152 may also include software or hardware that produce bubbles according a some (hardcoded or not) data and instructions set. In an extremely simple case the bubble creation interface 152 could include an apparatus that when powered on will publish a single bubble 10 with fixed diameter, position and data to the bubbles server 66. The bubble contents display interface 158 need not be present in all embodiments of a client application 150. In some specialized implementations, a client application 150 could have bubble 10 creation as its single function. In other implementations such as smartphone (or desktop) client application 150 the bubble contents display interface 158 may include a view of the main feed complemented with a map view where bubbles are displayed. In the case of a fixed location client application such as an advertising board the display panel would be the bubble contents display interface 158. In an alternative embodiment, the general case the location controller 154 is responsible to monitor location and make it available to other components of the client application 150 such as the bubble creation interface 152 and the bubble paths controller 160. In some embodiments the location controller 154 may communicate with a GPS chip and machine executable code that periodically monitors location data and signals significant changes in its value or accuracy to other parts of the client application 150. In some embodiments the contents display interface may simply consist of fixed location data stored locally and accessible to other parts of the client application 150. The bubble paths controller 160 is responsible for monitoring when user or device 82 space time paths cross locally stored bubbles and make bubble 10 data available to other parts of the client application 150 when such crossings are found. In one embodiment, the bubble paths controller 160 will simply determine which bubbles the device 82 is currently inside of, among locally stored bubbles. When this is the case, bubble 10 contents could be displayed in a feed readable by the user of the client application 150. A bubble 10 board to which the public would submit bubbles to be displayed would have a simple bubble paths controller 160 who would determine if bubbles sent to it are indeed containing the board (ft it is indeed the target of the bubbles) and determine when it is time to display them (in the case of pre programmed bubbles). A bubble 10 board could accept or not bubbles created in the past, depending on the context. The communication module 156 ensures communication (e.g. http/websockets communication) with the servers. Other communication protocols may be supported in alternative embodiments.

Figure 26:
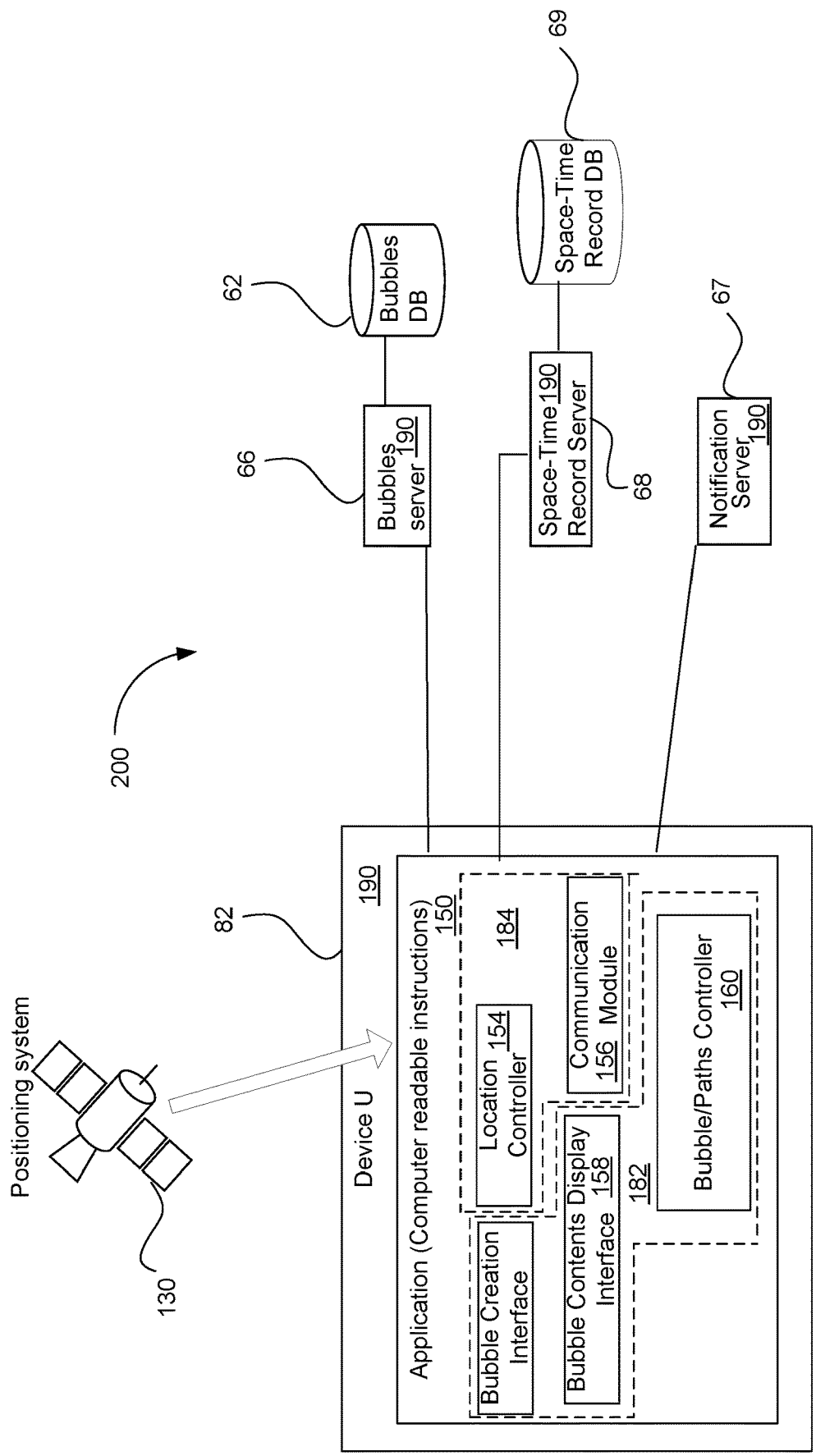
FIG. 26 is a relational view of an exemplary relation between an application and three servers.

FIG. 26 is a relational view of the exemplary relation between an application and three servers. Client application 150 includes bubble creation interface 152, location controller 154, bubble contents display interface 158, communication module 156, and bubble paths controller 160. As compared to the exemplary embodiment of FIG. 25, geo channel 50 is not utilised and instead the client application 150 communicates directly with bubbles server 66, space time record server 68 and notification server. Client application 150 includes bubble creation interface 152, location controller 154, bubble contents display interface 158, communication module 156, and bubble paths controller 160. The client application 150 running on the mobile device 82 U in this example has the following main components: bubble creation interface 152, bubble contents display interface 158, location controller 154, bubble paths controller 160 and communication module 156 (http/websockets). One or more client application 150 are related to one or more bubbles server 66, space time record server 68, and notification server. Each bubbles server 66 is related to a bubbles database 62. Each space time record server 68 is related to a space time record database 69. One or more bubbles database 62 are related to bubbles data structures. One or more space time record database 69 are related to space time record 110 data structures. Operationally, the client application 150 has a bubble contents display interface 158, a bubble creation interface 152, a bubble paths controller 160, location controller 154 (e.g. GPS capabilities), and a communication module 156. The client application 150 allows reception and creation of bubbles. It sends space time records when the device 82 position changes significantly allowing retroactive notifications to users that were at a certain place at a certain moment. The client application 150 allows delayed messages to users arriving at certain locations in the future. The client application 150 allows, in general, users to interact with others that are, have been or will be at the same location. Advantageously, communications are based space time regions (on location over a lifespan) and not on the identity of users. In one embodiment, the client application 150 is in a device 82 that is a bubble board: a simple outdoors bulletin board to which users may publish bubbles. Such an apparatus includes: a screen where bubble 10 contents would be displayed; a bubble paths controller 160 that determines if or when the board is inside bubbles it receives (it would show bubbles during their lifespan if and only if they geographically include the board); and a communication module 156 to receive published bubbles. In one embodiment, the client application 150 is provided in a device 82 which is a computer (desktop, tablet, or laptop) or web application (accessible through a web browser). The computer or web application embodiment includes a bubble creation interface 152, in some embodiments a fixed or pre determined location, a communication module 156, and a bubble contents display interface 158. A computer or web application embodiment allows a user to login to his account and create bubbles. In some embodiments, the location is fixed or pre determined, e.g. based on an address supplied by the user when registering. Such an embodiment includes: a bubble creation interface 152 to create bubbles to be broadcast to chosen locations; a communication module 156; an interface that allows choosing a region to login from (e.g, this would allow downloading appropriate geo channels information prior to login); and a login mechanism Such a system can be used by restaurants/retailers to easily publish deals around them (or to a target region of their choice). It is contemplated that in some embodiments, device 82 can be a bubble activated device 82 that is capable of receiving bubbles and interpreting basic information they contain in order to perform actions. Such devices would not have any user interface to create or display bubbles. Such embodiments include: a communication module 156 (e.g. to connect to the notification server); a bubble paths controller 160 (a simple bubble 10 inclusion verifier); and a function to be triggered when a bubble 10 is found to include the device 82 (e.g. flash a light, lock/unlock a door, produce a sound/alert, send a message etc.). Advantageously, in some embodiments, the public is provided with a new way of reaching people based on time and location without compromising one's privacy. Bubbles being spatio temporal containers of information allow reaching people based on their spatio temporal paths. Further advantageously, in some embodiments, retailers, restaurants, advertising agencies use bubbles to enable a very easy way to reach potential customers based on where they were, are or will be. Yet further advantageously, in some embodiments, geo channels offer a scalable method of bubble 10 distribution/discovery across the globe.

FIG. 27 is a table view of an exemplary functionality enabled by corresponding data structure fields. Illustrated is a table representing functionality rules 162 regarding how certain exemplary functionality is enabled using exemplary data structure fields. Exemplary functionality shown includes: send persistent information to target area; send persistent information to target area of arbitrary shape; multi location shared content in realtime; historic browsable bubbles with multimedia contents; discussion groups based on initial location; discuss. group based on previously visited location; secret discussion group based on location; multi location secret discussion group; discuss. group based on future location; historic bubble 10 browser joinable discussion groups based on location; querying client apps located in a region of arbitrary shape; sending conditional instruction to client app being, having been or that will be in a certain location; and space time region based permission. Exemplary data structure fields include lifespan, bubble 10 key, shape, opacity, elasticity, and content type. In one embodiment, a bubble 10 contains spatio temporal information (e.g. creation date, start date, end date, longitude, latitude and diameter) and additional information. Advantageously, if for instance the additional information includes text, such a bubble 10 allows to send a text message anonymously to a location, targeting users or devices being at that location without prior knowledge of their identity or any contact information, contrary to many currently used techniques of communication such as phone, email, text messaging or the ones that most social networks offer to their users. In one embodiment, bubbles advantageously allow restricting access to shared information to a specific region delimited by its size and location. The other information called content could be any kind of multimedia information that users are willing to share with each other. In one embodiment, advantageously varying the values of the start time and end time, thus varying the lifespan of a bubble 10, access to information can be time restricted at the same time as being location restricted. In some embodiments, the bubble 10 key field is an alpha numeric value that serves as a password that unlocks one or more bubbles when entered in a client application 150, making bubbles go from a hidden state to an accessible one. Prior to their entry bubbles created with a bubble 10 key simply don't appear to exist from a user point of view even if the user is physically inside the space occupied by the bubble 10 during the lifespan of the bubble 10. This advantageously allows hiding information and making it available only to individuals knowing the key. If a bubble 10 contains a key to another bubble 10 in its content field for instance, this introduces a dependency between the second and first bubble 10. Repeating that dependency relationship between a set of bubbles allows creating a hierarchy of access to bubbles or a bubble 10 trail. Games where the user discover information based on various criteria leading to entering a bubble 10 key in the application can be implemented. The simplest kind of such a game would be a treasure hunt. More complex games such as real life fantasy roleplaying games could use that mechanism as a very simple way to organize space time region bound information related to the gameplay. Advantageously, bubble 10 keys allow to create arbitrarily complex networks of space time region bound information. A shape id value for a bubble 10 indicates that this bubble 10 is part of a complex shape made of generally more than one bubble 10. The shape need not be connected. A shape can cover part or the totality of a street, an building of arbitrary shape of a set of separated simple or complex shapes. Non connected shapes offer a way to share information between two or several possibly distant regions. Combined with bubble 10 keys, one has the possibility to create a network of dependent shapes. Again this can be useful in location based games, adding even more flexibility. By default, if the opacity is not specified, the bubble 10 is considered as opaque. This means the client application can only interact with its contents if its physical location falls within the space delimited by the bubble 10. In the example shown, 0 is used to indicate when a bubble 10 is not opaque for a specific functionality. By default in the case of an opaque bubble 10, access to its content strictly depends on the client application being inside the space delimited by the bubble 10. In some cases though it could be useful to allow a user to keep its access to the contents of a bubble 10 after he has left its area. It the case of bubbles created in the past, if we view them as discussion groups created from a selection of users that were at a certain place at a given moment (people who attended an event, were witness of an incident etc.) To allow this we add a field called Elasticity that we set to true. By default, if the field is absent, elasticity is considered as false: once a device 82 leaves a bubble 10 it has no longer access to its contents. In the example shown, x is used to indicate when Elasticity is set to true. In some embodiments, the computer readable instructions and client application 150 are provided on device 82 operating with one of the following operating systems: iOS™ from Apple™, Android™ from Google™, BlackBerry™ from BlackBerry™, Windows™ from Microsoft™ OSX™ from Apple™, Symbian™, QNX™, Unix, Linux, or the like.

Figure 28:
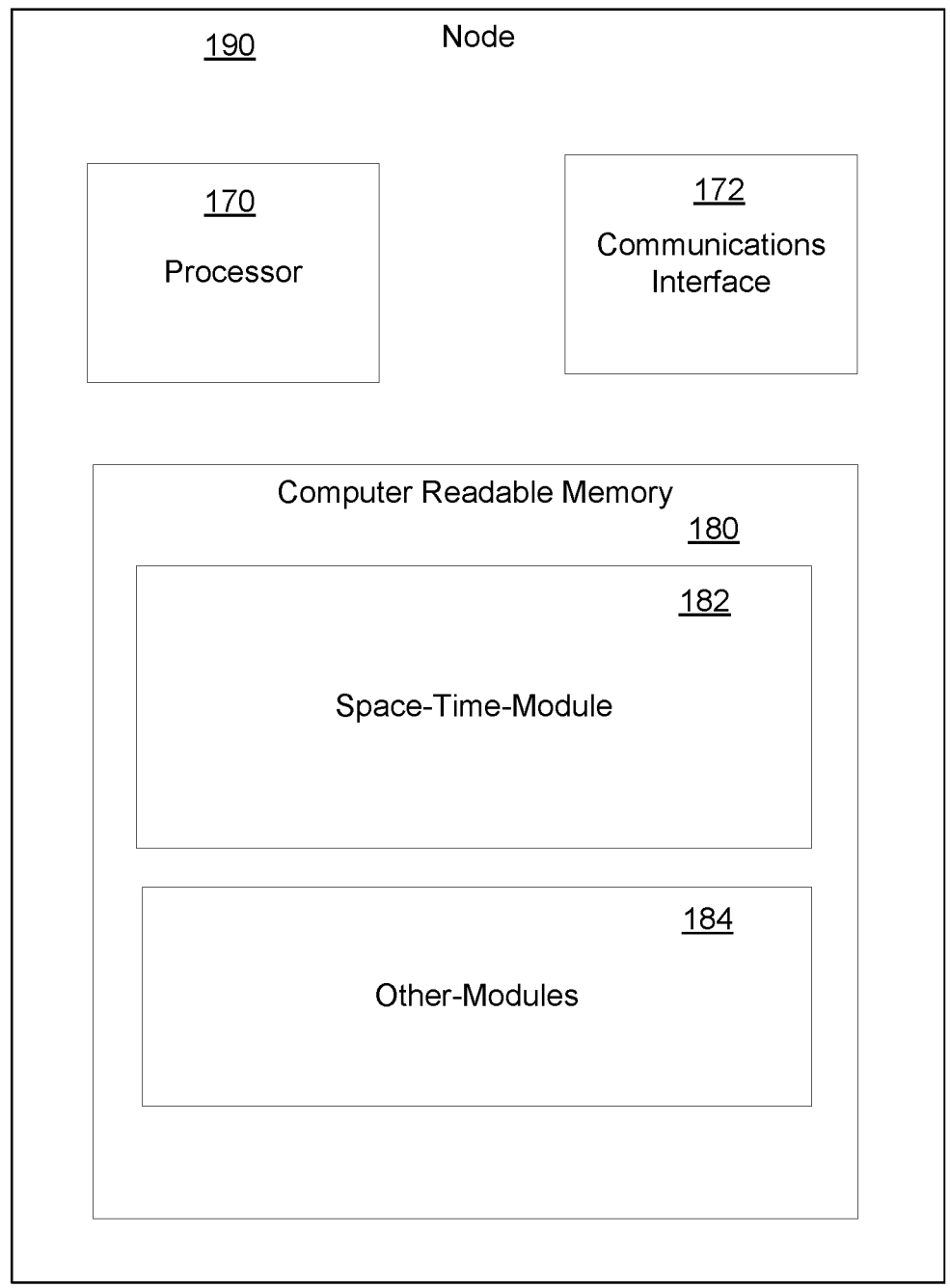
FIG. 28 is a block diagram view of an exemplary apparatus.

FIG. 28 is a block diagram view of an exemplary apparatus. Device 82 U includes processor 170, communications interface 172, and computer readable memory 180. Computer readable memory 180 includes space time module 182 and other modules 184. Space time module 182 include computer readable instructions that are read and executed by processor 170, as well as data structures that include spatio temporal information such as bubble 10 and/or space time record 110. In some embodiments, the computer readable instructions provide a client application. In some embodiments, the computer readable instructions provide a server application. The space time module 182 enables space time region based communications. Other functionality is provided by other modules 184. Space time region based communications are sent and/or received via the communications interface 172.

Figure 29:
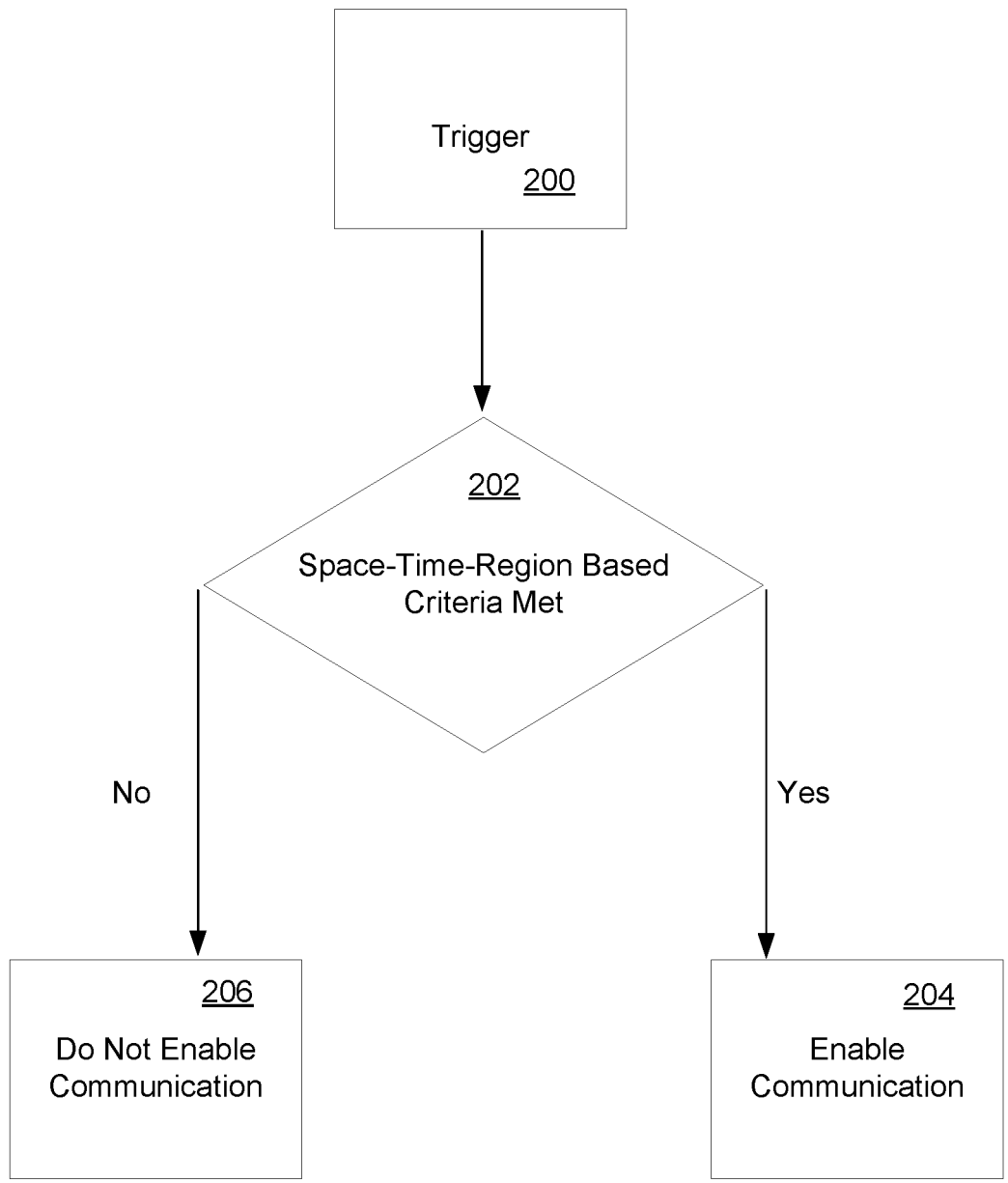
FIG. 29 is a flowchart view of an exemplary method.

FIG. 29 is a flowchart view of an exemplary method. A communication trigger 200 step occurs which causes a step to determine if space time region based criteria 202 are met. If so determined, then the step of enable communication 204 occurs whereat space time region 100 based communication are enabled. If not so determined, then the step of do not enable communication 206 occurs whereat space time region 100 based communication is not enabled.

Figure 30:
FIG. 30 is a table view of an example ways to reach a person and example prior knowledge required to reach that person.

FIG. 30 is a table view of example ways to reach a person and example prior knowledge required to reach that person. In the table, ways of communicating 208 are shown in the first column, and corresponding prior knowledge 210 are shown in the second column. For example, in order to reach a person by phone, email, through a web page, through social networks as ways of communicating 208 on one hand, the prior knowledge 210 of the other person's phone number, email address, knowledge of the web site, and network connection are respectively required on the other hand There are many ways of communicating or reaching out to other people. Several were invented in the past two decades and have tremendously increased the connectedness of the human population, adding links between individuals, between pieces of data, and between individuals and data. The email, text messaging, the web, cell phones, social networks all have contributed a great deal to this increased interconnectedness of people, places and information. However, in order to reach particular individuals, most modern ways of communication require some knowledge about the person or some kind of prior connection to that person. FIG. 30 illustrates common ways people are able to reach each others and what prior knowledge is required to reach a person in each case. There are some exemplary reasons why you would like to be able to reach some individuals in your immediate vicinity without knowing anything about them;

you: have a question about your present situation/location that must be answered right away; want to alert everyone nearby about a danger or simply an event you are witnessing; have a spontaneous need or desire that you know someone nearby might able to fulfill but you don't know how to find them; are alone for a business trip in a hotel and would like to meet someone for a drink; or want to hail a taxi more efficiently (find one in a 2 Km radius for instance). The common ground of unconnected individuals: in any given situation, most people that surround you don't share a first degree connection with you. They share some common ground with you however: their location in time and space. Some embodiments of the techniques disclosed herein use an infrastructure of application servers, database servers and smartphone applications that takes advantage of this to provide a new way to deliver and share information. Information packaged in space and time: some embodiments of the present techniques disclosed herein propose a way to package information (text, image, video, sound, music, complex documents, any other kind of information) into a chosen region of arbitrary size in space and time. In some embodiments, to help visualize this concept we are using the analogy of a bubble 10 of arbitrary size that is created/dropped at a desired location and contained the information to be packaged and delivered. Although these bubbles are created virtually, they have an almost physical presence in space and time in the sense that anyone passing through them will gain access to the information they contain provided they are using the required apparatus: in some embodiments, a smartphone and specific application. In some embodiments, those bubbles are created on a map, with their text and image, sized to will and 'dropped' at the desired location for other people to find them and access their content. In some embodiments, bubbles act as though they were physical spheres that 'sense' when you go inside them. They can be anywhere from a few meters to a several kilometers in diameter. In some embodiments, although bubbles can serve as a means of instant messaging their use go far beyond that due to the fact that the information enclosed in them benefit from being persistent for a programmable amount in time.

Figure 31:
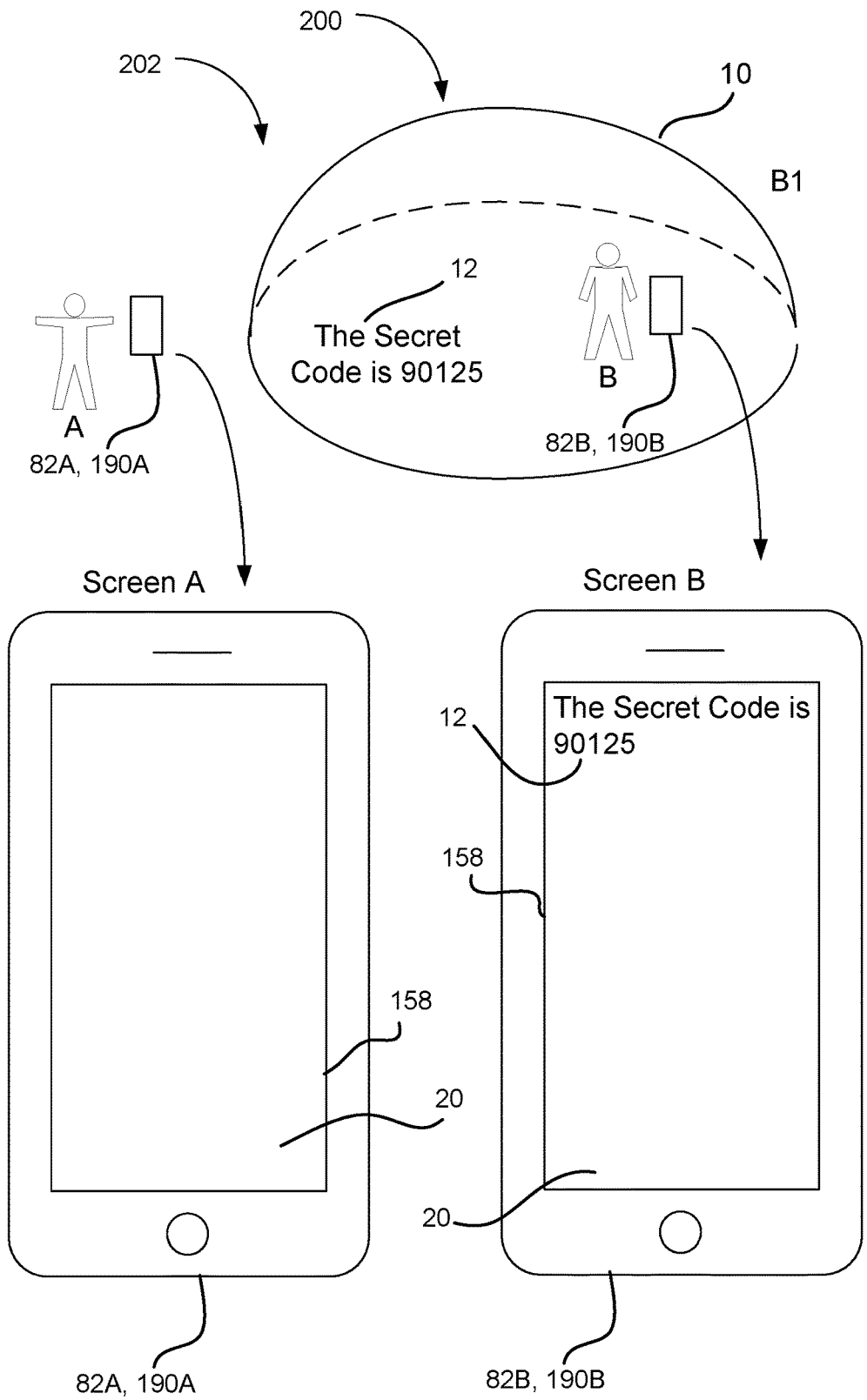
FIG. 31 is an illustration view of information inside a bubble is secret to a device outside the bubble and not secret to a device inside the bubble.

FIG. 31 is an illustration view showing information inside a bubble 10 that is secret to a device 82 outside the bubble 10 and not secret to a device 82 inside the bubble 10. The device 82 A of user A is at a first location at a given time. The device 82 B of user B is at a second location at the same given time. Bubble 10 B1 has space and time properties such that at the given time device 82 B's location is within the bubble 10 B1 and device 82 A's location is outside the bubble 10 B1. Therefore, device 82 B can see bubble other information 12 illustrated as 'The Secret Code is 90215' on bubble contents display interface 158 A is displayed on user interface 20 B of device 82 B, whereas user interface 20 of device 82 A shows no bubble other information 12 A in its bubble contents display interface 158 A. Characteristics of bubbles: in some embodiments, bubbles are pseudo physical entities created from a smartphone application. Although they exist in the digital space when a person is located at the physical space and time corresponding to the bubble 10 location he/she will have access to the information enclosed in the bubble 10. In some embodiments, bubbles can have some of the following attributes: longitude and latitude; altitude; radius; Start time of existence; Time of death (pop); Envelope: what appears on the outer shell of the bubble 10 (tag/keyword, category icon, image); Summary: what appears in the feed for this bubble 10; Content type: determines what is shown when entering the bubble 10: text, image, video, complex document etc., the content type will determine the viewer invoked to show the contents as well as the view that is shown when creating the bubble 10; Content: the actual content; Channel id; Creator Id; Bubble 10 key: a key that when entered render the bubble 10 existent for the user; Bubbles that it depends on: in some use cases (e.g. treasure hunt) a bubble 10 may be visible only if the use has previously entered one or more other specific bubbles. This can be implemented with bubble 10 keys; Allows comments: yes/no; and Allows private messages yes/no. Description of the application: in some embodiments, as stated above, the users will be able to access and interact with bubbles through a special smartphone application. In some embodiments, the application includes some of the following: a main feed, a foam view, ways to create and position bubbles and enclose information in them, ways to select channels, ways to create channels etc.

Figure 32:
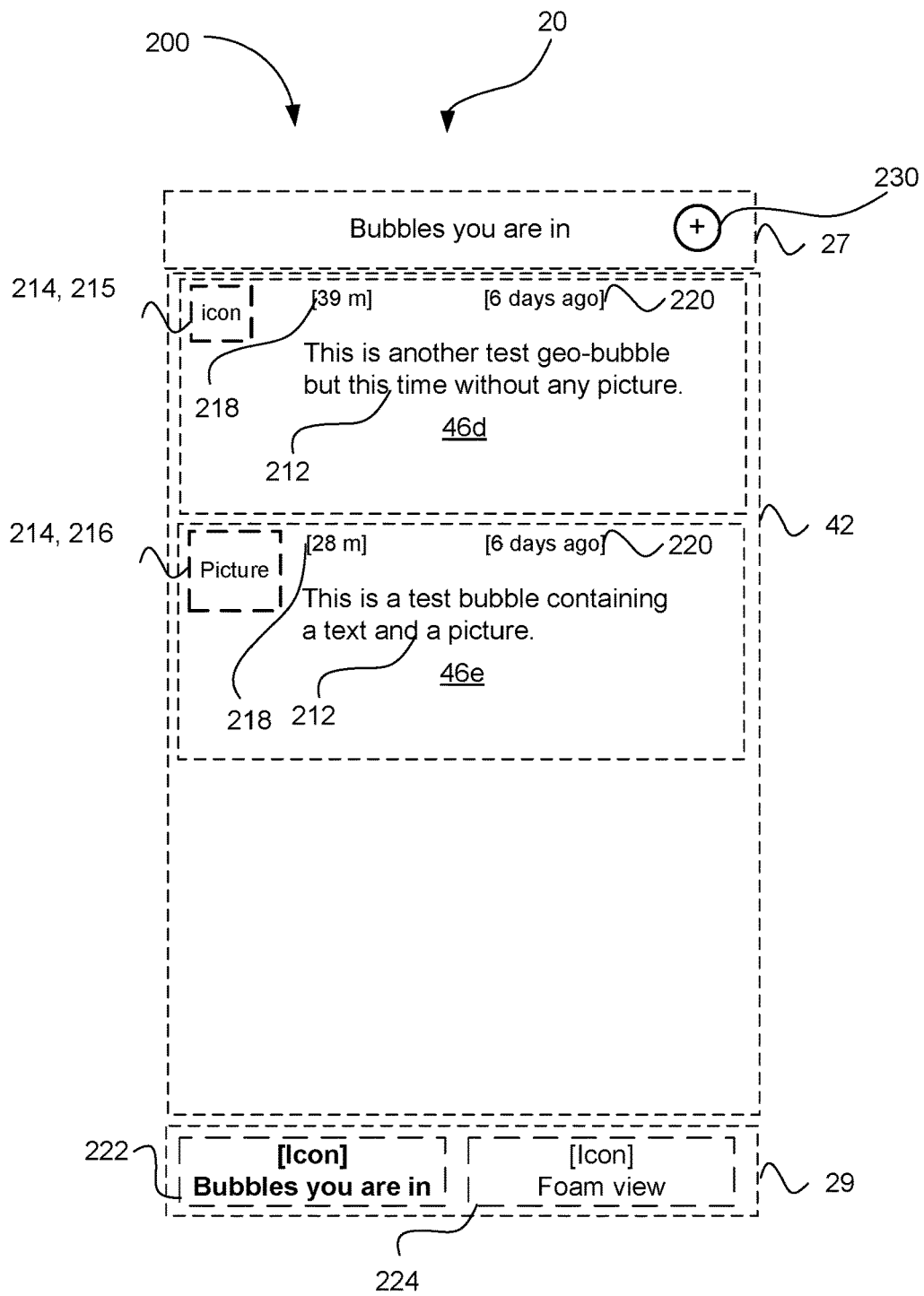
FIG. 32 is a user interface view of an exemplary bubble user interface.

FIG. 32 is a user interface view of an exemplary bubble 10 user interface. User interface 20 includes a bubble feed view 42, a mode interface element 29, and an other interface element 27. Bubble feed view 42 includes two instances of a bubble content viewing element 46, 46d and 46e. Bubble content viewing element 46 includes a bubble content viewing icon 214, bubble content viewing spatial information 218, bubble content viewing temporal information 220, and bubble content viewing text 212. In the case of bubble content viewing element 46 d, bubble content viewing icon 214 shows a bubble content viewing symbol 215, whereas in the case of bubble content viewing element 46e, bubble content viewing icon 214 shows a bubble content viewing picture 216. Mode interface element 29 includes two buttons: a mode interface element feed 222 and a mode interface element foam 224 to enable a user to switch the user interface 20 into a mode to interface with bubble 10 feeds and a mode to interface with bubble 10 foam respectively. As illustrated, the mode interface element feed 222 is active in FIG. 32 as it is shown in bold. The mode interface element feed 222 and mode interface element foam 224 buttons display an icon and text, either one of which is optional, and in the example the text reads 'Bubbles you are in' and 'Foam view' respectively. Other interface element 27 includes the text 'Bubbles you are in' as well as a button mode interface element create 230 to enable a user to switch the user interface 20 into a mode to create a bubble 10. The main feed: in some embodiments, at any moment a user may or may not be located inside one or many bubbles. Each bubble 10 he is located in will deliver its information to the user. In some embodiments, the main feed resembling a post feed is substantially a list of bubbles the user currently has access to. The user can select any item in the list in order to access the full content of the corresponding bubble 10: text, images etc. Once a bubble 10 is selected some degree of interaction may be allowed. Some bubbles allow public comments in which case any comment posted inside a bubble 10 will be there for other users entering the bubble 10 to see. Some bubbles allow private messages to its creator: useful when the bubble 10 expresses a need. Some bubbles may not allow any interaction and are only there to provide info: announcements, specific info hidden in time/space/channel etc.

Figure 33:
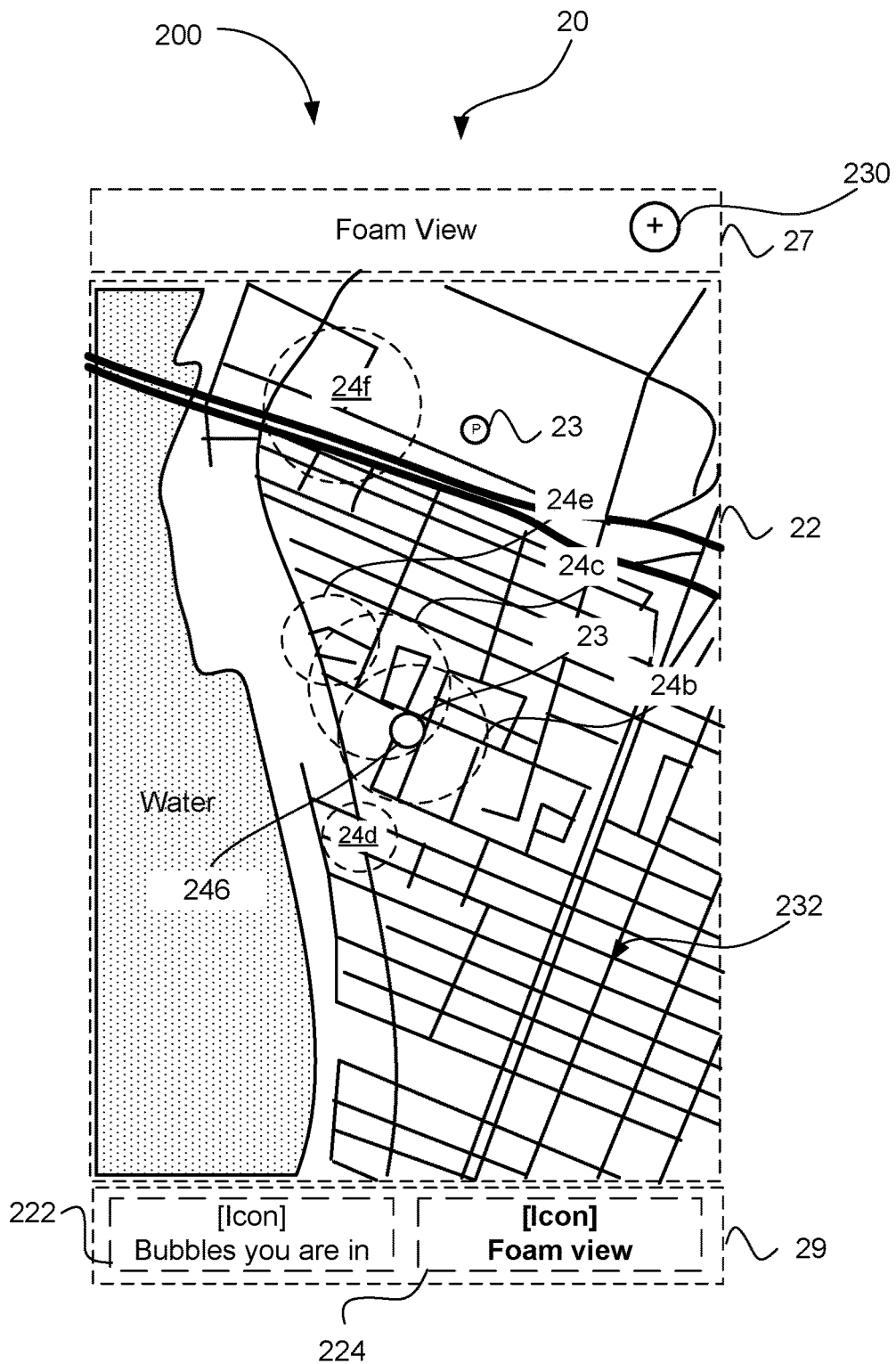
FIG. 33 is a user interface view of an exemplary bubble user interface.

FIG. 33 is a user interface view of an exemplary bubble 10 user interface. User interface 20 includes a map foam view 22, a mode interface element 29 and other interface element 27. The map foam view 22 includes a map interface element 232, five instances of a bubble interface element 24 b f, and two instances of a location interface element 23. The map interface element 232 shows various geographic features such as streets, points of interest, and water ways that are typically found on a map. Bubble interface element 24 b f show the location and size of bubbles on the map foam view 22 of the user interface 20, overlaid on top of the map interface element 232. The location interface element 23 marked with the letter 'P' is an overlay showing the position of a park in the map interface element 232. The location interface element 23 at the centre of the map foam view 22 shows the user position 246 of the user operating the device 82 in which the user interface 20 is being manipulated. Mode interface element 29 includes two buttons: a mode interface element feed 222 and a mode interface element foam 224 to enable a user to switch the user interface 20 into a mode to interface with bubble 10 feeds and a mode to interface with bubble 10 foam respectively. As illustrated, the mode interface element foam 224 is active in FIG. 33 as it is shown in bold. Other interface element 27 includes the text 'Foam view' as well as a button mode interface element create 230 to enable a user to switch the user interface 20 into a mode to create a bubble 10. The foam view: in some embodiments, the foam view allows users to have an overview of bubbles surrounding them, including bubbles they are not inside of. Users will only be able to see the enclosed information of a bubble 10 when they are physically inside the sphere delimited by the bubble 10. Given that the number of bubbles may be important, the collective name given to them is that of 'Foam'. Bubbles may have a tittle, tags and even an icon or image that are visible from outside them but it only serves as a hint or a teaser to invite users to go inside and access the full information contained in the bubble 10.

Figure 34:
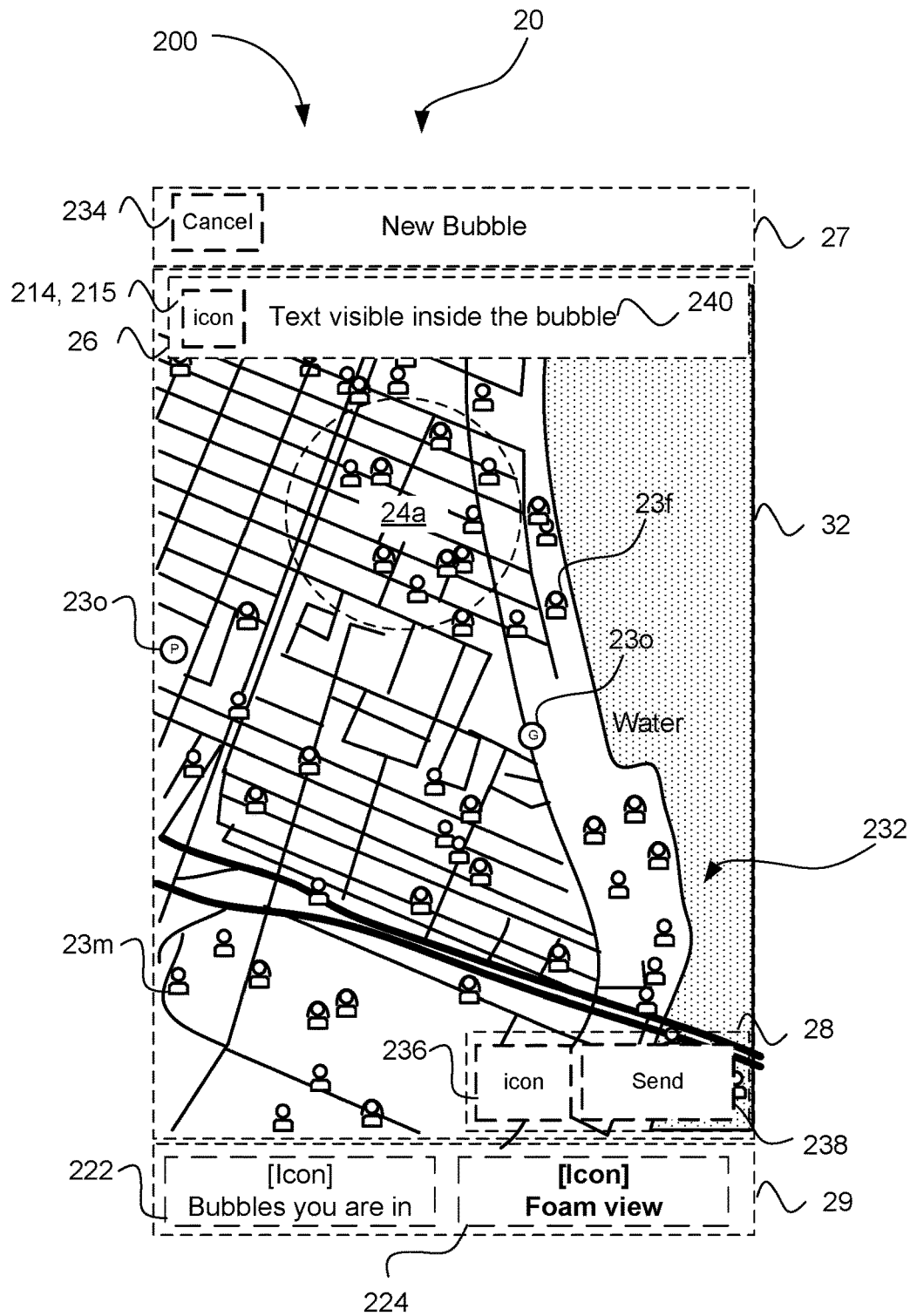
FIG. 34 is a user interface view of an exemplary bubble user interface.
Figure 35:
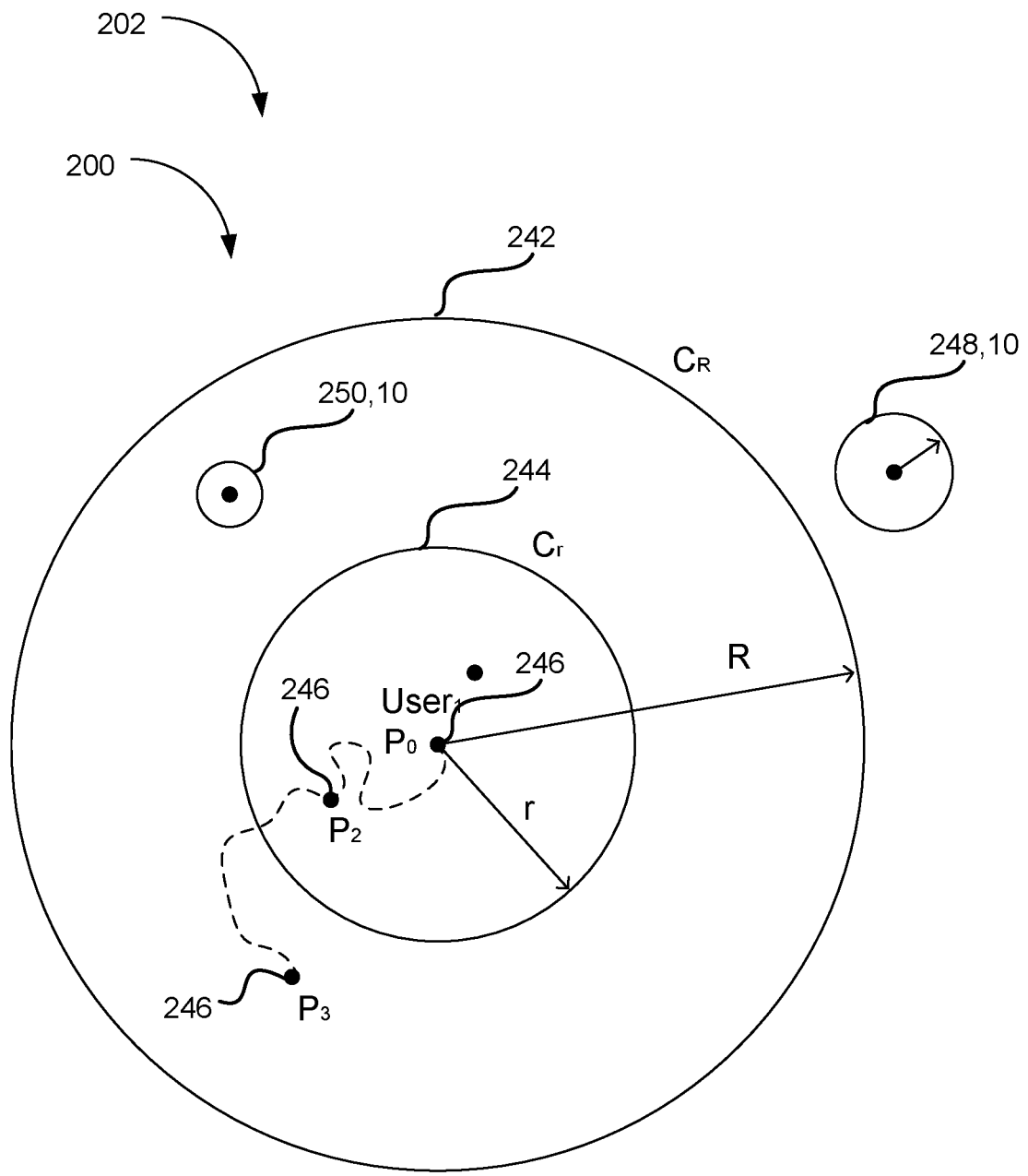
FIG. 35 is an illustration view of an exemplary bubble selection.

FIG. 34 is a user interface view of an exemplary bubble 10 user interface. User interface 20 includes a map bubble view 32, a mode interface element 29, and an other interface element 27. Map bubble view 32 includes a map interface element 232, a bubble interface element 24 a, a bubble action interface element 28, a bubble content creation element 26, and a plurality of instances of a location interface element 23. The map interface element 232 shows various geographic features such as streets, points of interest, and water ways that are typically found on a map. Bubble interface element 24 a show the location and size of a bubble 10 that is in the process of being created or dropped on the map bubble view 32 of the user interface 20, overlaid on top of the map interface element 232. This bubble interface element 24 can be manipulated by the user to change its spatial attributes (size and location). Bubble content creation element 26 includes a bubble content viewing icon 214 and bubble content creation text 240, which in this example reads 'Text visible inside the bubble', and is manipulable by the user for specific applications, as is the choice of bubble content viewing icon 214, to for example denote a specific channel, e.g. a megaphone to denote an announcement, a broken car to denote need for road side assistance, etc. . . . The plurality of location interface element 23 include location interface element 23 m representing the position of devices of male users, location interface element 23f representing the position of female users, and location interface element 23 o representing other positions, such as a park marked with the letter 'P' and a gas station marked with the letter 'G'. Advantageously, bubble interface element 24 a is positioned and dimensioned such that includes select location interface element 23f m, and excludes many interface element f o such that only the select user devices will be within the bubble 10 corresponding to bubble interface element 24 when it is 'dropped'. Bubble action interface element 28 includes two buttons: bubble action attach interface element 236 and bubble action send interface element 238, whereby the user can attach an item, such as a picture for example, and send or drop the bubble 10 respectively. Icons or text can be used inside the bubble action interface element 28 to denote the action a user would achieve by manipulating the user interface 20. In the example shown, a camera icon (not explicitly shown) denotes an attach action for a picture, and the word ' Send' denotes the send or drop action enabled by the user interface 20. Mode interface element 29 includes two buttons: a mode interface element feed 222 and a mode interface element foam 224 to enable a user to switch the user interface 20 into a mode to interface with bubble 10 feeds and a mode to interface with bubble 10 foam respectively. As illustrated, the mode interface element foam 224 is active in FIG. 34 as it is shown in bold. Other interface element 27 includes the text 'New Bubble' as well as a button bubble action cancel interface element 234 to enable a user to cancel the creation of a bubble 10. Although not explicitly shown in FIG. 34, it is contemplated that a user may manipulate the temporal attributes of bubble interface element 24 using user interface 20. Operationally, to reach people in your whole neighbourhood create a bubble 10 of 1 km across. To reach a few individuals you may want to create a bubble 10 of only 10 20 meters in size for instance. Bubbles can be placed to make announcements, request immediate help from people within the bubble 10, ask questions, look for help, ask for service etc. In some embodiments, a smartphone application enables users of smartphones to interact with bubbles. In some embodiments, the first screen represents the feed of the main public channel. Every user is registered to the main public channel where bubbles may posted regarding emergencies, public information, desires from users, questions etc. Channels: in some embodiments, each bubble 10 exist within a single channel. When selecting a channel a user will only be able to interact with bubbles that are associated to that channel. Thus a channel is a kind of 'parallel universe' with its own set of bubbles. The main public channel is the one every user is subscribed to and this is where a user can reach any other user in its region by creating bubbles around or close to him. For instance a custom channel may be created for the purpose of organizing a treasure hunt where a group of people will physically go from one bubble 10 to another to discover new hints eventually leading to a special prize. A full and lengthy section will be devoted to the many practical applications of custom channels. In addition to the main public channel, in some embodiments, several default channels can be offered to the public such as for example age limited channels: 13 17 and 18+; or short lived deals. Custom channels: in some embodiments, users can create their own channels which will be accessible to others by their 'channel name'. This is described in greater detail in relation to 'Use cases' below. Private channels: in some embodiments, private channels may be created for personal uses or to be used by a specific group of people. Access to these private channels will require authentication. One particular use of a private channel could be a location and time aware todo list. More examples and details will be presented in relation to use cases below. In some embodiments, users of the smartphone application basically remain anonymous and register with only minimal information, e.g. a nickname and their phone number, to obtain a unique id from a server at the time of registration. In that way, users advantageously know that only their location is used by the system and not their real identity unless they willingly share it. FIG. 35 which is an illustration view of an exemplary technique of bubble 10 selection. As illustrated, a user moves from user position 246 P0 to P2 and then P3. A circle smaller vicinity 244 is shown with radius r, cantered around P0. A circle larger vicinity 242 is shown with radius R, cantered around P0. Two bubbles are illustrated, one that is a bubble fetched 250 situated inside circle larger vicinity 242 and outside circle smaller vicinity 244, and one that is a bubble not fetched 248 which is situated outside circle larger vicinity 242. Bubbles are assumed to have a radius<(R r). Consider various positions for a user: P0, P3, P3. If the user position 246 is inside circle smaller vicinity 244, all bubbles the device 82 has to know about are the ones within circle larger vicinity 242 since radius of a bubble 10 rb<(R r). That is the case for P0 and P2. When the user goes outside of circle smaller vicinity 244, e.g. P3, then a global refresh is needed: worst case reload all bubbles within R distance of P3. Advantageously, only bubble fetched 250 is fetched and bubble not fetched 248 is not fetched. While user is within circle small vicinity the device 82 only has to load newly created or modified bubbles whose center is within circle larger vicinity 242 since the radius of bubbles is assumed to be less than (R r). This assumption can be made into a constraint in some embodiments, thereby ensuring the assumption is always true. In some embodiments, in order for a user to be able to benefit and use the present techniques, all he needs is a smartphone equipped with a gps device 82 and an internet connection, which can be used to download a smartphone application which communicates with server nodes, thereby providing a device 82 the accesses a node, both of which can embody the techniques of the present application. In some embodiments, bubbles are hosted on a MongoDb database and load balancing at the Db level is achieved by sharding. In some embodiments, load balancing at the application level can be achieved based on the user's physical location and routing can be made based on a config file downloaded from a well known server based on user location. Depending on the application and the number of simultaneous users, in some embodiments a minimal server setup includes a single server, and a single database server. Tests and simulations can be made in view of the present disclosure by a person having ordinary skill in the art in order to determine the costs of serving a population of a given size. Depending on the application, appropriate algorithms to determine inclusion of a user in a bubble 10 can be used. In some embodiments, one of the aspects of the implementation of the techniques of the present application is to be able to determine with as much accuracy as possible the precise moment when a user crosses the outer surface of a bubble 10: going inside the bubble 10 or going outside. One solution that is contemplated in some embodiments consists of pre fetching bubbles that are in the larger vicinity of the user and to enable the smartphone to determine when the user goes inside or outside the bubble 10. In one embodiment, a simple optimization is disclosed herein: upon starting the application the user location is determined by the gps system of the smartphone or device 82. Let this first user position be called P0. Let R be the radius of the circle inside which are located the bubbles that we have prefetched from the server, e.g. circle larger vicinity 242. Let's assume that the user stays inside a smaller circle of radius r having the same centre point as the greater circle of radius R for a certain period of time dt, e.g. circle smaller vicinity 244. It can be concluded that during the period of time dt we don't need to fetch bubbles whose centre is outside the greater circle of radius R if their radius is less than R r. For example if we set a maximum radius of 5 Km for the bubbles and we fetch all bubbles that are within 10 Km of the initial position P0, it is advantageously not necessary to fetch bubbles outside of that 10 Km circle as along as the user stays within 5 Km of its initial position P0. It is further advantageously during that time, to only need to fetch bubbles that have been newly created or whose state has changed.

Figure 36:
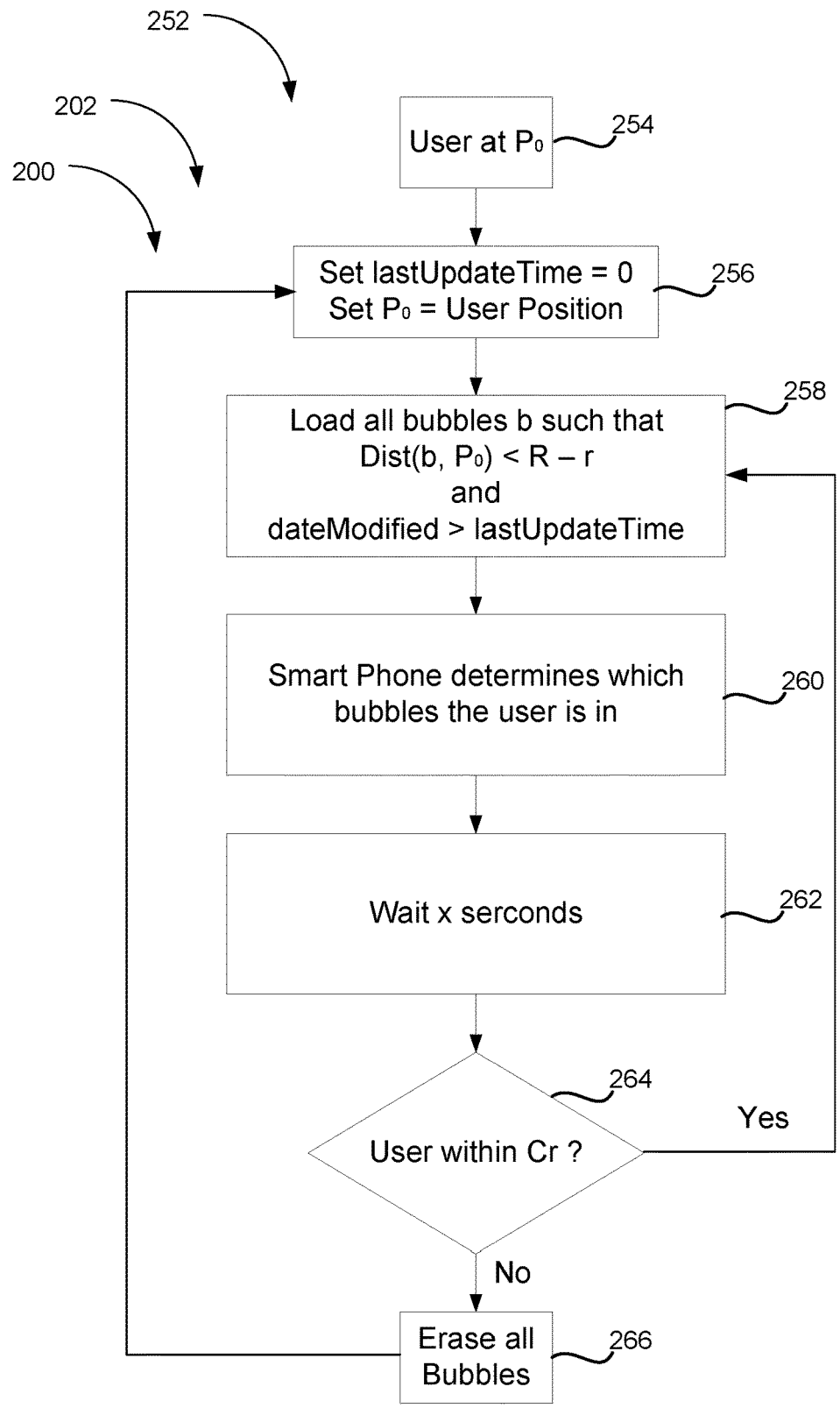
FIG. 36 is a flowchart view of an exemplary method.

FIG. 36 is a flowchart view of an exemplary method. The flowchart includes a determining position 254 step, a storing spatio temporal information 256 step, a selecting bubbles to fetch 258 step, a determining inside which bubbles 260 step, a determining temporal change 262 step, a determining spatial change 264 step, and an updating bubble context 266 step. Operationally, the flowchart can be used for a periodic fetching 252 cycle as follows. At the determining position 254 step, consider P0 the initial position of the user. At the storing spatio temporal information 256 step, set lastUpdateTime as 0, which is the last time the bubbles have been fetched by the smartphone, and set P0 to the user position, as determined by the device 82. At the selecting bubbles to fetch 258 step, fetch all bubbles that are within R distance from position P0, e.g. load all bubbles b such that the distance between b and P0 is less than (R r) and dateModified>lastUpdateTime. At the determining inside which bubbles 260 step, the device 82 determines which bubbles the device 82 is in. At the determining temporal change 262 step, wait a predetermined amount of time, e.g. x seconds, the period of the periodic fetching cycle. At the determining spatial change 264 step, determine if the user is within the circle small vicinity, e.g. within r of P0. If so determined, go to the selecting bubbles to fetch 258. In the alternative, go to the updating bubble context 266 step, whereat in the example all bubbles are erased, and control returns to the storing spatio temporal information 256 to complete the periodic fetching cycle. In some embodiments, altitude can also be considered when creating bubbles. The same principles described in the flowchart of FIG. 36 above can be used and spheres will be considered instead or circles. However, in some embodiments, the query to the server can advantageously still be made based on a 2D index consisting of longitude and latitude. It will up to the device 82, e.g. smartphone, to compute the enclosure of the user in each of the spheres.

Figure 37:
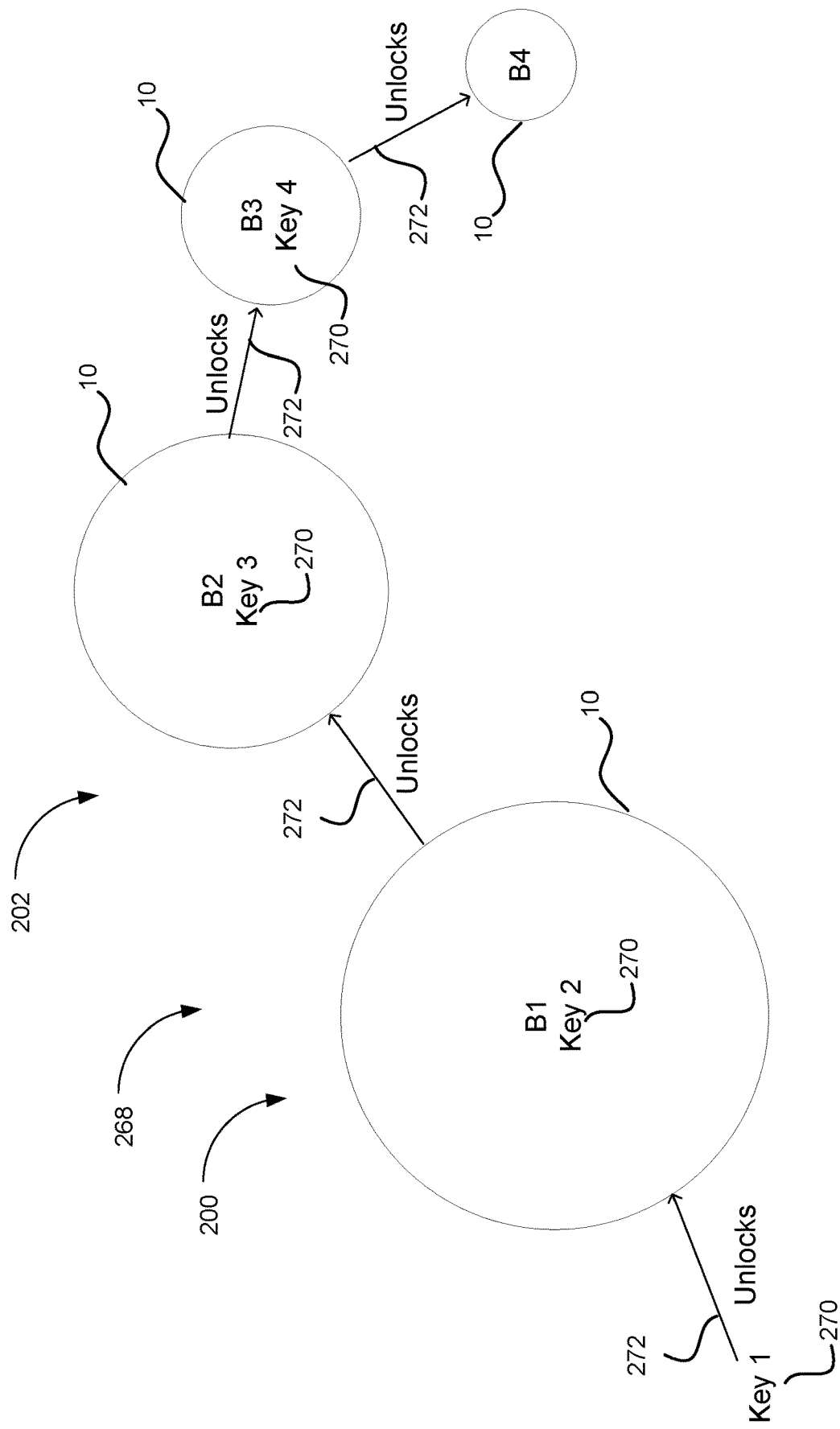
FIG. 37 is an illustration view of an exemplary bubble trail.

FIG. 37 which is an illustration view of an exemplary bubble 10 trail. The example bubble trail 268 includes four bubbles B1 B4, four instances of a bubble key 270 Key 1 4, and four unlocking 272 acts. As shown, possessing bubble key 270 Key 1 enables unlocking 272 bubble 10 B1. Once bubble 10 B1 is unlocked, entering bubble 10 B1 enables possessing bubble key 270 Key 2, which in turn enables unlocking 272 bubble 10 3, which enables possessing bubble key 270 Key 3, which enables unlocking 272 bubble 10 B4. Bubble key 270 Key 1 gives access to bubble 10 B1, bubble key 270 Key 2 contained in bubble 10 B1 gives access to bubble 10 B2, and so on.

Figure 38:
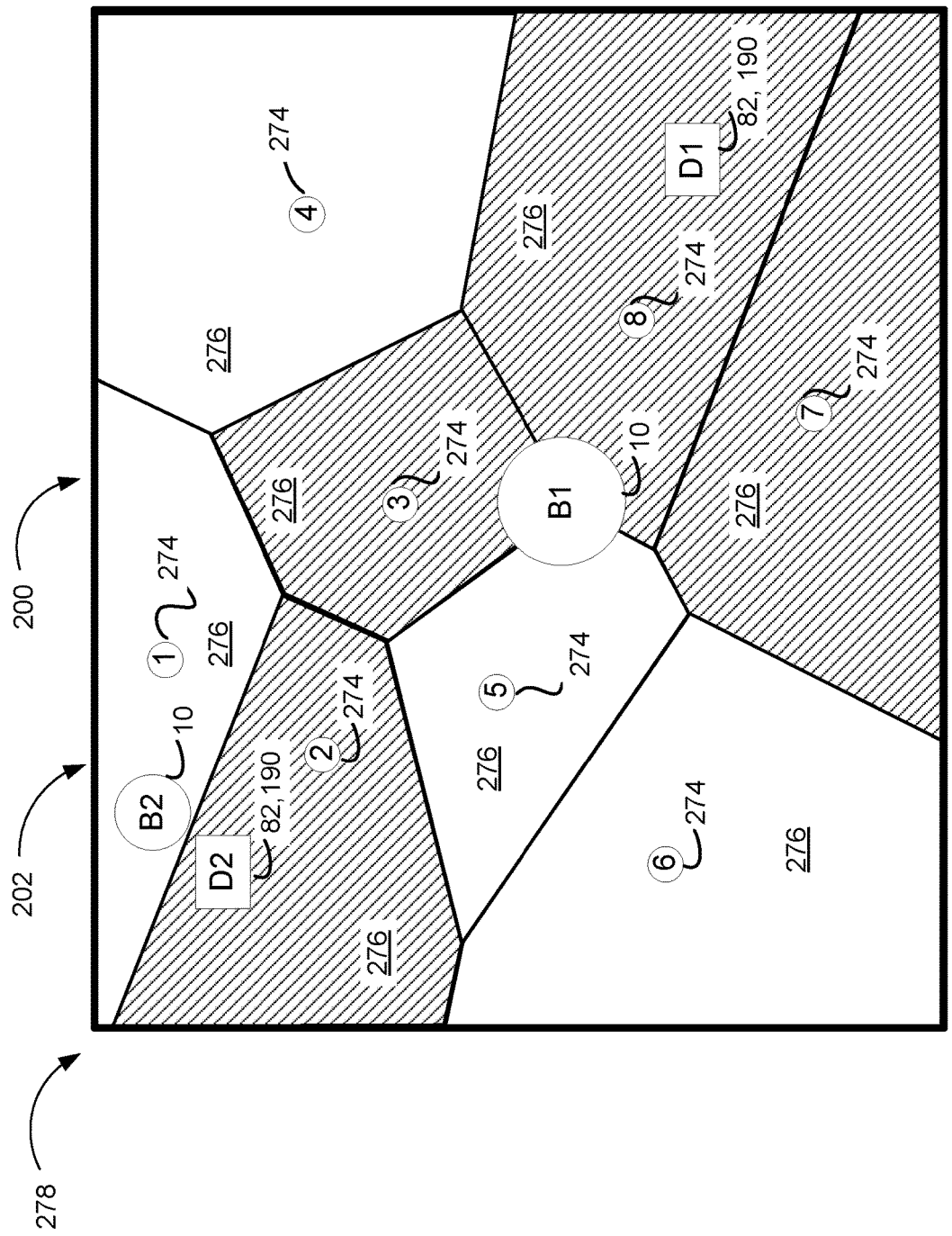
FIG. 38 is an illustration view of an exemplary surface element based geo channel selection using a Voronoi diagram.

FIG. 38 is an illustration view of an exemplary surface element based geo channel selection using a Voronoi diagram. The Voronoi diagram 278 is shown including: eight geo channel location 274 identified by small circles with numbers 1 8; two bubble 10 B1 and B2; two device 82 D1 and D2, and several surface element 276. The Voronoi diagram 278 illustrates Voronoi diagram based embodiment of a geo channel 50 selection method. Here small circles represent a set of geo channel location 274. The hashed and blank regions are instances of a surface element 276, each associated to a geo channel 50 according the voronoi diagram 278 associated with geo channel location 274. Device 82 d1 would be associated with geo channel 50 number 8 because it is located in the surface element 276 associated with geo channel location 274 number 8. Similarly, device 82 d2 would be associated with geo channel 50 number 2 because it is located in the surface element 276 associated with geo channel location 274 number 2. Bubble 10 B1 would be associated with geo channels number 3, 5 and 8 because it touches the surface element 276 associated with those 3 geo channel 50 locations. This method would satisfy a consistency criterion (detailed further below) as can be seen intuitively. However one can see that device 82 D2 and bubble 10 B2 are very close to each other in this example and according to the selection algorithm proposed device 82 D2 would be unaware of the existence of bubble 10 B2.

Figure 42:
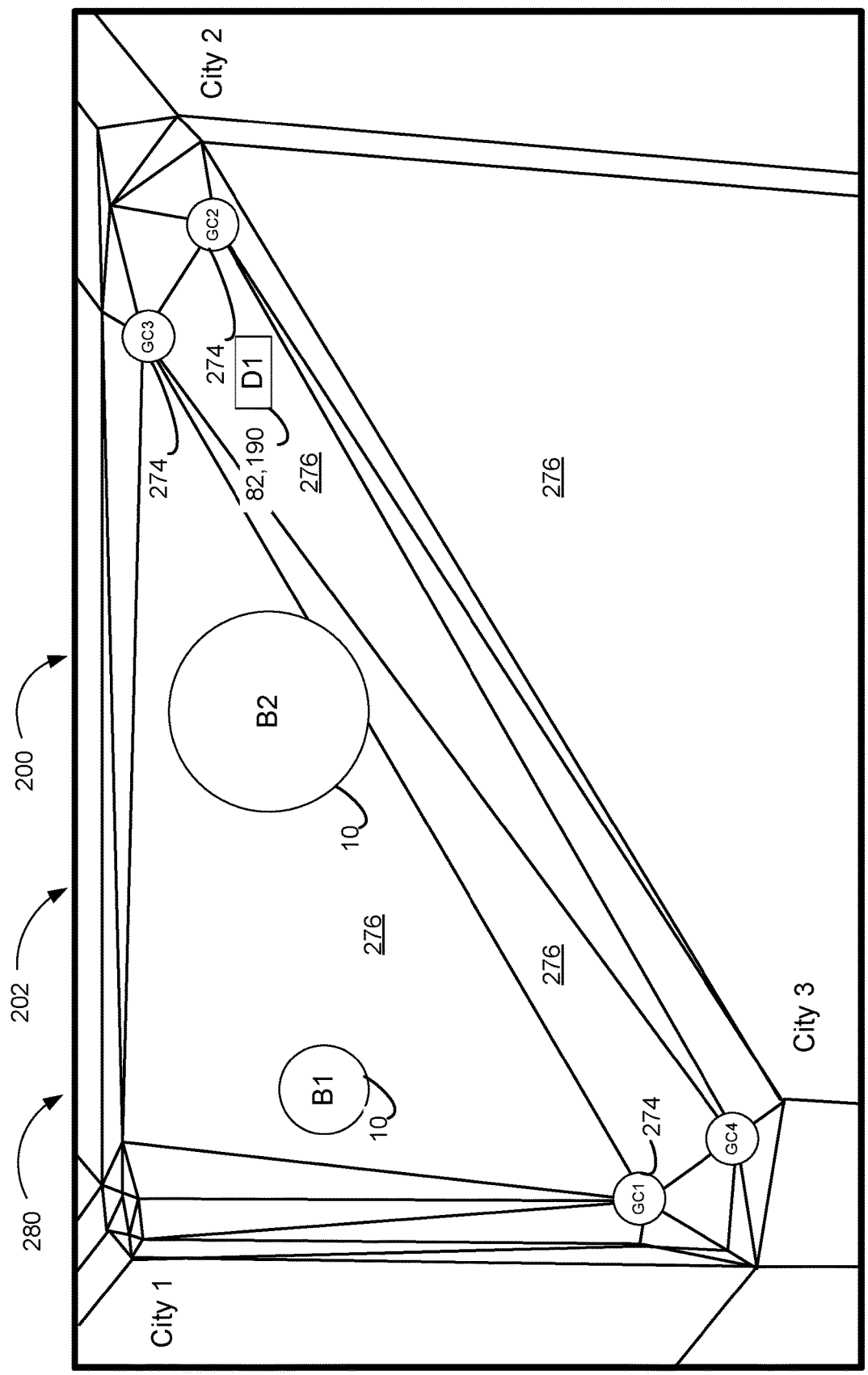
FIG. 42 is an illustration view of an exemplary surface element based geo channel selection.

Triangle based geo channel 50 selection algorithm don't have this shortcoming as will be seen in the next example. One important part of the space time region module used by client applications include the geo channel 50 selection algorithms. One of these algorithms determines at anytime which geo channel 50 a client application should connect to. Substantially, for any point in space as input it produces a set of geo channels. The other selection algorithm determines which geo channels are associated with a bubble 10 during its creation. Various selection algorithms could be used. At least one consistency criterion should be satisfied by any pair of selection algorithms used in any embodiment of the space time region communication system. Let's say we have a reasonable geo channel 50 selection algorithm for devices. Let's call it A and assume that for a location in space 11 it produces a set of geo channels sl. The geo channel 50 selection algorithm for bubbles (A2) should be such that for any bubble 10 B1: A2(B1) is the union of all sets of geo channels Si produced by applying A(li) to each location li enclosed by bubble 10 B1. An example of a geo channel 50 selection algorithm for locations is given by the Voronoi diagram of points corresponding to locations of geo channels shown in FIG. 38. Other examples using triangulation are shown in FIGS. 39 42.

Figure 39:
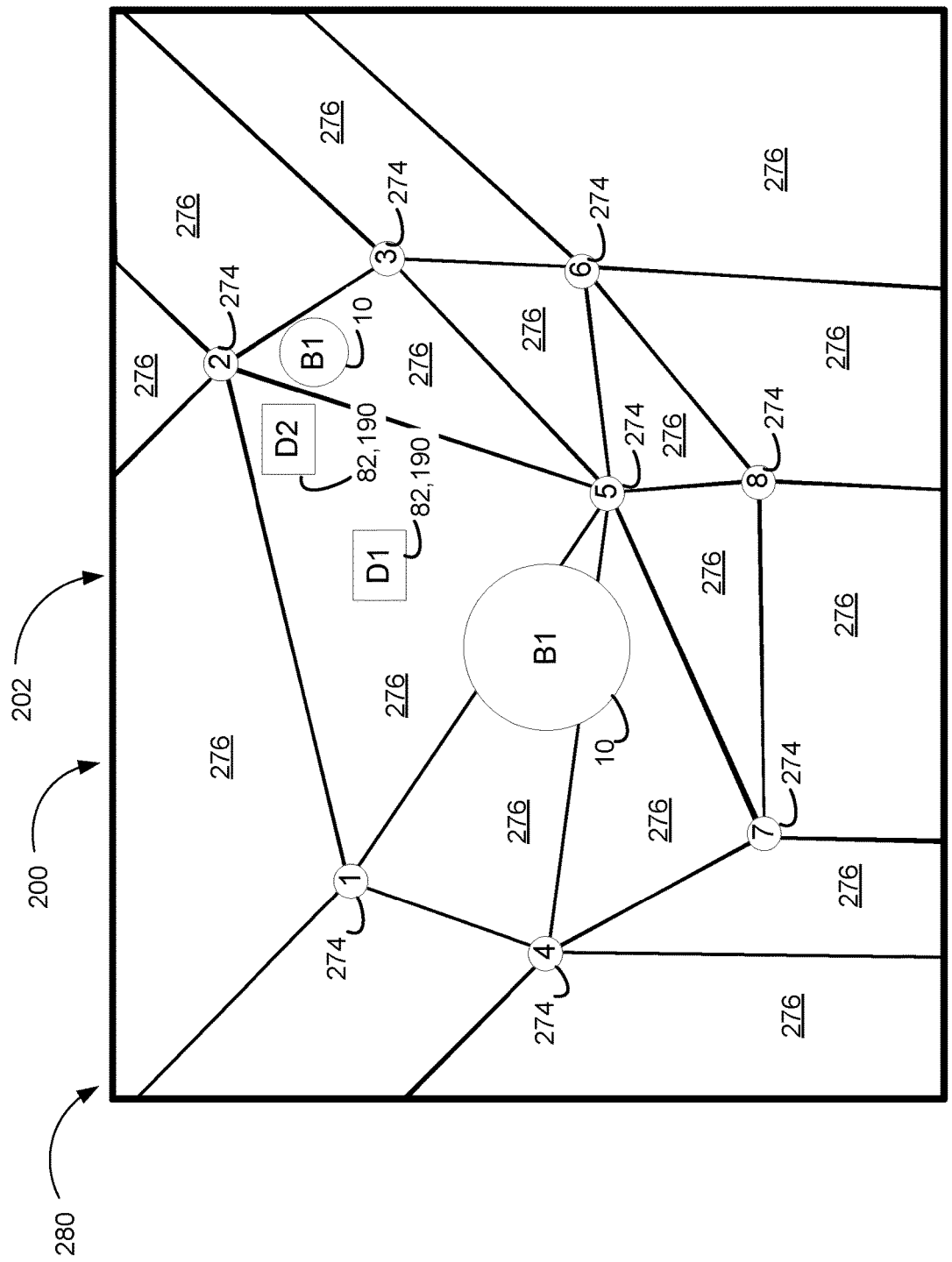
FIG. 39 is an illustration view of an exemplary surface element based geo channel selection using a Delaunay triangulation.

FIG. 39 is an illustration view of an exemplary surface element based geo channel selection using a Delaunay triangulation. Another example of geo channel 50 selection algorithm stems from the notion of Delaunay triangulation as is explained presently in describing FIG. 39. The Delaunay triangulation 280 includes: eight geo channel location 274 identified by small circles with numbers 1 8; two bubble 10 B1 and B2; two device 82 D1 and D2; and several surface element 276. The Delaunay triangulation 280 illustrates a triangulation based geo channel 50 selection algorithm whereby three geo channel 50 each having a geo channel location 274 will be associated to each location of a given surface element 276. Here we give as an example the Delaunay triangulation 280 of a set of 8 geo channels. In this example device 82 D1 would be associated with geo channels number 1, 2 and 5 at geo channel location 274 number 1, 2 and 5. Bubble 10 B2 would be associated with all geo channel 50 except those at geo channel location 274 number 3, 6 and 8. Device 82 D1 would be aware of the existence of bubble 10 B2 via geo channel 50 at geo channel location 274 numbers 1 and 5. As for device 82 D2 and bubble 10 B2 although they are on different sides of an edge of a surface element 276, D2 will be aware of B2 because they are both associated with geo channel 50 at geo channel location 274 numbers 2 and 5. Triangle based geo channel 50 selection algorithm introduce an overlap in area coverage that advantageously enables a seamless and smooth large scale coverage. Each of the examples presented in the last two illustrations have advantages and disadvantages. While a Voronoi diagram based selection algorithm would seem to be more efficient because it associates only one geo channel 50 per surface element, triangulation based selection algorithms introduce some redundancy which could be leveraged to implement more robust systems. Additionally, triangulation based selection algorithms naturally and advantageously introduce buffer zones around a bubble, zones in which all present devices will be aware of the existence of the new bubble 10.

Figure 40:
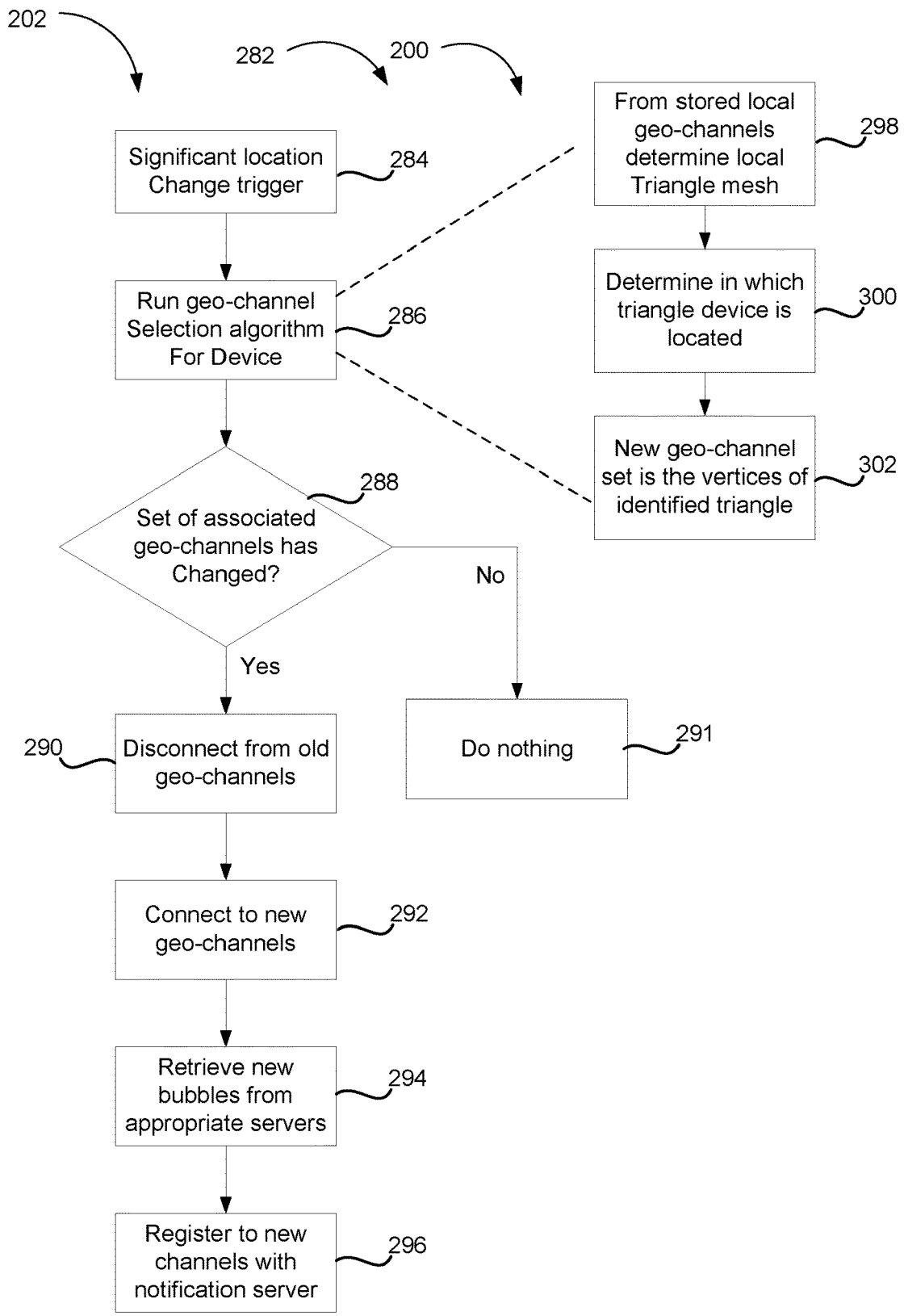
FIG. 40 is a flowchart view of an exemplary method.

FIG. 40 is a flowchart view of an exemplary method. The geo channel selection 282 flowchart can be used to determine to which geo channels a device 82 should connect to when significant location change is detected. The flowchart includes 11 steps: significant location change 284, geo channel selection for device 286, geo channels selected changed 288, disconnect old geo channels 290, connect new geo channels 292, retrieve new bubbles 294, register new geo channels 296, determine surface elements 298, determine which surface element for device 300, select new geo channels 302, and other act 291. Operationally, at step significant location change 284, a significant location change is detected and acts as a trigger to cause the following step geo channel selection 282 by device 82. At step geo channel selection for device 286, the geo selection algorithm for the device 82 is run. This could include, for example, steps: determine surface elements 298, determine which surface element for device 300, and select new geo channels 302. At the determine surface elements 298 step, local geo channels are used to determine surface elements, e.g. a triangle mesh. Next, at the determine which surface element for device 300 step, it is determined in which surface element 276, e.g. triangle mesh, the device 82 is located. Next, at the select new geo channels 302 step, new geo channel 50 set is determined from the surface element 276, e.g. the vertices of the identified triangle for a triangle mesh. Returning to the step geo channels selected changed 288, at this step it is determined if the set of associated geo channels has changed. If so determined, the following steps ensue: disconnect old geo channels 290, connect new geo channels 292, retrieve new bubbles 294, register new geo channels 296; in the alternative, the other act 291 step ensues, e.g. do nothing. At the disconnect old geo channels 290 step, the device 82 and old geo channels are disconnected. At the connect new geo channels 292 step, the device 82 and the set of new geo channels determined at the geo channel selection for device 286 step are connected. At the retrieve new bubbles 294 step, new bubbles are retrieved from appropriate servers e.g. via the new geo channels or notification server, or other server. At the register new geo channels 296 step, the device 82 registers to the new geo channels, e.g. with the notification server.

Figure 41:
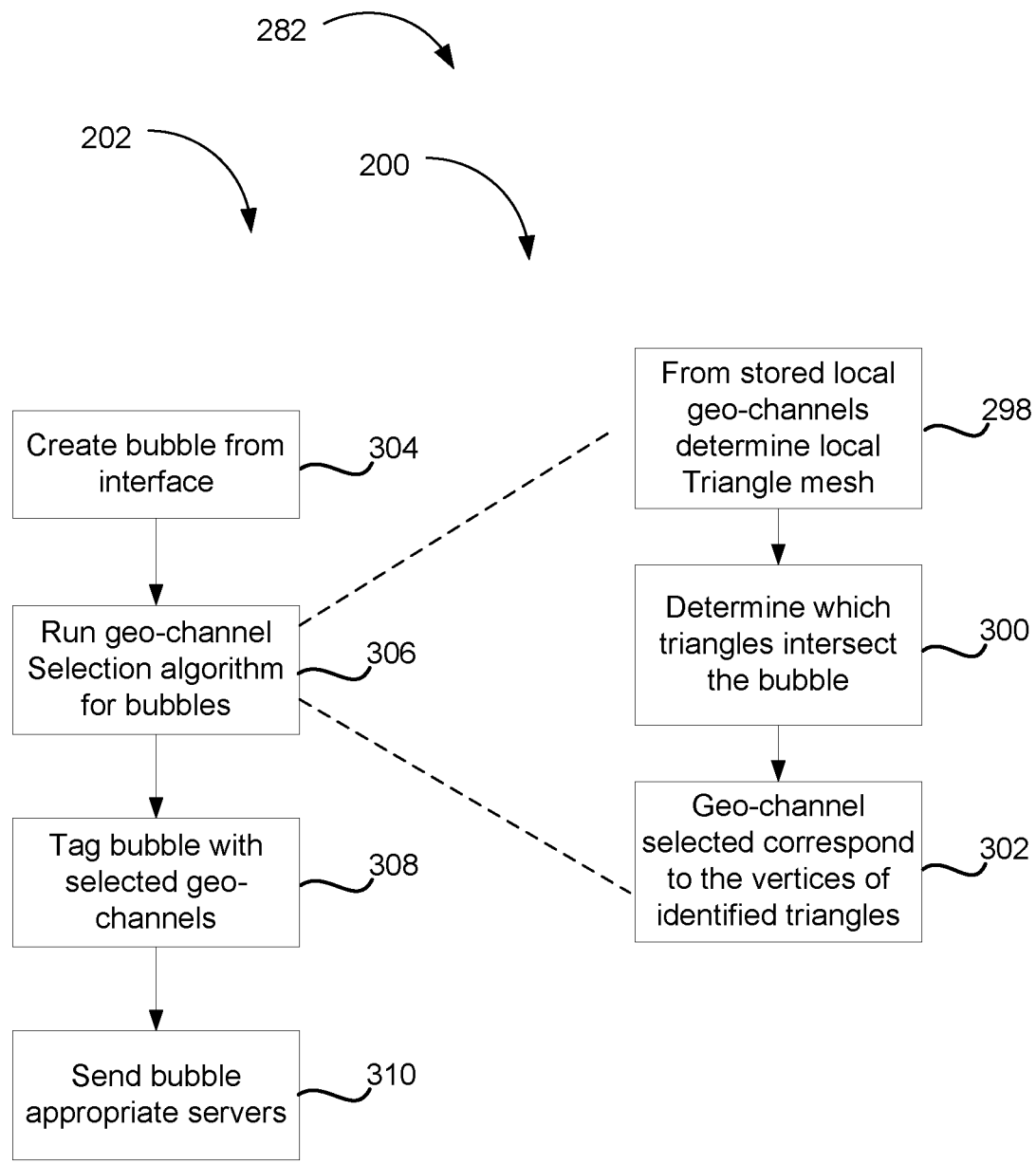
FIG. 41 is a flowchart view of an exemplary method.

FIG. 41 is a flowchart view of an exemplary method. The geo channel selection 282 flowchart can be used in the case of bubble 10 creation. The flowchart includes seven steps: create bubble 304, geo channel selection for bubbles 306, set geo channel for bubble 308, send bubble to servers 310, determine surface elements 298, determine which surface element for device 300, and select new geo channels 302. Operationally, at step create bubble 304, a bubble 10 is created via an interface, e.g. user interface 20 or application programmers interface. At step geo channel selection for bubbles 306, the geo channel 50 selection algorithm for bubbles is run. This could include, for example, steps: determine surface elements 298, determine which surface element for device 300, and select new geo channels 302. At the determine surface elements 298 step, local geo channels are used to determine surface elements, e.g. a triangle mesh. Next, at the determine which surface element for device 300 step, it is determined in which surface element 276, e.g. triangle mesh, the device 82 is located. Next, at the select new geo channels 302 step, new geo channel 50 set is determined from the surface element 276, e.g. the vertices of the identified triangle for a triangle mesh. Returning to the step set geo channel for bubble 308, at this step the bubble 10 created at the create bubble 304 step is related to the geo channels selected at the geo channel selection for bubbles 306, e.g. the bubble 10 is tagged with the selected geo channels. At the send bubble to servers 310 step, the bubble 10 is sent to the appropriate servers.

FIG. 42 is an illustration view of an exemplary surface element based geo channel selection. Another example of geo channel 50 selection algorithm shows a hypothetical and simplified coverage of three cities labelled City 1, City 2 and City 3. The illustration shows: two bubble 10 B1 and B2; two device 82 D1 and D2, several surface element 276 that are triangular, and several geo channels, whereby geo channels are vertices. Four geo channels are highlighted by representing them as small circles at their respective geo channel location 274 numbered GC1, GC2, GC3 and GC4.

Creating geo channels in each of the three cities has the unexpected advantage that the space between the three cities becomes covered also by way of the triangle based geo channel 50 selection algorithms, and this regardless of the distance between the cities. In the example above device 82 would be made aware of bubble 10 B2 via geo channels GC3 and GC4. It would also be made aware of bubble 10 B1 but via GC3 only.

ALTERNATIVE EMBODIMENTS

In some embodiments, infrastructure is provided that allows the creation, storage and delivery of bubbles to client applications in realtime at a global scale. The infrastructure also serves to deliver instant and delayed communication between users in the context of each dynamically user or system created bubble 10. All changes in state for bubbles are also carried in realtime by the system we describe in this section. The main elements of this infrastructure are geo channels, geo channel 50 directories, bubble 10 servers, notification servers and space time record servers. Geo channels are virtual entities used to delimit the space covered by the communication platform in small areas (a few hundred meters or a few kilometers across typically) in order to help load glance the work done by bubbles servers, notification servers and space time record servers. Each geo channel 50 has space coordinates (longitude and latitude) as well as the three servers it is associated with: bubbles server notification server and space time record server. In general several geo channels will be associated with the same servers to cover a given region such as a small city or part of a larger one. We call such a set of related geo channels a geochannel system. The spatial density of geo channels will vary from one area to another depending on the density of population for each area. Geo channel 50 systems are entirely independent from each other and form a very scalable pattern of deployment. Each geo channel 50 has a unique alpha numeric id though out the communication system. It has longitude and latitude coordinates and can figuratively be represented as a kind of antenna planted at a specific point on a map. A geo channel 50 also has the three aforementioned urls: bubbleServerUrl, notificationServerUrl and spaceTimeRecordServerUrl. A bubbles server is where an instance of the communication application is running and has the purpose of creating, retrieving, updating and deleting bubbles. Each bubble 10 server is interacting with a database (MongoDb is preferred, but Riak, My SQL and the like are contemplated) in order to carry out the task required by each incoming request. A notification server is used to notify users in realtime of events occurring such as bubble 10 creation, answers to bubbles, bubble 10 state change, people entering or leaving bubbles etc. Mobile devices and notification servers interact using an implementation of the web sockets protocol namely sockjs. Messages sent to a notification server through one of its associated geo channels will be rebroadcast to all mobile devices subscribed to that channel. The client application running on a mobile device 82 will be connected to at least three geo channels at any time and thus possibly to one or more space time record servers. Each time a mobile device's location changes significantly (what significantly means is determined by the client application) a space time record is sent to appropriate space time record servers. This record is stored in the associated databases and contains at least the following information: user id, new location, timestamp and agent type. This allows tracking movements of users in general and the creation of bubbles 'in the past' as we shall later see in this document. When a client application starts it will determine to which geo channels it should subscribe. This will typically be the three closest ones. Three geo channels is the smallest number required on a plane to delimit an area. When a user creates a bubble 10 he will determine size and location. The space covered by the bubble 10 will determine the set of geo channels to be associated with the bubble 10 via a geo channel 50 selection algorithm. The bubble 10 servers associated with those channels will be sent the request to create and store the bubble 10 in their databases. It may happen that a given bubble 10 will be stored on more than one database when the geo channels involved point to distinct servers as we shall later see. This occurs when a bubble 10 is created at the boundary of two or more geo channel 50 systems. When a bubble 10 is created the following sequence of events take place. First the set of geo channels involved in the creation is determined. Then the set of those geo channels' ids become an attribute of the bubble 10 being created. A request is sent to the appropriate bubbles servers to create and store the new bubble 10. Most of the time a single server is involved but not always. As soon as the creation of the bubble 10 is determined to be successful a message is sent to each notification server involved. They will in turn broadcast the new bubble 10 to appropriate geo channels and all subscribed mobile devices will receive notifications in realtime. The third step involved space time record servers. This step is triggered when bubbles are created 'in the past' or in general when the start time of the bubble 10 is set to be before its created time. This is a kind of retroactive bubble 10 creation.

In alternative embodiments, usage scenarios include: Reaching other people nearby; Casting information at specific locations; Creating an interaction zone at a chosen location; Reaching people in a building or region of arbitrary shape; Hide information at a chosen physical location with a password; Create rallies, treasure hunts or other trails games; Reaching people that were or used to be at a given location; and Create ad hoc persistent discussion groups based on time and location. Reaching other people nearby: The most basic use of the communication platform for users is to reach other users nearby anonymously by creating a bubble 10 around them containing information such as text image or video. Every user being in the location delimited by the creating bubble 10 will be notified of the information and people who will come inside the bubble 10 at a later time will see the information enclosed, typically in a feed in the client application. Sharing contents, events occurring here and now, asking for help or reaching out to meet other people or simply share thoughts related to the current location are basic usage scenarios that bubbles allow. Casting information at specific locations: A slight variant of sending information around us is sending it at an arbitrary location. By creating a bubble 10 at a chosen location with a chosen diameter allows one to send information to users wherever they are. This can be useful for advertising a product or service at specific areas in a city where potential customers for that product or service are more likely to be found. Wanting to reach people at an event and asking them about what is happening is another possible use case. All usage scenarios that apply to sending creating a bubble 10 around also apply to creating a bubble 10 elsewhere: sharing content, socializing etc. Creating an interaction zone at a chosen location: Depending on the nature of bubbles created and the business rules that apply bubbles may allow answers. When inside a bubble 10 *a* user may answer it and his answer will be broadcast to every other users being in the bubble 10 at the moment. Answers will be visible to users entering the bubble 10 at a later time. Bubbles thus naturally allow location based realtime messaging and in particular interacting with users being at a chosen area. Reaching people in a building or region of arbitrary shape: One may want to create a realtime interaction space for all users being in a building or series of related buildings (e.g. a university) or attending related events happening at more than one location at the same time. Creating arbitrary regions with the communication platform allows such use cases. Hide information at a chosen physical location with a password: Bubble 10 keys allow to hide bubbles from users until they provide a specific key and enter it in their client application. Creating a bubble 10 with content (text, image, video) then publishing the key to a restricted audience (friends, members of an interest group or a society) allow only those targeted users to access the information even though other users could be at the same location. Create rallies, treasure hunts or other trails games: Bubble 10 keys allow introducing a form of dependency between bubbles. Such dependencies could be sequential thus allowing the creation of a 'bubble 10 trail' in which each bubble 10 contains the information necessary to be able to access the next bubble 10 in the sequence. In such context each bubble 10 in the sequence would be hidden with a bubble 10 key. Either the key to the next bubble 10 would be contained in each one and supplied automatically to the client application thus unlocking 272 and revealing the next one or, at each bubble 10, the user would have to obtain the key by solving a riddle or asking the author of the bubble 10. Treasure hunts or dating games would be possible use cases of bubble 10 trails among many others. Bubble 10 trails are a special case of bubbles linked together via a bubble 10 key. A hierarchy of access to bubbles could easily be implemented by creating many more than one bubble 10 sharing the same bubble 10 key. Entering a bubble 10 key in the client application would then unlock/reveal many bubbles at each step. Reaching people that were or used to be at a given location: Bubbles created in the past allow reaching users that were at a given location some time in the past. It could for instance allow sending a message to all users that were in given city in the past 48 hours. That could be a practical way of sending an alert to residents of the city, reaching them even though they are not home at the moment, to make them aware of a particular situation: sinister, need to boil water, danger of some sort or reminding them to vote. Another use case would be to send a message to all users who were at the corner of such and such street in the past 24 hours because you think you lost your wallet there. Reaching potential witnesses of an event: show, crime, accident etc. would be another practical use case of sending bubbles somewhere with retroactive lifespans. Create ad hoc persistent discussion groups based on time and location: Adding an attribute such as 'stretchability' to a bubble 10 allows yet another use case. For instance a user could target individuals on a map by choosing a specific area enclosing them. He could at the same time play with a slider to go back in time or forward in the future then create a bubble 10 at the chosen time and location. The system could then create a discussion group with those individuals much like regular bubbles but if the bubble 10 is declared 'stretchable', users that are or were at the chosen location would have the choice to still be in the group even when they leave the original area of the bubble 10 as if the bubble 10 would stretch when they move so that they are still inside. In this manner, people targeted in the past and who have been 'bubbled' can choose to accept or reject the invitation. Stretched bubbles could even be represented on the map with anonymous dots representing individuals who accepted to be 'bubbled'.

In alternative embodiments, possible interfaces include: bubble 10 creation interfaces, and bubble 10 display interfaces. Bubble 10 creation interfaces: A bubble 10 creation interface is any interface that allows to specify the space time coordinates and dimensions of a bubble 10 and add its content. One simple such interface involves a 2D map where the user manipulates a circular object representing a bubble 10 and sets its size by pinching in or out and sets its location by dragging it on the map. Text content can be typed in a text field and pictures selected or taken on the fly to be added to the bubble 10 contents. Such an interface can allow adding video (by choosing it or capturing it), sound or set any content that a bubble 10 can have (permissions, query, bubble 10 key etc.). A 3D creation interface using a map in order to create complex shapes in space and time (with sliders for instance or any other way to specify time periods, discrete or continuous) could be built. As complex as it might be its purpose would be to specify the space time coordinates and span (connected or not) in space time. A creation interface need not be visual or user operated. Bubble 10 display interfaces: As previously mentioned one of the client applications that will be in use by the public primarily two display interfaces. One in the form of a feed which displays a summary of each bubble 10 that contains the device 82 the client application is running on. The second basic display interface shows all bubbles known to the device 82 on a map, as circles, discs or other 2D shapes. A third considered display interface is in the form of augmented reality and shows bubbles through the camera of the device 82 (typically a smartphone or a tablet but can be any device 82 equipped with a camera). Another kind of display interface considered is a 3d representation of a map with bubbles drawn on it where the user can zoom in and out, rotate the map and move to any point in order to view the 3d bubbles or more generally regions. For all the above mentioned interfaces browsing through time with sliders which allow selecting a time period can be added.

In alternative embodiments, possible implementations include: Full fledged location aware client application, Bubble 10 board, A desktop or web application, Bubble Activated devices, Full system, Simple single bubble 10 generating device 82. Full fledged location aware client application: The client application has a display interface, a bubble 10 creation interface, a bubble 10/paths controller, GPS capabilities, a communication module. The application allows reception and creation of bubbles. It sends space time records when the device's position changes significantly allowing retroactive notifications to users that were at a certain place at a certain moment. It allows delayed messages to users arriving at certain locations in the future. It allows, in general, users to interact with others that are, have been or will be at the same location. Communication is based on location and not on the identity of users. Bubble 10 board: We contemplate what we could call a Bubble 10 board: a simple outdoors bulletin board to which users may publish bubbles. Such an apparatus would necessitate: A screen where bubble 10 contents would be displayed; A simple bubble 10/paths controller that simply determines if/when the board is inside bubbles it receives, it would show bubbles during their lifespan if and only if they geographically include the board; and A communication module to receive published bubbles. A desktop or web application: Bubble 10 creation interface, fixed location, communication module, display interface. A desktop or web application that allows a user to login to his account and create bubbles. The location is fixed and based on an address supplied by the user when registering. This necessitates: A bubble 10 creation interface to create bubbles to be broadcast to chosen locations; A communication module; An interface that allows choosing a region to login from (this would allow download appropriate geo channels information prior to login); A login mechanism. Such a simple system could be used by restaurants/retailers to easily publish deals around them (or to a target region of their choice). Bubble Activated devices: We can imagine devices that are capable of receiving bubbles and interpreting basic information they contain in order to perform actions. Such devices wouldn't have any user interface to create or display bubbles. They would need: Communication module, especially to connect to the notification server; Bubble 10/paths controller: a simple bubble 10 inclusion verifier; A function to be triggered when a bubble 10 is found to include the device 82: flash a light, lock/unlock a door, produce a sound/alert, send a message etc. Full system: The full system provides the following additional elements: Geo channels that offer a scalable method to manage bubble 10 discovery; Rules to associate a device 82 to geo channels; Rules to associate bubbles to geo channels; Bubble 10 discovery method; A way to scale the notification sub system (bubbles may have notification server url as field). Simple single bubble 10 generating device 82: We contemplate a single purpose device 82 whose sole function is to create a bubble 10 when powered on and delete it when powered off. The contents to be broadcast could be entered from a dedicated interface on the device 82 independently of the bubble 10 creation process. The device 82 would include the following: Routine to execute bubble 10 creation with fixed radius and location; A module capable of retrieving geo channels info from the Geo Channel 50 Directory and connecting to a bubbles server for bubble 10 creation and deletion as well connecting to the Notification server. This particular case would allow to emulate an outdoor beacon technology specialized in medium to long range signalling.

In some embodiments, there are advantages to the public, for retailers, and for global discovery. For the public: a new way of reaching people based on time and location without compromising one's privacy. Bubbles being spatio temporal containers of information allow reaching people based on their spatio temporal paths. For retailers, restaurants, advertising agencies: a very easy way to reach potential customers based on where they were, are or will be. Geo channels offer a scalable method of bubble 10 distribution/discovery across the globe. In some embodiments, incremental advantages are enabled by some of the bubble 10 fields: Content type;

Content (Text, tags/keywords, bubble 10 keys, image, audio, html, permissions etc.); Actions allowed; Bubble 10 key; Shape Id; Category; Opacity; and Elasticity. Simplest bubble 10: spatio temporal information+other information: The simplest bubble 10 contains spatio temporal information (creation date, start date, end date, longitude, latitude and diameter) and additional information. A first advantage is, for instance if the additional information includes text such a bubble 10 allows to send a text message anonymously to a location, targeting users being at that location without prior knowledge of their identity or any contact information contrary to many currently used means of communication such as phone, email, text messaging or the ones that most social network offer to their users. A second advantage is that bubbles allow restricting access to shared information to a specific region delimited by its size and location. The other information called content could be any kind of multimedia information that users are willing to share with each other. A third advantage, by varying the values of the start time and end time, thus varying the lifespan of a bubble 10, access to information can be time restricted at the same time as being location restricted. Bubble 10 key: The bubble 10 key field is an alpha numeric value that serves as a password that unlocks one or more bubbles when entered in a client application, making them go from a hidden state to an accessible one. Prior to their entry bubbles created with a bubble 10 key simply don't exist from a user point of view event if he/she is physically inside the space occupied by the bubble 10. This allows hiding information and making it available only to individuals knowing the key. If a bubble 10 contains a key to another bubble 10 in its 'content' field for instance, this introduces a dependency between the second and first bubble 10. Repeating that dependency relationship between a set of bubbles allows creating a hierarchy of access to bubbles. Games where the user discovers information based on various criteria leading to entering a bubble 10 key in the application can be implemented. The simplest kind of such a game would be a treasure hunt. More complex games such as real life fantasy role playing games could use that mechanism as a very simple way to organize space time region bound information related to the game play. Bubble 10 keys allow creating arbitrarily complex networks of space time region bound information. Shape Id: A shape id value for a bubble 10 indicates that this bubble 10 is part of a complex shape made of generally more than one bubble 10. The shape need not be connected. A shape can cover part or the totality of a street, an building of arbitrary shape of a set of separated simple or complex shapes. Non connected shapes offer a way to share information between two or several possibly distant regions. Combined with bubble 10 keys, one has the possibility to create a network of dependent shapes. Again this can be useful in location based games, adding even more flexibility. Opacity: By default, if the opacity is not specified, the bubble 10 is considered as opaque. This means the client application can only interact with its contents if its physical location falls within the space delimited by the bubble 10. Elasticity: By default in the case of an opaque bubble 10, access to its content strictly depends on the client application being inside the space delimited by the bubble 10. In some cases though it could be useful to allow a user to keep its access to the contents of a bubble 10 after he has left its area. It the case of bubbles created in the past, if we view them as discussion groups created from a selection of users that were at a certain place at a given moment (people who attended an event, were witness of an incident etc.). To allow this we add a field called 'Elasticity' that we set to true. By default, if the field is absent, elasticity is considered as false: once a device 82 leaves a bubble 10 it has no longer access to its contents. In some embodiments, the present application enables communication: The system allows delivery of information from a person to a group of persons in the most common case. In some embodiments, the present application enables location based communication/services: the system allows communication based on location and time. In some embodiments, the present application enables information access: the system helps manage access to information based on time and location. In some embodiments, the present applications enables space time region based communication: The system allows targeting individuals based on space time regions. In some embodiments, the present application enables geo localization: some embodiments of the system makes use of GPS. In some embodiments, the present application provides a communication platform or application allowing to reach people based on their space time location (past present and future). Potential market players are Google, Apple, Yelp who provide location based services. They would be in a good position to propose a similar communication solution. Android devices and iOS devices account together for approximately 91% of all smartphones. All owners of smartphones form the potential market Gartner predicts that global mobile phone sales for 2013 is approximately 1.81 billion in 2013. This forms the bulk of the potential market in the medium term. Since client applications may run on other devices than smartphones, some yet to be invented the market size is potentially way beyond these figures. We have described a new kind of communication platform based on the selection of space time regions. This platform allows interaction between users, between users and devices and between devices and other devices via spacial application dependent protocols. Communication is done by creating information containers called bubbles which occupy arbitrary regions (connected or not) in space time thus targeting users or devices whose space time path 140 crosses those regions in space time. Spatial coordinates of bubbles can span any region near the surface of the earth where location data and an internet connection is accessible. The time coordinates span the period starting with the first implementation of the system and extends arbitrary in the future.

What follows are example use cases enabled by some embodiments of the present application. The example use cases include socializing using bubble 10 posts, emergency messages from authorities, space time bound book chapters, instant coupons, treasure hunt, role playing games, taxi channel, 13 18 channel, guided tours, space time personal todo lists, short live and nearby deals, large scale commercial announcements, sending messages 'in the past', hiding information in space and time, 18+ channel, dating, linked bubbles, an application programming interface, and points to moderate the creation of bubbles. Socializing bubble 10 posts use case: in some embodiments, bubble 10 posts allow any user of a smartphone (e.g. iPhone, Android, and the like phones) to create bubbles around or near them. Allowed bubbles are of different types, for example, but not limited to: (1) Question: Allows comments; (2) Need/wish: allow private answers; (3) Announcement: allow comments; and (4) Social event: allow comments. Non paying users can have up to a fixed number, e.g. 5, active bubbles at a time. Bubbles can live to up to, e.g. 3 hours. Lifespan is programmable Bubbles can have a radius of, e.g., max 500 m and be centred at a maximum distance of e.g. 500 m from the user creating it. Bubbles may contain text and image information. When bubbles have less than a predetermined time e.g. 5 minutes to live, a countdown appears on their outer shell and when they are displayed in the main feed. Users of the Bubble 10 Posts aspect are anonymous although they may be required to provide a nickname, that can be changed at any time. Bubble 10 Posts may come with some channels, e.g. two channels: 'Public' and '12 18'. Paying user options include, not only what non paying users can do as described above, but also for example, the ability to: create larger bubbles; create bubbles farther from one's location; create bubble 10 deals if registered as a business, with username and password and business info (Address, phone, contact person, email) and Bubbles Deals have a distinct look and are prioritized: they tend to appear to the top of the main feed; create custom channels; and create private channels (A channel that requires a username/password to read and write). Here are a few examples of situations where a user can reach instantly people at a special location within a circular area of a given radius: (1) Help wanted: need for help from someone nearby: broken down car, lift needed; (2) Questions related to a specific region and situation: What is happening at a special place: 'has the show begun yet'?; (3) Announcements: toxic substance leak; (4) Dating: alone in a hotel during a business trip: looking for someone to go out for a drink; (5) Organizing events spontaneously; and (6) Lift/ride wanted. Emergencies/message from the authorities use case: bubbles can be an efficient way for authorities to transmit timely messages to all people in a given area (e.g. 1 Km, 5 Km or more) about a disaster e.g. (tornado heading your way and reaching you in about an hour), water or power outage in a given sector. Space time bound book chapters use case: special kind of book which each chapter bound to a special place (and time). The user has to be at the corresponding place to be able to read the chapter. This can enhance the experience by making it immersive. For instance the action of a book could occur at different places of a city and the user would have to go from place to place in order to read (and fully appreciate) each part of the story. Instant coupons use case: Merchants can create small bubbles (e.g. 500 m 1 Km) containing a fixed number of coupons giving access to special short lived deals (the bubble 10 itself can be short lived). Those coupons will be visible only to users that happen to be in the corresponding bubble 10. And they won't be accessible after the bubble 10 is destroyed. The number of remaining un granted coupons will be visible to all users in the bubble 10. The user can claim the coupon and go to the merchant's place for the merchant to grant the coupon. Each time a coupon is granted the remaining number is decremented for other's to see. Treasure hunt use case: custom channel can be created for the purpose of creating treasure hunts where tips and/or hints are embedded in bubbles. When reaching a bubble 10 participant would get access to information instructing them to go to a specific place where a bubble 10 has been created and where they will find the next hint eventually leading to a prize in the last bubble 10. Role playing games use case: Games can be based or enhanced with bubbles. Taxi channel use case: bubbles can be used to hail a taxi within a given radius (e.g. 2 3 Km). A specialized channel can be created for this purpose where user can post their request for a taxi by creating a bubble 10 around them of the desired radius, containing some text such as 'Taxi needed'. They can even take a picture of themselves and enclose it in the bubble 10 so that the taxi can know who to look for. A link to their location can facilitate the process: by clicking on the link, the taxi will be shown the itinerary from their location to the customer's location. 13-18 channel use case: A channel for teens can be created so that they can freely chat and post and share info among them. Guided tours use case: Guided tours are an application of bubbles wherein each bubble 10 contains info about their location. Space time personal todo lists use case: apace and time related todo lists can be created in a private personal channel. Short lived and nearby deals use case: merchants can use bubbles to easily announce or pre program special (possibly very short lived) deals to customers passing nearby. Large scale commercial announcements use case: instead of distributing written advertisement it would be far less costly and complicated to create bubbles to broadcast ads in a very localized small, medium or large scale manner. Far less cumbersome than physically dropping info in thousands of mailboxes. Sending messages 'in the past' use case: the section 'missed encounters' of some papers contain some hopeless attempts from individuals to re contact a person they crossed paths with and didn't dare speak to. We envision adding functionality in the device 82 that allows choosing a point in time and a specific region and sending a message to all the persons who were there at the chosen time. As well as solving the 'missed encounter' case, it would allow to send messages to all people who attended a special event or may have witnessed a particular situation. Hiding information in space and time use case: a secret code is only visible when close enough to a location during a time limited window. 18+ channel use case: content restricted to users that are 18+ included in bubbles. Dating use case: a bubble trail 268 (e.g. FIG. 37) can be used to pose questions that filter out incompatible dates and select compatible dates whereby only those that answer the right question obtain a key that allows them to move on to the next bubble 10. Linked bubbles use case: in special use cases such as games of treasure hunts bubbles can be linked together to form Directed Acyclic Graphs such that for a particular user, entering a bubble 10 unlocks the bubbles it is pointing to. Before its predecessors have been entered a given bubble 10 will be virtually non existent for the user. This is a way to establish a certain dependency in the information and making sure the user receives the information in a prescribed order. Bubble 10 inclusion is a particular type of soft links between bubble 10. This can be used for the treasure hunt for instance. Application programming interface use case: We foresee the creation of games using the bubbles infrastructure such as RPG games, special treasure hunts etc. For this an api can be made available to developers in order to create other applications that leverage the ability to create space time bubbles with information. Points to moderate the creation of bubbles use case: it is contemplated to enable a system of 'karma points' to moderate or empower the users of the system. Since in some embodiments, the system is anonymous this allows for a great amount of freedom that can have a good and a bad side. Be default, we will allow users to create bubbles of a certain size maximum (e.g. 500 m or 1 Km in radius) and at a maximum distance from where they physically are. By answering questions from other individuals or helping them, they will acquire more points and be able to create bigger bubbles at greater distance thus increasing their influence. On the other side if their bad behaviour is reprehensible and signalled be other users points may be subtracted after an investigation of the situation.

We have presented in great details the geo channels data structures and methods which offers a scalable and seamless method for bubble 10 discovery and creation. We have explained space time records which allow together with the space time record servers what we call 'sending bubbles in the past' a way to reach users who were at a certain place at a certain point in time. More generally the system allows creating bubbles in the past, present and future making it a space time region based communication system. The techniques disclosed herein provide a radical new way of communicating offering many advantages and complementing existing communication systems. Since other modifications and changes varied to fit particular operating requirements and environments will be apparent to those skilled in the art, the application is not considered limited to the example chosen for purposes of disclosure, and covers all changes and modifications which do not constitute departures from the true spirit and scope of this application.

Having thus described the application, what is desired to be protected by Letters Patent is presented in the subsequently appended claims

What is claimed is:

1. A method for space time region based communications in a data communication network, comprising the steps of:
   (a) performing an initial assignment of bubble data, the bubble data including a bubble spatio temporal information data representing a volume of space time, the bubble data and further including a content data thereby assigned to the spatio temporal information data;
   (b) providing a spatio temporal coordinate data associated with at least one user of the data communication network, the spatio temporal coordinate data including a location portion and at least a time in the future or the past;
   (c) determining if the spatio temporal coordinate data is deemed to be within the volume of space time represented by the bubble spatio temporal information data; and
   (d) granting access to the content data to the at least one user of the data communication network if the spatio temporal coordinate data is determined to be deemed to be within the volume of space time represented by the bubble spatio temporal information data.

2. The method of claim 1, wherein the step of providing the spatio temporal coordinate data includes an act of determining an instantaneous location of the at least one user of the data communication network.

3. The method of claim 2, wherein the act of determining the instantaneous location of the at least one user of the data communication network includes using a positioning system.

4. The method of claim 2, wherein the step of providing the spatio temporal coordinate data includes an act of storing a space time record of the at least one user of the data communication network into a computer readable memory.

5. The method of claim 4, wherein the step of providing the spatio temporal coordinate data includes the act of retrieving the space time record of the at least one user of the data communication network from the computer readable memory.

6. The method of claim 5, wherein the space time record has a time coordinate which is in the past relative to a time reference in the data communication network.

7. The method of claim 5, wherein the space time record has a time coordinate which is in the future relative to a time reference in the data communication network.

8. The method of claim 1, further comprising the step of modifying the bubble data.

9. The method of claim 8, further comprising the act of modifying the bubble spatio temporal information data.

10. The method of claim 9, further comprising the act of modifying the bubble data other than the spatio temporal information data.

11. The method of claim 10, further comprising the step of repeating steps b through d upon the condition that bubble data other than the bubble spatio temporal information data has been modified.

12. The method of claim 9, further comprising the act of modifying the content data.

13. The method of claim 9, further comprising the act of repeating steps b through d upon the condition that the bubble data has been modified.

14. The method of claim 1, further comprising the step of revoking access to the content data from the at least one user of the data communication network if the spatio temporal coordinate data is deemed to be outside the volume of space time represented by the bubble spatio temporal information data.

15. The method of claim 1, further comprising the step of determining if a time reference in the data communication network is determined to be deemed to be outside of a lifespan of the volume of space time represented by the bubble spatio temporal information data.

16. The method of claim 15, further comprising the step of repeating steps b through d upon the condition that the time reference in the data communication network is determined to be deemed to be outside of the lifespan of the volume of space time represented by the bubble spatio temporal information data.

17. The method of claim 16, further comprising the step of deleting the bubble data upon the condition that the time reference in the data communication network is determined to be deemed to be outside of the lifespan of the volume of space time represented by the bubble spatio temporal information data.

18. The method of claim 1, wherein the spatio temporal information data includes at least one data selected from a group including a creation date, a start date, an end date, a timestamp, a longitude, a latitude, an altitude, a radius, or a diameter.

19. The method of claim 1, further including the step of performing a subsequent assignment of an at least one other bubble data.

20. The method of claim 19, further including the step of performing an initial assignment of channel data to regroup the bubble data and the at least one other bubble data into a channel.

21. The method of claim 19, further comprising the step of assigning at least one bubble trail data that includes the bubble data in a sequence with the at least one other bubble data that are linked together in an orderly fashion represented by the bubble trail data whereby access to content data the at least one bubble data in the bubble trail data will be granted to the at least one user of the data communication network if the at least one user was granted access to the content data of the immediate predecessor of the at least one bubble data in the bubble trail data.

22. The method of claim 1, wherein the bubble data has a space time region attribute data that represents a predetermined shape in space time.

23. The method of claim 22, wherein the bubble data includes data points in time and space that need not be contiguous and that need not be connected to represent a predetermined space time region.

24. The method of claim 1, wherein the bubble other information data includes at least one data selected from a group including: a content type, an actions allowed, a bubble key, a shape Id, a category, an owner Id, a geo channels, a channel, an opacity, an elasticity, or a bubble ID.

25. The method of claim 1, wherein the bubble data is modified to have different values at different points in time.

26. The method of claim 1, wherein the bubble data includes a geo channel data.

27. The method of claim 26, wherein the geo channel data includes geo channel server information data.

28. The method of claim 27, wherein the geo channel server information data includes at least one data selected from a group of a notificationServerUrl, a bubblesServerUrl, or a spaceTimeRecordServerUrl for respective at least one of a notifications server, a bubbles server or a space time record server respectively in order to help load balance work done by one or more bubbles servers, notifications servers or space time record servers connected over the data communication network.

29. The method of claim 1, further comprising the step of providing at least one interface selected from a group of: a communications interface, a user interface, or an application programming interface.

30. The method of claim 1, further comprising the step of assigning to the spatio temporal information data to at least one data selected from a group of: a past time, a present time, a future time, a lifespan of the bubble data, a geo channel selection criteria, a bubble selection criteria, a device selection criteria, a node selection criteria, a user selection criteria, a surface element, a Delaunay triangulation, or a Voronoi diagram.

31. The method of claim 1, further comprising the step of comparing a first information data to a second information data wherein the first and second information are each selected from a group of data comprising: a time data, a location data, a latitude data, a longitude data, an altitude data, a start date data, an end date data, a creation date data, a lifespan data, a diameter data, an opacity data, an elasticity data, a permission data, a shape data, a category data, a content type data, a geo channel data, a channel data, an action data, or a bubble key data.

32. The method of claim 1, further comprising at least one of the steps selected from a group consisting of: creating, retrieving, updating, or deleting the bubble data.

33. The method of claim 1, further comprising the step of communicating a space time region based communication including at least the content data via the data communication network with the at least one user of the data communication network.

34. The method of claim 33, further comprising the act of communicating the space time region based communication using an at least one protocol selected from a group comprising: an https protocol, an http protocol, a websockets protocol, or a sockjs protocol.

35. The method of claim 33, further comprising the act of communicating the space time region based communication by including at least one message selected from a group of: a subscribe message, an unsubscribe message, a create new bubble message, a bubble created message, a new bubble message, a new bubble notification message, a bubble created in the past message, a space time notification message, a space time record message, a bubble contents message, a retrieve new bubbles message, a new bubbles message, a register to notifications message, a send space time record message, a create bubble message, a new bubble notification message, an answer message, or new answer notification message.

36. The method of claim 1, further comprising the step of providing a trigger step to cause the determining step to occur.

37. The method of claim 36, wherein the trigger step is selected from a group comprising: a communication trigger, a user interface trigger, or an application programming interface trigger.

38. The method of claim 1, wherein an owner user of the data communication network is deemed to be within the volume of space time represented by the bubble spatio temporal information data if the owner user triggered the step of performing the initial assignment of the bubble data.

39. A computer readable memory having recorded thereon statements and instructions for execution by a computer, for space time region based communications in a data communication network, said statements and instructions comprising:
(a) code means for performing an initial assignment of bubble data, the bubble data including a bubble spatio temporal information data representing a volume of space time, the bubble data further including a content data thereby assigned to the spatio temporal information data;
(b) code means for providing a spatio temporal coordinate data associated with a user of the data communication network, the spatio temporal coordinate data including a location portion and at least a time in the future or the past;
(c) code means for determining if the spatio temporal coordinate data is deemed to be within the volume of space time represented by the bubble spatio temporal information data; and
(d) code means for granting access to the content data to the user of the data communication network if the spatio temporal coordinate data is determined to be deemed to be within the volume of space time represented by the bubble spatio temporal information data.

40. A computer program product comprising a computer readable memory storing computer executable instructions thereon that when executed by a computer perform the steps of claim 1.

41. A system for space time region based communications in a data communication network, the system comprising:
(a) means for performing an initial assignment of bubble data, the bubble data including a bubble spatio temporal information data representing a volume of space time, the bubble data further including a content data thereby assigned to the spatio temporal information data;
(b) means for providing a spatio temporal coordinate data associated with a user of the data communication network, the spatio temporal coordinate data including a location portion and at least a time in the future or the past;
(c) means for determining if the spatio temporal coordinate data is deemed to be within the volume of space time represented by the bubble spatio temporal information data; and
(d) means for granting access to the content data to the user of the data communication network if the spatio temporal coordinate data is determined to be deemed to be within the volume of space time represented by the bubble spatio temporal information data.

42. A computer-implemented method for space time region based communications in a data communication network, the method comprising:
(a) performing an initial assignment of bubble data, the bubble data including a bubble spatio temporal information data representing a volume of space time, the bubble data further including a content data thereby assigned to the spatio temporal information data;

(b) providing a spatio temporal coordinate data associated with a user of the data communication network, the spatio temporal coordinate data including a location portion and at least a time in the future or the past;

(c) determining if the spatio temporal coordinate data is deemed to be within the volume of space time represented by the bubble spatio temporal information data; and (d) granting access to the content data to the user of the data communication network if the spatio temporal coordinate data is determined to be deemed to be within the volume of space time represented by the bubble spatio temporal information data.

* * * * *